United States Patent
Akutsu et al.

(10) Patent No.: US 8,564,146 B2
(45) Date of Patent: Oct. 22, 2013

(54) POWER PLANT

(75) Inventors: Shigemitsu Akutsu, Saitama-ken (JP);
Kota Kasaoka, Saitama-ken (JP);
Masashi Bando, Saitama-ken (JP);
Noriyuki Abe, Saitama-ken (JP);
Satoyoshi Oya, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 77 days.

(21) Appl. No.: 13/501,119

(22) PCT Filed: Jul. 23, 2010

(86) PCT No.: PCT/JP2010/062428
§ 371 (c)(1),
(2), (4) Date: Apr. 10, 2012

(87) PCT Pub. No.: WO2011/045963
PCT Pub. Date: Apr. 21, 2011

(65) Prior Publication Data
US 2012/0202645 A1   Aug. 9, 2012

(30) Foreign Application Priority Data

Oct. 13, 2009   (JP) ................................. 2009-236699

(51) Int. Cl.
*F02B 63/04* (2006.01)
(52) U.S. Cl.
USPC ........................................................ 290/1 A
(58) Field of Classification Search
USPC ........... 290/1 A, 1 R, 40 C, 4 C, 39; 475/5, 8; 310/112, 103
See application file for complete search history.

(56) References Cited

U.S. PATENT DOCUMENTS 8,397,848 B2 * 3/2013 Read ........................... 180/65.21
8,456,029 B2 * 6/2013 Powers .......................... 290/1 R
(Continued)

FOREIGN PATENT DOCUMENTS

JP    10-136508 A    5/1998
JP    2001-234837 A  8/2001
(Continued)

OTHER PUBLICATIONS

International Search Report corresponding to International Patent Application No. PCT/JP2010/062428 dated Aug. 24, 2010 and English translation thereof.

*Primary Examiner* — Jean F Duverne
(74) *Attorney, Agent, or Firm* — Squire Sanders (US) LLP

(57) ABSTRACT

A power plant that is capable of attaining downsizing and reduction of manufacturing costs and enhancing the degree of freedom in design thereof. In the power plant 1, a first rotating machine 11 includes a first rotor 14 having a predetermined plurality of magnetic poles 14a, a stator 13 that generates a predetermined plurality of armature magnetic poles to thereby generate a rotating magnetic field, and a second rotor 15 having a predetermined plurality of soft magnetic material elements 15a. The ratio between the number of the armature magnetic poles, the number of the magnetic poles, and the number of the soft magnetic material elements is set to 1:m:(1+m)/2 (m≠1.0). One of the rotors 14 and 15 is mechanically connected to an output portion 3a of a heat engine 3, and the other of the rotors 14 and 15 and a rotor 23 of a second rotating machine 21 are mechanically connected to driven parts DW and DW. Further, in starting the heat engine 3, when the rotational speed of the output portion 3a is not lower than a first predetermined value NEST1, the heat engine 3 is started in a state where the rotational speed of the output portion 3a is not increased.

15 Claims, 54 Drawing Sheets

(56) References Cited

U.S. PATENT DOCUMENTS

| | | | |
|---|---|---|---|
| 8,480,522 B2 * | 7/2013 | Akutsu et al. | 475/5 |
| 8,492,913 B2 * | 7/2013 | Koeneman et al. | 290/1 A |
| 2010/0029428 A1 * | 2/2010 | Abe et al. | 475/5 |
| 2011/0034282 A1 * | 2/2011 | Akutsu et al. | 475/5 |

FOREIGN PATENT DOCUMENTS

| | | |
|---|---|---|
| JP | 2004-211709 A | 7/2004 |
| JP | 2008-179348 A | 8/2008 |
| WO | WO2008/018539 A1 | 2/2008 |
| WO | WO2009/128287 A1 | 10/2009 |

* cited by examiner

F I G. 1
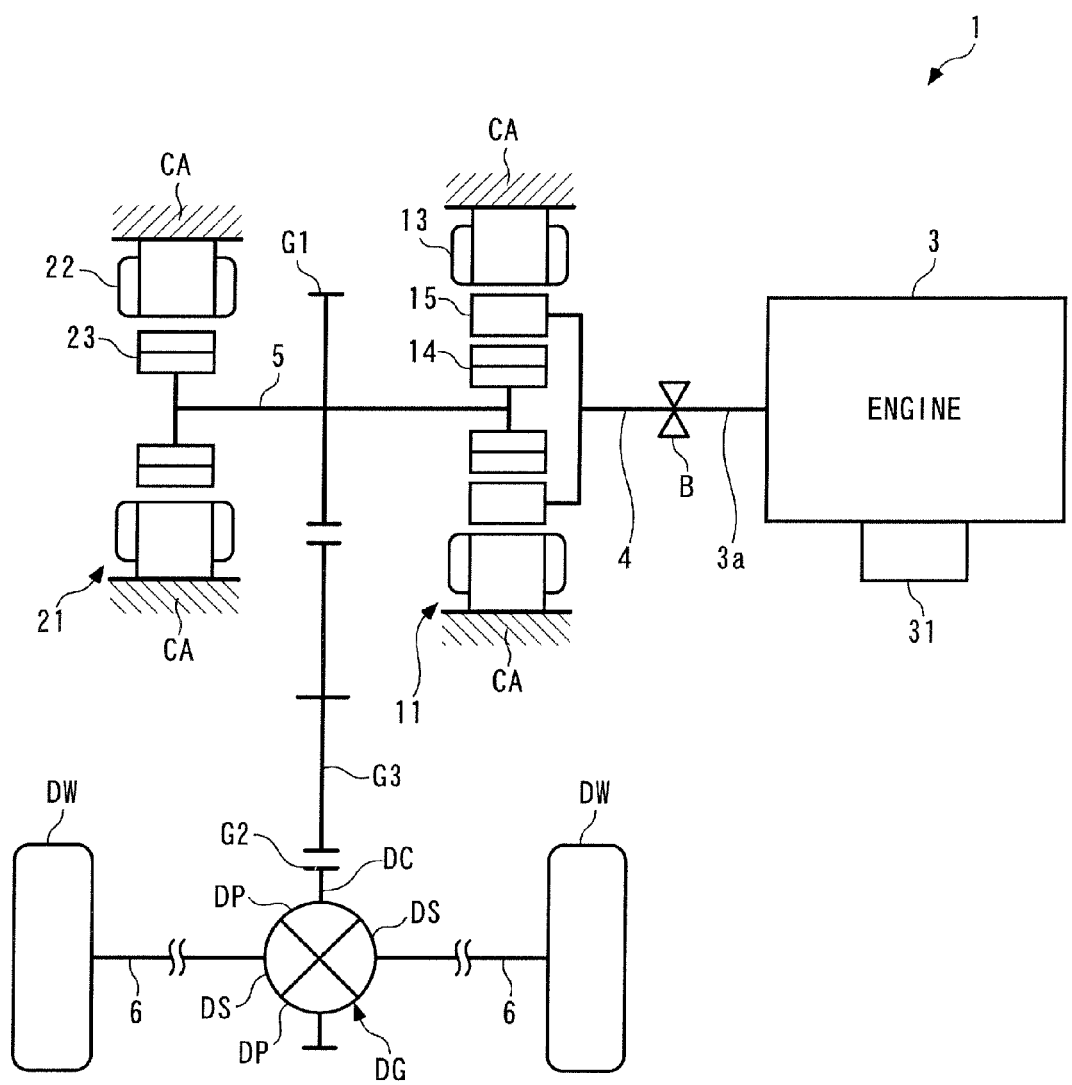

FIG. 9
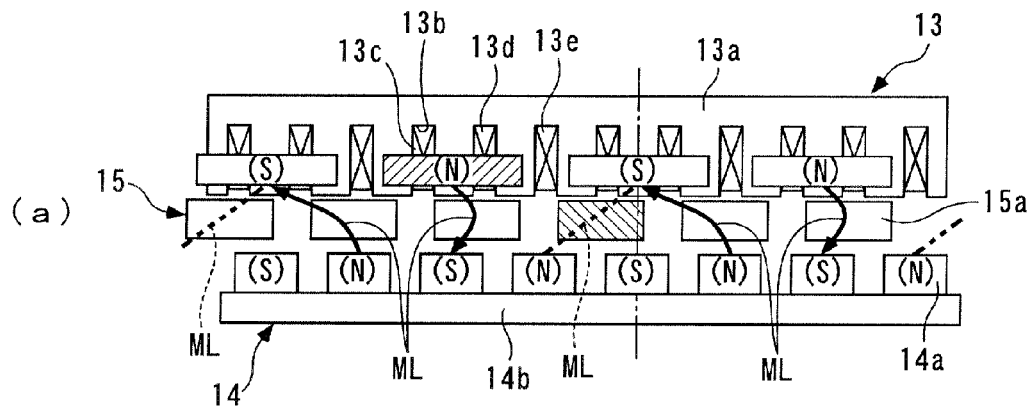
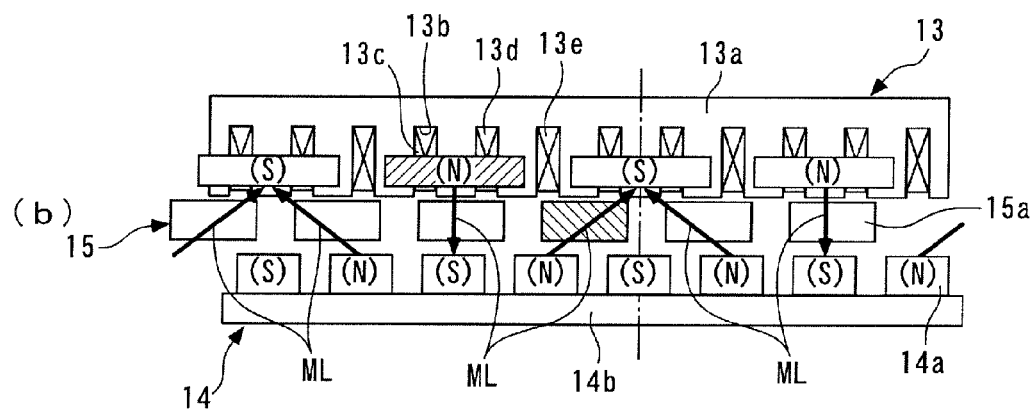
FIG. 10
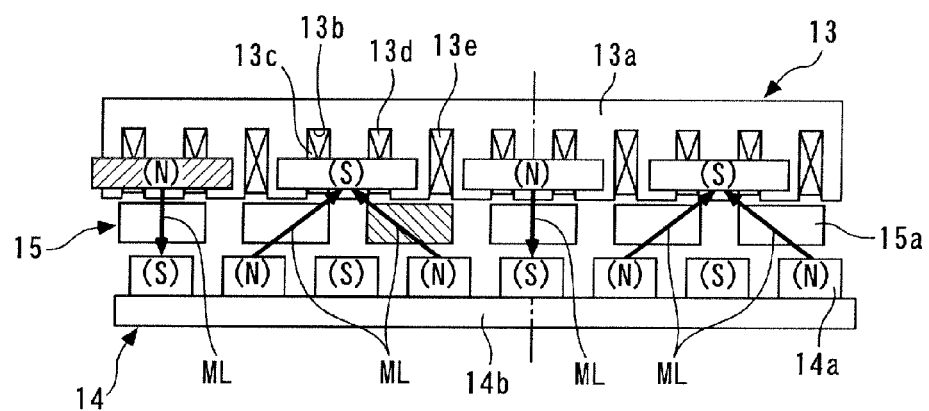

F I G. 2 5
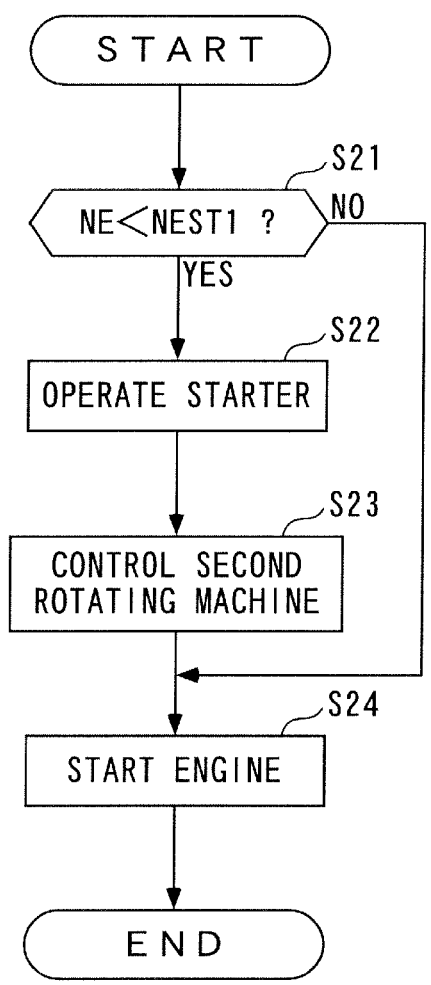

US 8,564,146 B2

POWER PLANT

TECHNICAL FIELD

The present invention relates to a power plant equipped with two or more motive power sources, such as a heat engine and rotating machines, which are different from each other.

BACKGROUND ART

Conventionally, as the power plant of this kind, one disclosed in Patent Literature 1, for example, is known. This power plant is for driving drive wheels of a vehicle, and is equipped with an internal combustion engine and first and second rotating machines as motive power sources. This second rotating machine is a general one-rotor-type rotating machine.

Further, the above-mentioned first rotating machine is a two-rotor-type rotating machine, and includes a stator and first and second rotors. The first and second rotors and the stator are arranged in an axial direction in the mentioned order from inside. The first rotor includes first and second permanent magnet rows that extend in a circumferential direction and are arranged side by side in the axial direction. Further, the stator is configured to be capable of generating first and second rotating magnetic fields. The first and second rotating magnetic fields rotate between first and second magnetic pole rows in the circumferential direction, respectively. Furthermore, the second rotor includes first and second soft magnetic material element rows that extend in the circumferential direction and are arranged side by side in the axial direction. The first and second soft magnetic material element rows are opposed to the first and second magnetic pole rows, respectively. Further, the first and second soft magnetic material element rows are formed by soft magnetic material elements, and comprise a plurality of first cores and a plurality of second cores arranged in the circumferential direction, respectively. The circumferential positions of the first and second cores are displaced from each other by an electrical angle of π/2.

In the first rotating machine constructed as above, when the first and second rotating magnetic fields are generated by supplying electric power to the stator, the first and second cores are magnetized by magnetic poles of the first and second rotating magnetic fields and magnetic poles of the first and second permanent magnets, whereby magnetic force lines are generated between these elements. Then, the electric power supplied to the stator is converted to motive power by the action of magnetism of the magnetic force lines, and the motive power is output from the first and second rotors. Alternatively, motive power input to the first and second rotors is converted to electric power, and the electric power is output from the stator. Further, the first rotor and the second rotating machines are connected to the drive wheels, and the second rotor is connected to the crankshaft of the engine.

In the power plant constructed as above, the operations of the engine and the first and second rotating machines are controlled, whereby motive power is transmitted to the drive wheels to drive the same.

CITATION LIST

Patent Literature

[PTL 1] International Publication Pamphlet No. WO08/018,539

SUMMARY OF INVENTION

Technical Problem

In the above-described conventional power plant, however, in the first rotating machine, not only the first soft magnetic material element row formed by the plurality of first cores but also the second soft magnetic material element row formed by the plurality of second cores is indispensable, for appropriate action of magnetism of the aforementioned magnetic force lines, so as to convert the electric power supplied to the stator to motive power and output the motive power from the first and second rotors. This inevitably increases the size and the manufacturing costs of the first rotating machine to thereby increase the size and the manufacturing costs of the power plant. Further, due to the construction thereof, the first rotating machine is only possible with a speed relationship that the difference between the rotational speed of the first and second rotating magnetic fields and that of the second rotator and the difference between the rotational speed of the second rotor and that of the first rotor are equal to each other. This lowers the degree of freedom in design of the first rotating machine, and in turn lowers the degree of freedom in design of the power plant.

The present invention has been made to provide a solution to the above-described problems, and an object thereof is to provide a power plant that is capable of attaining reduction of the size and manufacturing costs and enhancing the degree of freedom in design thereof.

Solution to Problem

To attain the object, the invention as claimed in claim 1 is a power plant 1, 1A for driving driven parts (drive wheels DW and DW in embodiments (the same applies hereinafter in this section)), including a heat engine (engine 3) including an output portion (crankshaft 3a) for outputting motive power, a first rotating machine 11, a second rotating machine 21 capable of converting supplied electric power to motive power and outputting the motive power from a rotor 23 thereof, and also capable of converting motive power input to the rotor 23 to electric power, and a controller (ECU 2, VCU 43, first PDU 41, second PDU 42) for controlling operations of the heat engine and the first and second rotating machines 11, 21, wherein the first rotating machine 11 comprises a first rotor 14 having a magnetic pole row that is formed by a predetermined plurality of magnetic poles (permanent magnets 14a) arranged in a circumferential direction, and has each two magnetic poles thereof adjacent to each other so disposed as to have respective polarities different from each other, the first rotor being rotatable in the circumferential direction, an unmovable stator (first stator 13) having an armature row (iron core 13a, U-phase to W-phase coils 13c to 13e) that is disposed in a manner opposed to the magnetic pole row and is for generating a predetermined plurality of armature magnetic poles to thereby cause a rotating magnetic field rotating in the circumferential direction to be generated between the armature row and the magnetic pole row, and a second rotor 15 having a soft magnetic material element row that is formed by a predetermined plurality of soft magnetic material elements (cores 15a) arranged in the circumferential direction in a manner spaced from each other, and is disposed between the magnetic pole row and the armature row, the second rotor being rotatable in the circumferential direction, wherein a ratio between the number of the armature magnetic poles, the number of the magnetic poles, and the number of the soft magnetic material elements is set to 1:m:(1+m)/2 (m≠1.0), wherein one of the first and second rotors 14, 15 is mechanically connected to the output portion whereas the other of the first and second rotors 14, 15 is mechanically connected to the driven parts, and the rotor 23 is mechanically connected to the driven parts, and wherein in starting the heat engine, when a rotational speed of the output portion is not lower than a first predetermined value (first start-time rotational speed NEST1), the heat engine is started by the controller in a state where the rotational speed of the output portion is not increased (steps 2, 4 in FIG. 18, steps 21, 24 in FIG. 25, steps 21, 24 in FIG. 27, steps 32, 4 in FIG. 30).

According to the first rotating machine of this power plant, the magnetic pole row of the first rotor rotatable in the circumferential direction and the armature row of the unmovable stator are opposed to each other, and the soft magnetic material element row of the second rotor rotatable in the circumferential direction is disposed between the magnetic pole row and the armature row. Further, the plurality of magnetic poles forming the magnetic pole row and the plurality of soft magnetic material elements forming the soft magnetic material element row are arranged in the circumferential direction. Furthermore, the armature row of the stator is capable of generating the predetermined plurality of armature magnetic poles to thereby cause the rotating magnetic field rotating in the circumferential direction to be generated between the armature row and the magnetic pole row. Further, each two magnetic poles adjacent to each other have respective polarities different from each other, and each two soft magnetic material elements adjacent to each other are spaced from each other. As described above, between the magnetic pole row and the armature row, the rotating magnetic field is generated by the plurality of armature magnetic poles, and further, the soft magnetic material element row is disposed, so that the soft magnetic material elements are magnetized by the armature magnetic poles and the magnetic poles. Because of this fact and the fact that each two soft magnetic material elements adjacent to each other are spaced from each other, as described above, there are generated magnetic force lines in a manner connecting between the magnetic poles, the soft magnetic material elements, and the armature magnetic poles. Therefore, when the rotating magnetic field is generated by the supply of electric power to the stator, the action of magnetism of the magnetic force lines converts the electric power supplied to the stator to motive power, and the motive power is output from the first rotor or the second rotor.

Now, a torque equivalent to the electric power supplied to the stator and the electrical angular velocity ωmf of the rotating magnetic field is referred to as "driving equivalent torque Te". Hereafter, a description will be given of a relationship between the driving equivalent torque Te, torques transmitted to the first and second rotors (hereinafter referred to as the "first rotor-transmitted torque T1" and the "second rotor-transmitted torque T2", respectively), and a relationship between the rotating magnetic field, and the electrical angular velocities of the first and second rotors.

When the first rotating machine according to the present invention is configured under the following conditions (A) and (B), an equivalent circuit corresponding to the first rotating machine is expressed as shown in FIG. 66.

(A) The stator includes three-phase coils of U-phase to W-phase.

(B) The number of the armature magnetic poles is 2, and the number of the magnetic poles is 4, that is, a pole pair number of the armature magnetic poles, each pair being formed by an N pole and an S pole of the armature magnetic poles, has a value of 1, and a pole pair number of the magnetic poles, each pair being formed by an N pole and an S pole of the magnetic poles, has a value of 2. The soft magnetic material elements are formed by the first cores, the second cores, and the third cores.

Note that as mentioned above, throughout the specification, the term "pole pair" is intended to mean a pair of an N pole and an S pole.

In this case, a magnetic flux $\Psi k1$ from a magnetic pole passing through the first core of the soft magnetic material elements is expressed by the following equation (1):

$$\Psi k1 = \phi f \cos[2(\theta 2 - \theta 1)] \tag{1}$$

wherein $\phi f$ represents the maximum value of the magnetic flux from the magnetic pole, and $\theta 1$ and $\theta 2$ represent a rotational angle position of the magnetic pole and a rotational angle position of the first core, with respect to the U-phase coil, respectively. Further, in this case, since the ratio of the pole pair number of the magnetic poles to the pole pair number of the armature magnetic poles is 2.0, the magnetic flux of the magnetic pole rotates (changes) at a repetition period of the twofold of the repetition period of the rotating magnetic field, so that to represent this, in the aforementioned equation (1), $(\theta 2 - \theta 1)$ is multiplied by 2.0.

Therefore, a magnetic flux $\Psi u1$ from the magnetic pole passing through the U-phase coil via the first core is expressed by the following equation (2) obtained by multiplying the equation (1) by $\cos \theta 2$.

$$\Psi u1 = \phi f \cos[2(\theta 2 - \theta 1)] \cos \theta 2 \tag{2}$$

Similarly, a magnetic flux $\Psi k2$ from a magnetic pole passing through the second core of the soft magnetic material elements is expressed by the following equation (3):

$$\Psi k2 = \psi f \cdot \cos\left[2\left(\theta 2 + \frac{2\pi}{3} - \theta 1\right)\right] \tag{3}$$

The rotational angle position of the second core with respect to the stator leads that of the first core by $2\pi/3$, so that to represent this, in the aforementioned equation (3), $2\pi/3$ is added to $\theta 2$.

Therefore, a magnetic flux $\Psi u2$ from the magnetic pole passing through the U-phase coil via the second core is expressed by the following equation (4) obtained by multiplying the equation (3) by $\cos(\theta 2 + 2\pi/3)$.

$$\Psi u2 = \psi f \cdot \cos\left[2\left(\theta 2 + \frac{2\pi}{3} - \theta 1\right)\right] \cos\left(\theta 2 + \frac{2\pi}{3}\right) \tag{4}$$

Similarly, a magnetic flux $\Psi u3$ from the magnetic pole passing through the U-phase coil via the third core of the soft magnetic material elements is expressed by the following equation (5):

$$\Psi u3 = \psi f \cdot \cos\left[2\left(\theta 2 + \frac{4\pi}{3} - \theta 1\right)\right]\cos\left(\theta 2 + \frac{4\pi}{3}\right) \quad (5)$$

In the first rotating machine as shown in FIG. 66, a magnetic flux $\Psi u$ from the magnetic pole passing through the U-phase coil via the soft magnetic material elements is obtained by adding up the magnetic fluxes $\Psi u1$ to $\Psi u3$ expressed by the above-mentioned equations (2), (4) and (5), and hence the magnetic flux $\Psi u$ is expressed by the following equation (6):

$$\Psi u = \quad (6)$$

$$\psi f \cdot \cos[2(\theta 2 - \theta 1)]\cos\theta 2 + \psi f \cdot \cos\left[2\left(\theta 2 + \frac{2\pi}{3} - \theta 1\right)\right]\cos\left(\theta 2 + \frac{2\pi}{3}\right) +$$

$$\psi f \cdot \cos\left[2\left(\theta 2 + \frac{4\pi}{3} - \theta 1\right)\right]\cos\left(\theta 2 + \frac{4\pi}{3}\right)$$

Further, when this equation (6) is generalized, the magnetic flux $\Psi u$ from the magnetic pole passing through the U-phase coil via the soft magnetic material elements is expressed by the following equation (7):

$$\Psi u = \sum_{i=1}^{b} \psi f \cdot \cos\left\{a\left[\theta 2 + (i-1)\frac{2\pi}{b} - \theta 1\right]\right\}\cos\left\{c\left[\theta 2 + (i-1)\frac{2\pi}{b}\right]\right\} \quad (7)$$

wherein a, b and c represent the pole pair number of magnetic poles, the number of soft magnetic material elements, and the pole pair number of armature magnetic poles. Further, when the above equation (7) is changed based on the formula of the sum and product of the trigonometric function, there is obtained the following equation (8):

$$\Psi u = \sum_{i=1}^{b} \frac{1}{2} \cdot \psi f \left\{\cos\left[(a+c)\theta 2 - a\cdot\theta 1 + (a+c)(i-1)\frac{2\pi}{b}\right] + \cos\left[(a-c)\theta 2 - a\cdot\theta 1 + (a-c)(i-1)\frac{2\pi}{b}\right]\right\} \quad (8)$$

When b=a+c is set in this equation (8), and the rearrangement based on $\cos(\theta+2\pi)=\cos\theta$ is performed, there is obtained the following equation (9):

$$\Psi u = \frac{b}{2} \cdot \psi f \cdot \cos[(a+c)\theta 2 - a\cdot\theta 1] + \sum_{i=1}^{b} \frac{1}{2} \cdot \psi f \left\{\cos\left[(a-c)\theta 2 - a\cdot\theta 1 + (a-c)(i-1)\frac{2\pi}{b}\right]\right\} \quad (9)$$

When this equation (9) is rearranged based on the addition theorem of the trigonometric function, there is obtained the following equation (10):

$$\Psi u = \frac{b}{2} \cdot \psi f \cdot \cos[(a+c)\theta 2 - a\cdot\theta 1] + \quad (10)$$

$$\frac{1}{2} \cdot \psi f \cdot \cos[(a-c)\theta 2 - a\cdot\theta 1]\sum_{i=1}^{b}\cos\left[(a-c)(i-1)\frac{2\pi}{b}\right] -$$

$$\frac{1}{2} \cdot \psi f \cdot \sin[(a-c)\theta 2 - a\cdot\theta 1]\sum_{i=1}^{b}\sin\left[(a-c)(i-1)\frac{2\pi}{b}\right].$$

When the second term on the right side of the equation (10) is rearranged based on the sum total of series and Euler's formula on condition that $a-c\neq 0$, it is equal to 0, as is apparent from the following equation (11):

$$\sum_{i=1}^{b}\cos\left[(a-c)(i-1)\frac{2\pi}{b}\right] = \sum_{i=0}^{b-1}\frac{1}{2}\left\{e^{j[(a-c)\frac{2\pi}{b}i]} + e^{-j[(a-c)\frac{2\pi}{b}i]}\right\} \quad (11)$$

$$= \frac{1}{2}\left\{\frac{e^{j[(a-c)\frac{2\pi}{b}b]} - 1}{e^{j[(a-c)\frac{2\pi}{b}]} - 1} + \frac{e^{-j[(a-c)\frac{2\pi}{b}b]} - 1}{e^{-j[(a-c)\frac{2\pi}{b}]} - 1}\right\}$$

$$= \frac{1}{2}\left\{\frac{e^{j[(a-c)2\pi]} - 1}{e^{j[(a-c)\frac{2\pi}{b}]} - 1} + \frac{e^{-j[(a-c)2\pi]} - 1}{e^{-j[(a-c)\frac{2\pi}{b}]} - 1}\right\}$$

$$= \frac{1}{2}\left\{\frac{0}{e^{j[(a-c)\frac{2\pi}{b}]} - 1} + \frac{0}{e^{-j[(a-c)\frac{2\pi}{b}]} - 1}\right\}$$

$$= 0$$

Further, when the third term on the right side of the above-described equation (10) is rearranged based on the sum total of series and Euler's formula on condition that $a-c\neq 0$, it is also equal to 0, as is apparent from the following equation (12):

$$\sum_{i=1}^{b}\sin\left[(a-c)(i-1)\frac{2\pi}{b}\right] = \sum_{i=0}^{b-1}\frac{1}{2}\left\{e^{j[(a-c)\frac{2\pi}{b}i]} - e^{-j[(a-c)\frac{2\pi}{b}i]}\right\} \quad (12)$$

$$= \frac{1}{2}\left\{\frac{e^{j[(a-c)\frac{2\pi}{b}b]} - 1}{e^{j[(a-c)\frac{2\pi}{b}]} - 1} - \frac{e^{-j[(a-c)\frac{2\pi}{b}b]} - 1}{e^{-j[(a-c)\frac{2\pi}{b}]} - 1}\right\}$$

$$= \frac{1}{2}\left\{\frac{e^{j[(a-c)2\pi]} - 1}{e^{j[(a-c)\frac{2\pi}{b}]} - 1} - \frac{e^{-j[(a-c)2\pi]} - 1}{e^{-j[(a-c)\frac{2\pi}{b}]} - 1}\right\}$$

$$= \frac{1}{2}\left\{\frac{0}{e^{j[(a-c)\frac{2\pi}{b}]} - 1} - \frac{0}{e^{-j[(a-c)\frac{2\pi}{b}]} - 1}\right\}$$

$$= 0$$

From the above, when $a-c\neq 0$ holds, the magnetic flux $\Psi u$ from the magnetic pole passing through the U-phase coil via the soft magnetic material elements is expressed by the following equation (13):

$$\Psi u = \frac{b}{2} \cdot \psi f \cdot \cos[(a+c)\theta 2 - a\cdot\theta 1] \quad (13)$$

Further, in this equation (13), if $a/c=\alpha$, there is obtained the following equation (14):

$$\Psi u = \frac{b}{2} \cdot \psi f \cdot \cos[(\alpha+1)c \cdot \theta 2 - \alpha \cdot c \cdot \theta 1] \quad (14)$$

Furthermore, in this equation (14), assuming that $c \cdot \theta 2 = \theta e2$ and $c \cdot \theta 1 = \theta e1$, there is obtained the following equation (15):

$$\Psi u = \frac{b}{2} \cdot \psi f \cdot \cos[(\alpha+1)\theta e2 - \alpha \cdot \theta e1] \quad (15)$$

In this equation, as is clear from the fact that $\theta e2$ is obtained by multiplying the rotational angle position $\theta 2$ of the first core with respect to the U-phase coil by the pole pair number c of the armature magnetic poles, $\theta e2$ represents the electrical angular position of the first core with respect to the U-phase coil. Further, as is apparent from the fact that $\theta e1$ is obtained by multiplying the rotational angle position $\theta 1$ of the magnetic pole with respect to the U-phase coil by the pole pair number c of the armature magnetic poles, $\theta e1$ represents the electrical angular position of the magnetic pole with respect to the U-phase coil.

Similarly, since the electrical angular position of the V-phase coil is delayed from that of the U-phase coil by an electrical angle of $2\pi/3$, the magnetic flux $\Psi v$ from the magnetic pole passing through the V-phase coil via the soft magnetic material elements is expressed by the following equation (16). Further, since the electrical angular position of the W-phase coil leads that of the U-phase coil by an electrical angle of $2\pi/3$, the magnetic flux $\Psi w$ of the magnetic pole passing through the W-phase coil via the soft magnetic material elements is expressed by the following equation (17).

$$\Psi v = \frac{b}{2} \cdot \psi f \cdot \cos\left[(\alpha+1)\theta e2 - \alpha \cdot \theta e1 - \frac{2\pi}{3}\right] \quad (16)$$

$$\Psi w = \frac{b}{2} \cdot \psi f \cdot \cos\left[(\alpha+1)\theta e2 - \alpha \cdot \theta e1 + \frac{2\pi}{3}\right] \quad (17)$$

Further, when the magnetic fluxes $\Psi u$ to $\Psi w$ expressed by the aforementioned equations (15) to (17), respectively, are differentiated with respect to time, there are obtained the following equations (18) to (20):

$$\frac{d\Psi u}{dt} = -\frac{b}{2} \cdot \psi f \{[(\alpha+1)\omega e2 - \alpha \cdot \omega e1]\sin[(\alpha+1)\theta e2 - \alpha \cdot \theta e1]\} \quad (18)$$

$$\frac{d\Psi v}{dt} = -\frac{b}{2} \cdot \psi f \left\{[(\alpha+1)\omega e2 - \alpha \cdot \omega e1]\sin\left[(\alpha+1)\theta e2 - \alpha \cdot \theta e1 - \frac{2\pi}{3}\right]\right\} \quad (19)$$

$$\frac{d\Psi w}{dt} =$$
$$-\frac{b}{2} \cdot \psi f \left\{[(\alpha+1)\omega e2 - \alpha \cdot \omega e1]\sin\left[(\alpha+1)\theta e2 - \alpha \cdot \theta e1 + \frac{2\pi}{3}\right]\right\} \quad (20)$$

wherein $\omega e1$ represents a value obtained by differentiating $\theta e1$ with respect to time, i.e. a value obtained by converting an angular velocity of the first rotor with respect to the stator to an electrical angular velocity (hereinafter referred to as the "first rotor electrical angular velocity"), and $\omega e2$ represents a value obtained by differentiating $\theta e2$ with respect to time, i.e. a value obtained by converting an angular velocity of the second rotor with respect to the stator to an electrical angular velocity (hereinafter referred to as the "second rotor electrical angular velocity").

Further, magnetic fluxes of the magnetic poles that directly pass through the U-phase to W-phase coils without via the soft magnetic material elements are very small, and hence influence thereof is negligible. Therefore, $d\Psi u/dt$ to $d\Psi w/dt$ (equations (18) to (20)), which are values obtained by differentiating with respect to time the magnetic fluxes $\Psi u$ to $\Psi w$ from the magnetic poles, which pass through the U-phase to W-phase coils via the soft magnetic material elements, respectively, represent counter-electromotive force voltages (induced electromotive voltages), which are generated in the U-phase to W-phase coils as the magnetic poles and the soft magnetic material elements rotate with respect to the stator, respectively.

From the above, electric currents Iu, Iv and Iw, flowing through the U-phase, V-phase and W-phase coils, respectively, are expressed by the following equations (21), (22) and (23):

$$Iu = I \cdot \sin[(\alpha+1)\theta e2 - \alpha \cdot \theta e1] \quad (21)$$

$$Iv = I \cdot \sin\left[(\alpha+1)\theta e2 - \alpha \cdot \theta e1 - \frac{2\pi}{3}\right] \quad (22)$$

$$Iw = I \cdot \sin\left[(\alpha+1)\theta e2 - \alpha \cdot \theta e1 + \frac{2\pi}{3}\right] \quad (23)$$

wherein I represents the amplitude (maximum value) of electric currents flowing through the U-phase to W-phase coils.

Further, from the above equations (21) to (23), the electrical angular position $\theta mf$ of the vector of the rotating magnetic field with respect to the U-phase coil is expressed by the following equation (24), and the electrical angular velocity of the rotating magnetic field with respect to the U-phase coil (hereinafter referred to as the "magnetic field electrical angular velocity") $\omega mf$ is expressed by the following equation (25).

$$\theta mf = (\alpha+1)\theta e2 - \alpha \cdot \theta e1 \quad (24)$$

$$\omega mf = (\alpha+1)\omega e2 - \alpha \cdot \omega e1 \quad (25)$$

Further, the mechanical output (motive power) W, which is output to the first and second rotors by the flowing of the respective electric currents Iu to Iw through the U-phase to W-phase coils, is represented, provided that a reluctance-associated portion is excluded therefrom, by the following equation (26):

$$W = \frac{d\Psi u}{dt} \cdot Iu + \frac{d\Psi v}{dt} \cdot Iv + \frac{d\Psi w}{dt} \cdot Iw \quad (26)$$

When the above equations (18) to (23) are substituted into this equation (26) for rearrangement, there is obtained the following equation (27):

$$W = -\frac{3 \cdot b}{4} \cdot \psi f \cdot I[(\alpha+1)\omega e2 - \alpha \cdot \omega e1] \quad (27)$$

Furthermore, the relationship between this mechanical output W, the aforementioned first and second rotor-transmitted torques T1 and T2, and the first and second rotor electrical angular velocities ωe1 and ωe2 is expressed by the following equation (28):

$$W = T1 \cdot \omega e1 + T2 \cdot \omega e2 \quad (28)$$

As is apparent from the above equations (27) and (28), the first and second rotor-transmitted torques T1 and T2 are expressed, respectively, by the following equations (29) and (30):

$$T1 = \alpha \cdot \frac{3 \cdot b}{4} \cdot \varphi f \cdot I \quad (29)$$

$$T2 = -(\alpha+1) \cdot \frac{3 \cdot b}{4} \cdot \psi f \cdot I \quad (30)$$

Further, from the fact that the electric power supplied to the stator and the mechanical output W are equal to each other (provided that losses are ignored), and from the aforementioned equations (25) and (27), the above-described driving equivalent torque Te is expressed by the following equation (31):

$$Te = \frac{3 \cdot b}{4} \cdot \psi f \cdot I \quad (31)$$

Further, from the above equations (29) to (31), there is obtained the following equation (32):

$$Te = \frac{T1}{\alpha} = \frac{-T2}{(\alpha+1)} \quad (32)$$

The relationship between the torques, expressed by the equation (32), and the relationship between the electrical angular velocities, expressed by the equation (25), are quite the same as the relationship between the torques and the relationship between the rotational speeds, of the sun gear, ring gear and carrier of a planetary gear unit.

Further, as described above, on condition that b=a+c and a−c≠0, there hold the relationship between the electrical angular velocities, expressed by the equation (25) and the relationship between the torques, expressed by the equation (32). The above condition b=a+c is expressed by b=(p+q)/2, i.e. b/q=(1+p/q)/2, assuming that the number of the magnetic poles is represented by p and that of the armature magnetic poles by q. Here, as is apparent from the fact that if p/q=m, b/q=(1+m)/2 is obtained, the satisfaction of the above condition of b=a+c represents that the ratio between the number of the armature magnetic poles, the number of the magnetic poles, and the number of the soft magnetic material elements is 1:m:(1+m)/2. Further, the satisfaction of the above condition of a−c≠0 represents that m≠1.0 holds. According to the first rotating machine of the present invention, the ratio between the number of the armature magnetic poles, the number of the magnetic poles, and the number of the soft magnetic material elements is set to 1:m:(1+m)/2 (m≠1.0), and hence it is understood that there hold the relationship between the electrical angular velocities, expressed by the equation (25) and the relationship between the torques, expressed by the equation (32), and the first rotating machine is properly operated.

As described above, in the first rotating machine, when the rotating magnetic field is generated by supplying electric power to the stator, magnetic force lines are generated in a manner connecting between the aforementioned magnetic poles, the soft magnetic material elements, and the armature magnetic poles, and the action of the magnetism of the magnetic force lines converts the electric power supplied to the stator to motive power. The motive power is output from the first rotor or the second rotor, and there hold the relationship between the electrical angular velocities and the relationship between the torques to hold, as described above. Therefore, when motive power is input to at least one of the first and second rotors in a state where no electric power is supplied to the stator, to thereby cause the same to rotate with respect to the stator, electric power is generated in the stator, and the rotating magnetic field is generated. In this case as well, such magnetic force lines that connect between the magnetic poles, the soft magnetic material elements, and the armature magnetic poles are generated, and the action of the magnetism of the magnetic force lines causes the electrical angular velocity relationship shown in the equation (25) and the torque relationship shown in the equation (32) to hold.

That is, assuming that a torque equivalent to the generated electric power and the magnetic field electrical angular velocity ωmf is referred to as the "electric power-generating equivalent torque", a relationship shown in the equation (32) also holds between this electric power-generating equivalent torque and the first and second rotor-transmitted torques TR1 and TR2. As is apparent from the above, the first rotating machine according to the present invention has the same functions as those of an apparatus formed by combining a planetary gear unit and a general one-rotor-type rotating machine.

Further, differently from the aforementioned conventional case, the first rotating machine can be operated only by a single soft magnetic material element row alone, so that it is possible to attain downsizing and reduction of manufacturing costs of the first rotating machine, and in turn, attain downsizing and reduction of manufacturing costs of the power plant. Furthermore, as is apparent from the equations (25) and (32), by setting α=a/c, i.e. the ratio of the pole pair number of the magnetic poles to the pole pair number of the armature magnetic poles, it is possible to freely set the relationship between the magnetic field electrical angular velocity ωmf, and the first and second rotor electrical angular velocities ωe1 and ωe2, and the relationship between the driving equivalent torque Te (electric power-generating equivalent torque), and the first and second rotor-transmitted torques T1 and T2, and therefore it is possible to enhance the degree of freedom in design of the first rotating machine, and in turn, enhance the degree of freedom in design of the power plant. The same advantageous effects can be obtained also when the number of phases of the coils of the stator is other than the aforementioned value of 3.

With the configuration described above, one of the above-described first and second rotors of the first rotating machine is connected to the output portion of the heat engine, the other thereof is connected to the driven parts, and the rotor of the second rotating machine is connected to the driven parts. Further, the operations of the heat engine and the first and second rotating machines are controlled by the controller. From the above, the driven parts can be driven by the heat engine and the first and second rotating machines, and the output portion can be driven by the first rotating machine.

Further, in starting the heat engine, when the rotational speed of the output portion is not lower than the first predetermined value, the heat engine is started in a state where the rotational speed of the output portion is not increased. With this, when the rotational speed of the output portion is high enough to start the heat engine, it is possible to prevent motive power from being wastefully transmitted to the output portion, and in turn, enhance the efficiency of the power plant. Note that it is assumed that the term "mechanical connection" used in the specification and the claims is intended to encompass not only connecting various types of elements using a shaft, gears, a pulley, a chain, or the like but also directly connecting (direct connection of) the elements using e.g. a shaft, without via a transmission, such as gears.

The invention as claimed in claim 2 is the power plant 1, 1A as claimed in claim 1, wherein in starting the heat engine, when the rotational speed of the output portion is above a second predetermined value (second start-time rotational speed NEST2) higher than the first predetermined value, the heat engine is started in a state where the rotational speed of the output portion is lowered by controlling an operation of the first rotating machine 11 (steps 12 to 14 in FIG. 23, steps 42, 13, 14 in FIG. 35).

With this configuration, in starting the heat engine, when the rotational speed of the output portion of the heat engine is above the second predetermined value, the rotational speed of the output portion is lowered by controlling the operation of the first rotating machine, and in this state, the heat engine is started. As is apparent from the fact that one of the first and second rotors of the first rotating machine is connected to the output portion of the heat engine as described above, and the functions of the first rotating machine, by controlling the operation of the first rotating machine, it is possible to properly lower the rotational speed of the output portion.

Further, in a case where the heat engine is started in a state where the rotational speed of the output portion is relatively high, such as a state in which the rotational speed of the output portion is above the second predetermined value higher than the first predetermined value, it is impossible to obtain a desired output torque. Further, in this case, when the heat engine is an internal combustion engine, there is a fear that exhaust emissions are increased immediately after the start of the heat engine. In such a case, with the configuration described above, the heat engine is started in the state where the rotational speed of the output portion is lowered, and hence it is possible to avoid the above-mentioned inconveniences.

The invention as claimed in claim 3 is the power plant 1, 1A as claimed in claim 2, wherein the heat engine is an internal combustion engine, and the second predetermined value is set based on at least one of exhaust emission characteristics, a fuel consumption ratio, and an output torque of the heat engine.

With this configuration, the heat engine is the internal combustion engine, and the second predetermined value is set based on at least one of the exhaust emissions from the heat engine, and the fuel consumption ratio, and the output torque of the heat engine. This makes it possible to start the heat engine in a state where the rotational speed of the output portion is controlled such that at least one of excellent exhaust emission characteristics, a low fuel consumption ratio, and a desired output torque of the heat engine can be obtained, whereby it is possible to obtain at least one of the excellent exhaust emission characteristics, the low fuel consumption ratio, and the desired output torque, immediately after the start of the heat engine.

The invention as claimed in claim 4 is the power plant 1, 1A as claimed in claim 1, wherein during driving of the driven parts, the controller controls an operation of the second rotating machine 21 such that a demanded driving force demanded by the driven parts is transmitted to the driven parts (step 1 in FIG. 18, step 11 in FIG. 23, step 31 in FIG. 30, step 41 in FIG. 35).

As described hereinabove, the rotor of the second rotating machine is connected to the driven parts, and therefore by controlling the operation of the second rotating machine, it is possible to transmit the motive power of the second rotating machine to the driven parts to drive the driven parts. Further, with the configuration described above, during driving of the driven parts, the operation of the second rotating machine configured as above is controlled such that a demanded driving force is transmitted to the driven parts, whereby it is possible to properly transmit the demanded driving force to the driven parts, and properly drive the driven parts.

The invention as claimed in claim 5 is the power plant 1, 1A as claimed in claim 1, further including a starter 31 for driving the output portion in order to start the heat engine, wherein in starting the heat engine, when the rotational speed of the output portion is lower than the first predetermined value, the controller causes the starter 31 to operate (steps 21, 22 in FIG. 25, steps 21, 22 in FIG. 27), and starts the heat engine in a state where an operation of at least one of the first and second rotating machines 11, 21 is controlled such that a change in speed of the driven parts caused by transmission of a driving force from the starter 31 to the output portion is suppressed (steps 23, 24 in FIG. 25, steps 25, 24 in FIG. 27).

With this configuration, in starting the heat engine, when the rotational speed of the output portion is lower than the first predetermined value, the starter is caused to operate and the heat engine is started in the state where the output portion is driven, and hence it is possible to properly start the heat engine.

Further, as described hereinabove, in the first rotating machine, the first and second rotors are in the state magnetically connected to each other. Therefore, when the heat engine is started, as a driving force is transmitted from the starter to the output portion, the driving force also acts on the driven parts because of the above-described relationship of connections between the various types of component elements. This sometimes results in a change in speed of the driven parts.

With the configuration described above, when the heat engine is started, the operation of at least one of the first and second rotating machines is controlled such that a change in speed of the driven parts caused by transmission of the driving force from the starter to the output portion is suppressed. In this case, as is apparent from the fact that the other of the first and second rotors of the first rotating machine is connected to the driven parts, and the functions of the first rotating machine, when the heat engine is started, by controlling the operation of the first rotating machine as described above, it is possible to suppress a change in speed of the driven parts, and hence it is possible to enhance marketability. Further, since the rotor of the second rotating machine is connected to the driven parts, when the heat engine is started, by controlling the operation of the second rotating machine as described above, it is possible to suppress a change in speed of the driven parts and enhance marketability. Similarly, by controlling the operations of both the first and second rotating machines as described above, it is possible to suppress a change in speed of the driven parts, and enhance marketability.

To attain the above object, the invention as claimed in claim 6 is a power plant 1B for driving driven parts (drive wheels DW and DW in embodiments (the same applies hereinafter in this section)), including a heat engine (engine 3) including an output portion (crankshaft 3a) for outputting motive power, a first rotating machine 11, a second rotating machine 61, and a controller (ECU 2, first PDU 41, second PDU 42, VCU 43) for controlling operations of the heat engine and the first and second rotating machines 11, 61, wherein the first rotating machine 11 comprises a first rotor 14 having a first magnetic pole row that is formed by a predetermined plurality of first magnetic poles (permanent magnets 14a) arranged in a first circumferential direction, and has each two first magnetic poles thereof adjacent to each other so disposed as to have respective polarities different from each other, the first rotor being rotatable in the first circumferential direction, an unmovable first stator 13 having a first armature row (iron core 13a, U-phase to W-phase coils 13c to 13e) that is disposed in a manner opposed to the first magnetic pole row and is for generating a predetermined plurality of first armature magnetic poles to thereby cause a first rotating magnetic field rotating in the first circumferential direction to be generated between the first armature row and the first magnetic pole row, and a second rotor 15 having a first soft magnetic material element row that is formed by a predetermined plurality of first soft magnetic material elements (cores 15a) arranged in the first circumferential direction in a manner spaced from each other, and is disposed between the first magnetic pole row and the first armature row, the second rotor being rotatable in the first circumferential direction, wherein a ratio between the number of the first armature magnetic poles, the number of the first magnetic poles, and the number of the first soft magnetic material elements is set to $1:m:(1+m)/2$ ($m \neq 1.0$), wherein the second rotating machine 61 comprises a third rotor 64 having a second magnetic pole row that is formed by a predetermined plurality of second magnetic poles (permanent magnets 64a) arranged in a second circumferential direction, and has each two second magnetic poles thereof adjacent to each other so disposed as to have respective polarities different from each other, the third rotor being rotatable in the second circumferential direction, an unmovable second stator 63 having a second armature row (iron core 33a, U-phase to W-phase coils 63b) that is disposed in a manner opposed to the second magnetic pole row and is for generating a predetermined plurality of second armature magnetic poles to thereby cause a second rotating magnetic field rotating in the second circumferential direction to be generated between the second armature row and the second magnetic pole row, and a fourth rotor 65 having a second soft magnetic material element row that is formed by a predetermined plurality of second soft magnetic material elements (cores 65a) arranged in the second circumferential direction in a manner spaced from each other, and is disposed between the second magnetic pole row and the second armature row, the fourth rotor being rotatable in the second circumferential direction, wherein a ratio between the number of the second armature magnetic poles, the number of the second magnetic poles, and the number of the second soft magnetic material elements is set to $1:n:(1+n)/2$ ($n \neq 1.0$), wherein the second and third rotors 15, 64 are mechanically connected to the output portion and the first and fourth rotors 14, 65 are mechanically connected to the driven parts, and wherein in starting the heat engine, when a rotational speed of the output portion is not lower than a first predetermined value (first start-time rotational speed NEST1), the heat engine is started by the controller in a state where the rotational speed of the output portion is not increased (steps 2, 4 in FIG. 44, steps 21, 24 in FIG. 52).

With this configuration, since both the first and second rotating machines are constructed similarly to the first rotating machine as claimed in claim 1, they have the same functions as those of the first rotating machine as claimed in claim 1. Therefore, similarly to the first rotating machine as claimed in claim 1, it is possible to attain downsizing and reduction of manufacturing costs of the first and second rotating machines, and in turn, attain downsizing and reduction of manufacturing costs of the power plant. Furthermore, it is possible to enhance the degree of freedom in design of the first and second rotating machines, and in turn, enhance the degree of freedom in design of the power plant.

With the configuration described above, the second rotor of the first rotating machine and the third rotor of the second rotating machine are connected to the output portion of the heat engine, and the first rotor of the first rotating machine and the fourth rotor of the second rotating machine are connected to the driven parts. Further, the operations of the heat engine and the first and second rotating machines are controlled by the controller. With the above, it is possible to drive the driven parts using the heat engine and the first and second rotating machines, and drive the output portion using the first and second rotating machines.

Similarly to the power plant as claimed in claim 1, in starting the heat engine, when the rotational speed of the output portion is not lower than the first predetermined value, the heat engine is started in the state where the rotational speed of the output portion is not increased. With this, when the rotational speed of the output portion is high enough to start the heat engine, it is possible to prevent motive power from being wastefully transmitted to the output portion, and in turn, enhance the efficiency of the power plant.

The invention as claimed in claim 7 is the power plant 1B as claimed in claim 6, wherein in starting the heat engine, when the rotational speed of the output portion is above a second predetermined value (second start-time rotational speed NEST2) higher than the first predetermined value, the controller starts the heat engine in a state where the rotational speed of the output portion is lowered by controlling an operation of the first rotating machine 11 (steps 12 to 14 in FIG. 50).

With this configuration, in starting the heat engine, when the rotational speed of the output portion is above the second predetermined value, the rotational speed of the output portion is lowered by controlling the operation of the first rotating machine, and in this state, the heat engine is started. As is apparent from the fact that the second rotor of the first rotating machine is connected to the output portion as described above, and the functions of the first rotating machine, by controlling the operation of the first rotating machine, it is possible to properly lower the rotational speed of the output portion. In this case, as is apparent from the fact that the first rotating machine is constructed similarly to the first rotating machine as claimed in claim 1, and the aforementioned equation (25), the first rotating magnetic field and the first and second rotors rotate while maintaining a collinear relationship in rotational speed therebetween, and in a collinear chart representing the collinear relationship, straight lines representing the rotational speeds of the first rotating magnetic field and the second rotor are adjacent to each other. Further, since such the second rotor is connected to the output portion, it is possible to properly and easily perform the above-described control of the operation of the first rotating machine.

Further, as described in the description as to claim 2, when the heat engine is started in a state where the rotational speed of the output portion is relatively high, such as a state in which the rotational speed of the output portion is above the second predetermined value higher than the first predetermined value, it is impossible to obtain a desired output torque. Further, in this case, when the heat engine is an internal combustion engine, there is a fear that exhaust emissions are increased immediately after the start of the heat engine. With the configuration described above, in such a case, the heat engine is started in the state where the rotational speed of the output portion is lowered, and hence it is possible to avoid such inconveniences as described above.

The invention as claimed in claim 8 is the power plant 1B as claimed in claim 7, wherein the heat engine is an internal combustion engine, and the second predetermined value is set based on at least one of exhaust emission characteristics, a fuel consumption ratio, and an output torque of the heat engine.

With this configuration, the heat engine is an internal combustion engine, and the second predetermined value is set based on at least one of the exhaust emission characteristics, the fuel consumption ratio, and the output torque of the heat engine. Similarly to the power plant as claimed in claim 3, this makes it possible to start the heat engine in the state where the rotational speed of the output portion is controlled such that at least one of the excellent exhaust emission characteristics, low fuel consumption ratio, and desired output torque of the engine can be obtained, whereby it is possible to obtain at least one of the excellent exhaust emission characteristics, the low fuel consumption ratio, and the desired output torque immediately after the start of the heat engine.

The invention as claimed in claim 9 is the power plant 1B as claimed in claim 6, wherein during driving of the driven parts, the controller controls an operation of the second rotating machine 61 such that a demanded driving force demanded by the driven parts is transmitted to the driven parts (step 51 in FIG. 44, step 61 in FIG. 50).

As described above, as is apparent from the fact that the fourth rotor of the second rotating machine is connected to the driven parts and the functions of the second rotating machine, by controlling the operation of the second rotating machine, it is possible to drive the driven parts. Further, with the configuration described above, during driving of the driven parts, the operation of the second rotating machine configured as above is controlled such that the demanded driving force is transmitted to the driven parts. Therefore, it is possible to properly transmit the demanded driving force to the driven parts, and properly drive the driven parts. In this case, as is apparent from the fact that the second rotating machine is constructed similarly to the first rotating machine as claimed in claim 1, and the aforementioned equation (25), the second rotating magnetic field and the third and fourth rotors rotate while maintaining a collinear relationship in rotational speed therebetween, and in a collinear chart representing the collinear relationship, straight lines representing the rotational speeds of the second rotating magnetic field and the fourth rotor are adjacent to each other. Further, since such the fourth rotor is connected to the driven parts, it is possible to properly and easily perform the above-described control of the operation of the second rotating machine.

The invention as claimed in claim 10 is the power plant 1B as claimed in claim 6, further including a starter 31 for driving the output portion in order to start the heat engine, wherein in starting the heat engine, when the rotational speed of the output portion is lower than the first predetermined value, the controller causes the starter 31 to operate (steps 21, 22 in FIG. 52), and starts the heat engine in a state where an operation of the second rotating machine 61 is controlled such that a change in speed of the driven parts caused by transmission of a driving force from the starter 31 to the output portion is suppressed (steps 71, 24 in FIG. 52).

With this configuration, in starting the heat engine, when the rotational speed of the output portion is lower than the first predetermined value, the starter is caused to operate, and the heat engine is started in the state where the output portion is driven, and hence it is possible to properly start the heat engine.

Further, similarly to the first rotating machine as claimed in claim 1, in the first rotating machine, the first and second rotors are in the state magnetically connected to each other, and in the second rotating machine, the third and fourth rotors are in the state magnetically connected to each other. Therefore, when the heat engine is started, as a driving force is transmitted from the starter to the output portion, the driving force also acts on the driven parts because of the above-described relationship of connections between the various types of component elements. This sometimes results in a change in speed of the driven parts.

With the configuration described above, when the heat engine is started, the operation of the second rotating machine is controlled such that a change in speed of the driven parts caused by transmission of the driving force from the starter to the output portion is suppressed. In this case, as is apparent from the fact that the fourth rotor of the second rotating machine is connected to the driven parts, and the functions of the second rotating machine, when the heat engine is started, by controlling the operation of the second rotating machine as described above, it is possible to suppress a change in speed of the driven parts, and therefore it is possible to enhance marketability. In this case, as described in the description as to claim 9, straight lines representing the rotational speeds of the second rotating magnetic field and the fourth rotor are adjacent to each other in the collinear chart representing the relationship between the rotational speeds, and such the fourth rotor is connected to the driven parts. Therefore, it is possible to properly and easily perform the above-described control of the operation of the second rotating machine.

To attain the above object, the invention as claimed in claim 11 is a power plant 1C for driving driven parts (drive wheels DW and DW in embodiments (the same applies hereinafter in this section)), including a heat engine (engine 3) including an output portion (crankshaft 3a) for outputting motive power, a first rotating machine 11, a second rotating machine 21 capable of converting supplied electric power to motive power and outputting the motive power from a rotor 23 thereof, and also capable of converting motive power input to the rotor 23 to electric power, a power transmission mechanism (planetary gear unit PG) including a first element (sun gear S), a second element (carrier C), and a third element (ring gear R) that are capable of transmitting motive power therebetween, the first to third elements being configured to rotate during transmission of the motive power while maintaining a collinear relationship in rotational speed therebetween, with straight lines representing respective rotational speeds of the first to third elements being sequentially aligned in a collinear chart representing the collinear relationship in rotational speed, and a controller (ECU 2, VCU 43, first PDU 41, second PDU 42) for controlling operations of the heat engine and the first and second rotating machines 11, 21, wherein the first rotating machine 11 comprises a first rotor 14 having a magnetic pole row that is formed by a predetermined plurality of magnetic poles (permanent magnets 14a) arranged in a circumferential direction, and has each two magnetic poles thereof adjacent to each other so disposed as to have respective polarities different from each other, the first rotor being rotatable in the circumferential direction, an unmovable stator (first stator 13) having an armature row (iron core 13a, U-phase to W-phase coils 13c to 13e) that is disposed in a manner opposed to the magnetic pole row and is for generating a predetermined plurality of armature magnetic poles to thereby cause a rotating magnetic field rotating in the circumferential direction to be generated between the armature row and the magnetic pole row, and a second rotor 15 having a soft magnetic material element row that is formed by a predetermined plurality of soft magnetic material elements (cores 15*a*) arranged in the circumferential direction in a manner spaced from each other, and is disposed between the magnetic pole row and the armature row, the second rotor being rotatable in the circumferential direction, wherein a ratio between the number of the armature magnetic poles, the number of the magnetic poles, and the number of the soft magnetic material elements is set to 1:m:(1+m)/2 (m≠1.0), wherein one of a combination of the first rotor 14 and the second element and a combination of the second rotor 15 and the first element are mechanically connected to the output portion whereas the other of the combination of the first rotor 14 and the second element and the combination of the second rotor 15 and the first element are mechanically connected to the driven parts, and the third element is mechanically connected to the rotor 23, and wherein in starting the heat engine, when a rotational speed of the output portion is not lower than a first predetermined value (first start-time rotational speed NEST1), the heat engine is started by the controller in a state where the rotational speed of the output portion is not increased (steps 2, 4 in FIG. 56, steps 21, 24 in FIG. 64).

According to this power plant, since the first rotating machine is constructed similarly to the first rotating machine as claimed in claim 1, the first rotating machine has the same functions as those of the first rotating machine as claimed in claim 1. Therefore, similarly to the first rotating machine as claimed in claim 1, it is possible to attain downsizing and reduction of manufacturing costs of the first rotating machine and in turn, attain downsizing and reduction of manufacturing costs of the power plant. Furthermore, it is possible to enhance the degree of freedom in design of the first rotating machine, and in turn enhance the degree of freedom in design of the power plant.

With the arrangement described above, the first to third elements are configured to rotate during transmission of motive power therebetween while maintaining a collinear relationship in rotational speed therebetween, with straight lines representing respective rotational speeds of the first to third elements being sequentially aligned in a collinear chart representing the collinear relationship in rotational speed. Further, one of the combination of the first rotor of the first rotating machine and the second element and the combination of the second rotor of the first rotating machine and the first element are connected to the output portion of the heat engine whereas the other of the combination of the first rotor and the second element and the combination of the second rotor and the first element are connected to the driven parts, and the third element is connected to the rotor of the second rotating machine. Further, the operations of the heat engine and the first and second rotating machines are controlled by the controller. With the above, it is possible to drive the driven parts by the heat engine and the first and second rotating machines and drive the output portion by the first and second rotating machines.

Furthermore, similarly to the power plant as claimed in claim 1, in starting the heat engine, when the rotational speed of the output portion is not lower than the first predetermined value, the heat engine is started in the state where the rotational speed of the output portion is not increased. With this, when the rotational speed of the output portion is high enough to start the heat engine, it is possible to prevent motive power from being wastefully transmitted to the output portion, and in turn, enhance the efficiency of the power plant.

The invention as claimed in claim 12 is the power plant 1C as claimed in claim 11, wherein in starting the heat engine, when the rotational speed of the output portion is above a second predetermined value (second start-time rotational speed NEST2) higher than the first predetermined value, the controller starts the heat engine in such a manner that the rotational speed of the output portion is lowered, and when the combination of the first rotor 14 and the second element are mechanically connected to the output portion, in a state where an operation of the second rotating machine 21 is controlled, whereas when the combination of the second rotor 15 and the first element are mechanically connected to the output portion, in a state where an operation of the first rotating machine 11 is controlled (steps 12 to 14 in FIG. 62).

Hereafter, the power plant in which the first rotor of the first rotating machine and the second element are connected to the output portion of the heat engine, and the second rotor of the first rotating machine and the first element are connected to the driven parts is referred to as the "first power plant", and the power plant in which the second rotor and the first element are connected to the output portion, and the first rotor and the second element are connected to the driven parts is referred to as the "second power plant".

With the arrangement described above, in the above-described first power plant, in starting the heat engine, when the rotational speed of the output portion is above the second predetermined value, by controlling the operation of the second rotating machine, the rotational speed of the output portion is lowered, and in this state, the heat engine is started. In this case, as is apparent from the aforementioned arrangement, the second rotating machine can output a driving force or a braking force from the rotor. As is apparent from this and the fact that the second and third elements, which are capable of transmitting motive power therebetween as described above, are connected to the output portion and the rotor, respectively, it is possible to properly lower the rotational speed of the output portion, by controlling the operation of the second rotating machine. In this case, as described hereinabove, the straight lines representing the respective rotational speeds of the second and third elements are adjacent to each other in the collinear chart representing the relationship between the rotational speeds of them, so that the driving force or the braking force from the second rotating machine acts more directly on the second element than on the first element, whereby it is possible to properly and easily perform the above-described control of the operation of the second rotating machine.

Further in the above-mentioned second power plant, in starting the heat engine, when the rotational speed of the output portion of the heat engine is above the second predetermined value, the rotational speed of the output portion is lowered by controlling the operation of the first rotating machine, and in this state, the heat engine is started. As described hereinabove, as is apparent from the fact that the second rotor is connected to the output portion, and the functions of the first rotating machine, by controlling the operation of the first rotating machine, it is possible to properly lower the rotational speed of the output portion. In this case, as is apparent from the fact that the first rotating machine is constructed similarly to the first rotating machine as claimed in claim 1, and the aforementioned equation (25), the rotating magnetic field and the first and second rotors rotate while maintaining the collinear relationship in rotational speed therebetween, and the straight lines representing the rotational speeds of the rotating magnetic field and the second rotor are adjacent to each other in the collinear chart representing the relationship between the rotational speeds. Further, since such the second rotor is connected to the output portion, it is possible to properly and easily perform the above-described control of the operation of the first rotating machine.

Further, as described in the description as to claim 2, when the heat engine is started in the state where the rotational speed of the output portion is relatively high, such as a state in which the rotational speed of the output portion is above the second predetermined value higher than the first predetermined value, it is impossible to obtain a desired output torque. Further, in this case, when the heat engine is an internal combustion engine, there is a fear that exhaust emissions are increased immediately after the start of the heat engine. With the configuration described above, in such a case, in both the first and second power plants, the heat engine is started in the state where the rotational speed of the output portion is lowered, and hence it is possible to avoid such inconveniences as described above.

The invention as claimed in claim 13 is the power plant 1C as claimed in claim 12, wherein the heat engine is an internal combustion engine, and the second predetermined value is set based on at least one of exhaust emission characteristics, a fuel consumption ratio, and an output torque of the heat engine.

With this configuration, the heat engine is an internal combustion engine, and the second predetermined value is set based on at least one of the exhaust emission characteristics, the fuel consumption ratio, and the output torque of the heat engine. With this, similarly to the power plant as claimed in claim 3, it is possible to start the heat engine in the state where the rotational speed of the output portion is controlled such that at least one of the excellent exhaust emission characteristics, low fuel consumption ratio, and desired output torque of the heat engine can be obtained, whereby it is possible to obtain at least one of the excellent exhaust emission characteristics, the low fuel consumption ratio, and the desired output torque, immediately after the start of the heat engine.

The invention as claimed in claim 14 is the power plant 1C as claimed in claim 11, wherein during driving of the driven parts, in order that a demanded driving force demanded by the driven parts is transmitted to the driven parts, the controller controls an operation of the first rotating machine 11 when the combination of the first rotor 14 and the second element are mechanically connected to the output portion, and controls an operation of the second rotating machine 21 when the combination of the second rotor 15 and the first element are mechanically connected to the output portion (step 81 in FIG. 56, step 91 in FIG. 62).

In the first power plant, as is apparent from the fact that the second rotor of the first rotating machine is connected to the driven parts as described above, and the functions of the first rotating machine, by controlling the operation of the first rotating machine, it is possible to drive the driven parts. Further, with the configuration described above, during driving of the driven parts, the operation of the first rotating machine configured as above is controlled such that the demanded driving force is transmitted to the driven parts, and hence it possible to properly transmit the demanded driving force to the driven parts, and properly drive the driven parts. In this case, as described in the description as to claim 12, the straight lines representing the rotational speeds of the rotating magnetic field and the second rotor are adjacent to each other in the collinear chart representing the relationship between the rotational speeds, and such the second rotor is connected to the driven parts, so that it is possible to properly and easily perform the above-described control of the operation of the first rotating machine.

Further, in the second power plant, as is apparent from the fact that the second and third elements, which are capable of transmitting motive power therebetween, are connected to the driven parts and the rotor of the second rotating machine, respectively, it is possible to drive the driven parts by controlling the operation of the second rotating machine. Furthermore, with the configuration described above, during driving of the driven parts, the operation of such the second rotating machine is controlled such that the demanded driving force is transmitted to the driven parts, and hence it possible to properly transmit the demanded driving force to the driven parts, and properly drive the driven parts. In this case, as described in the description as to claim 12, the straight lines representing the respective rotational speeds of the second and third elements are adjacent to each other in the collinear chart representing the relationship between the rotational speeds of them, so that the driving force or the braking force from the second rotating machine acts more directly on the second element than on the first element, whereby it is possible to properly and easily perform the above-described control of the operation of the second rotating machine.

The invention as claimed in claim 15 is the power plant 1C as claimed in claim 11, further including a starter 31 for driving the output portion in order to start the heat engine, wherein in starting the heat engine, when the rotational speed of the output portion is lower than the first predetermined value, the controller causes the starter to operate (steps 21, 22 in FIG. 64), and starts the heat engine such that a change in speed of the driven parts caused by transmission of a driving force from the starter 31 to the output portion is suppressed, when the combination of the first rotor 14 and the second element are mechanically connected to the output portion, in a state where an operation of the first rotating machine 11 is controlled, whereas when the combination of the second rotor 15 and the first element are mechanically connected to the output portion, in a state where an operation of the second rotating machine 21 is controlled (steps 24, 101 in FIG. 64).

With this configuration, in starting the heat engine, when the rotational speed of the output portion is lower than the first predetermined value, the starter is operated and the heat engine is started in the state where the output portion is driven. This makes it possible to properly start the heat engine. Further, the first to third elements are configured to be capable of transmitting motive power therebetween, and similarly to the first rotating machine as claimed in claim 1, in the first rotating machine, the first and second rotors are in the state magnetically connected to each other. Therefore, when the heat engine is started, as a driving force is transmitted from the starter to the output portion, the driving force also acts on the driven parts because of the above-described relationship of connections between the various types of component elements. This can result in a change in speed of the driven parts.

With the configuration described above, in the first power plant, when the heat engine is started, the operation of the first rotating machine is controlled to suppress a change in speed of the driven parts caused by transmission of the driving force from the starter to the output portion. In this case, as is apparent from the fact that the second rotor of the first rotating machine is connected to the driven parts, and the functions of the first rotating machine, when the heat engine is started, by controlling the operation of the first rotating machine as described above, it is possible to suppress a change in speed of the driven parts, and therefore it is possible to enhance marketability. Further, as described in the description as to claim 12, the straight lines representing the rotational speeds of the rotating magnetic field and the second rotor are adjacent to each other in the collinear chart representing the relationship between the rotational speeds, and such the second rotor is connected to the driven parts. Therefore, it is possible to properly and easily perform the above-described control of the operation of the first rotating machine.

Further, in the second power plant, when the heat engine is started, the operation of the second rotating machine is controlled to suppress a change in speed of the driven parts caused by transmission of the driving force to the output portion. In this case, as is apparent from the fact that the second and third elements, which are capable of transmitting motive power therebetween, are connected to the driven parts and the rotor of the second rotating machine, respectively, when the heat engine is started, by controlling the operation of the second rotating machine as described above, it is possible to suppress a change in speed of the driven parts, and therefore it is possible to enhance marketability. Further, as described in the description as to claim 12, the straight lines representing the rotational speeds of the second and third elements are adjacent to each other in the collinear chart representing the relationship between the rotational speeds of them, so that the driving force or the braking force from the second rotating machine acts more directly on the second element than on the first element, whereby it is possible to properly and easily perform the above-described control of the operation of the second rotating machine.

BRIEF DESCRIPTION OF DRAWINGS

FIG. 1 A schematic view of a power plant according to a first embodiment of the present invention together with drive wheels to which the power plant is applied.

FIG. 9 Diagrams illustrating a continuation of the operation illustrated in FIG. 8.

FIG. 10 A diagram illustrating a positional relationship between first armature magnetic poles and cores in a case where the first armature magnetic poles have rotated through an electrical angle of $2\pi$ from the state shown in FIG. 7.

FIG. 25 A flowchart of a process executed by the power plant shown in FIG. 1, which is different from the processes in FIGS. 18 and 23.

1 and the relationship between the torques thereof, during execution of the process shown in FIG. 25.

Figure 18:
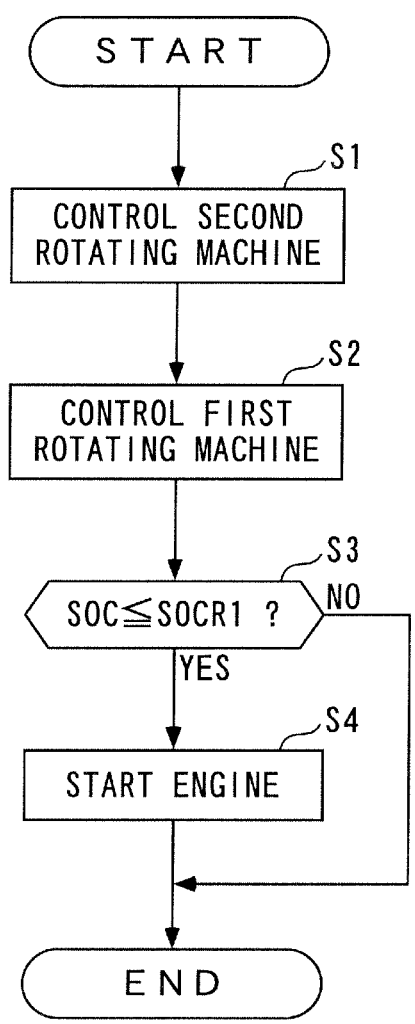
FIG. 18 A flowchart of a process executed by the power plant shown in FIG. 1.
Figure 23:
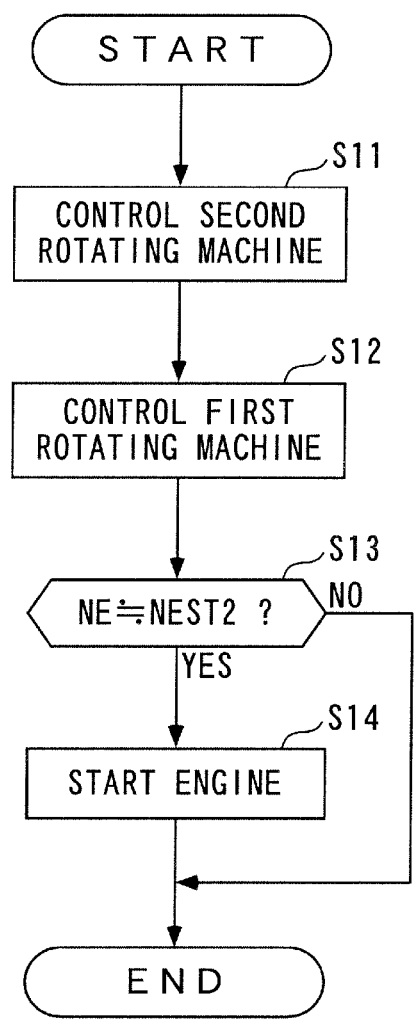
FIG. 23 A flowchart of a process executed by the power plant shown in FIG. 1, which is different from the process in FIG. 18.
Figure 27:
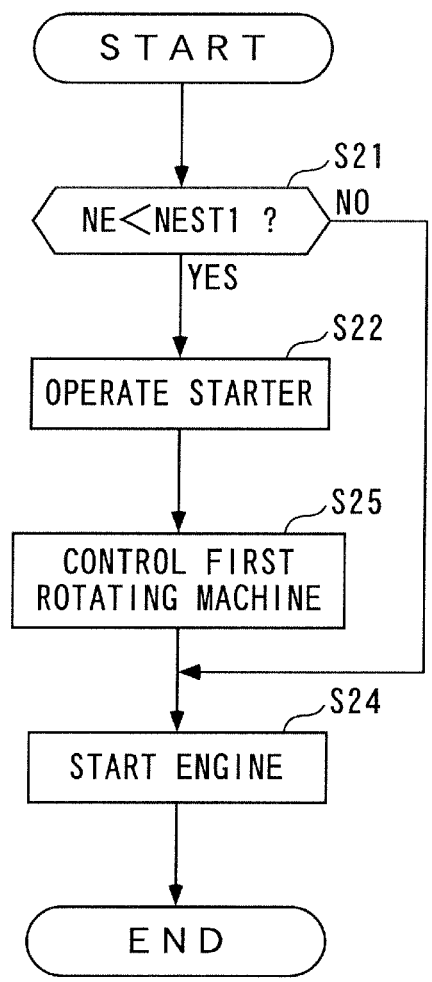

FIG. 27 A flowchart of a process executed by the power plant shown in FIG. 1, which is different from the processes in FIGS. 18, 23 and 25.

Figure 28:
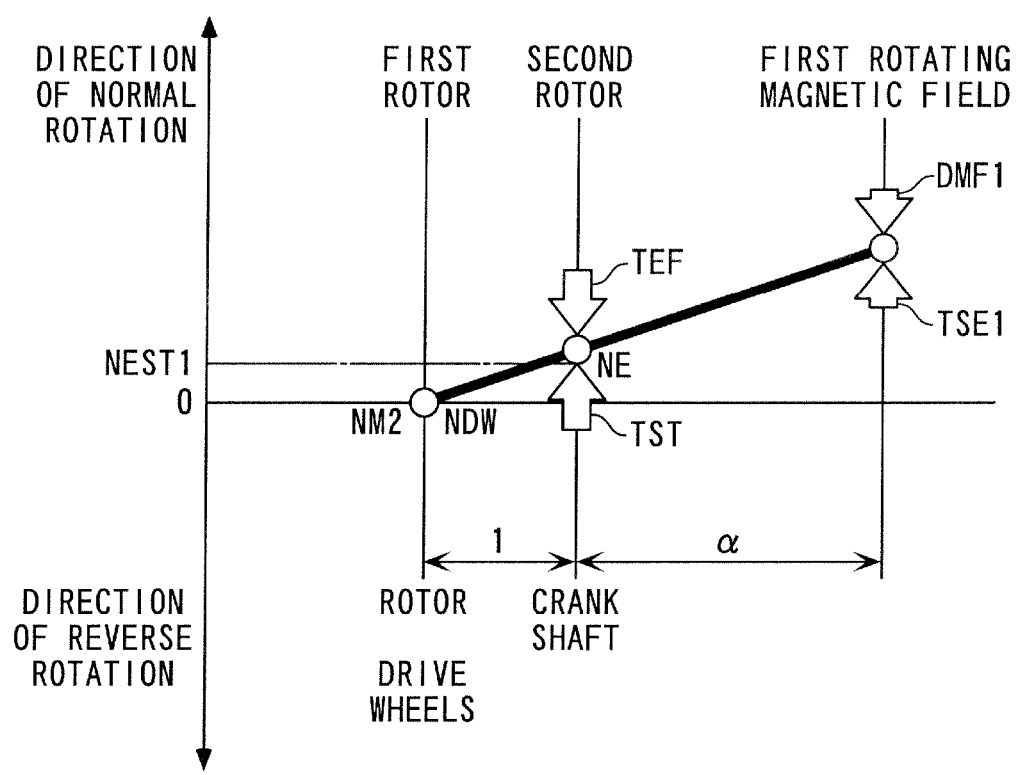

FIG. 28 A velocity collinear chart illustrating an example of the relationship between the rotational speeds of the various types of rotary elements of the power plant shown in FIG. 1 and the relationship between the torques thereof, during execution of the process shown in FIG. 27.

Figure 29:
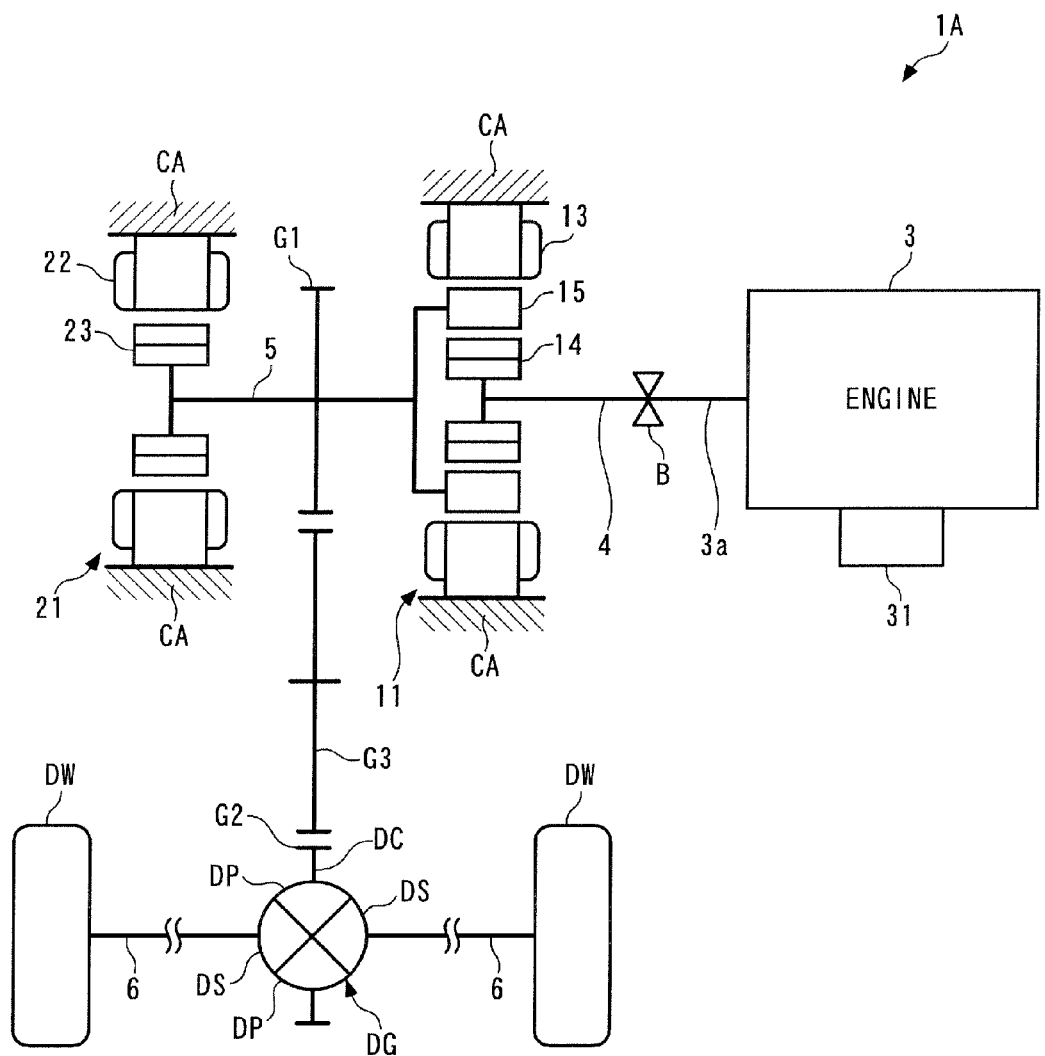

FIG. 29 A schematic view of a power plant according to a second embodiment of the present invention together with drive wheels to which the power plant is applied.

Figure 30:
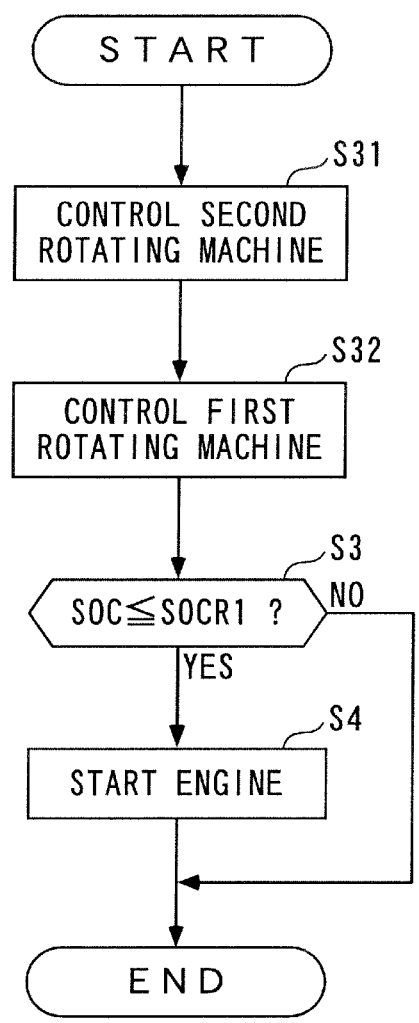

FIG. 30 A flowchart of a process executed by the power plant shown in FIG. 29.

Figure 31:
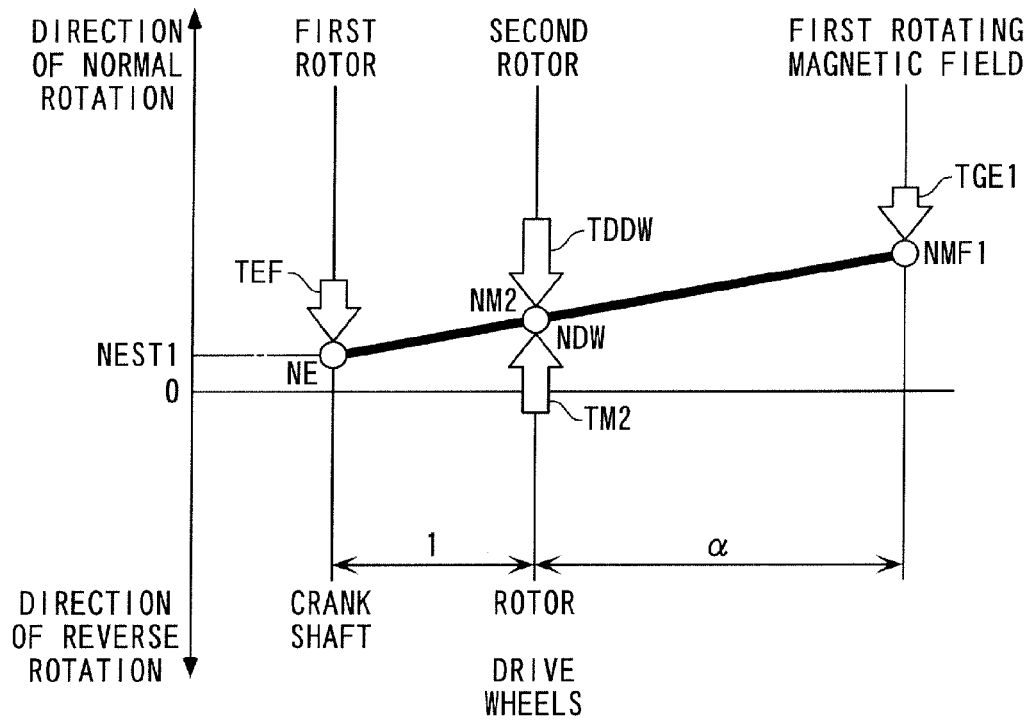

FIG. 31 A velocity collinear chart illustrating an example of the relationship between the rotational speeds of various types of rotary elements of the power plant shown in FIG. 29 and the relationship between torques thereof, during execution of the process shown in FIG. 30.

Figure 32:
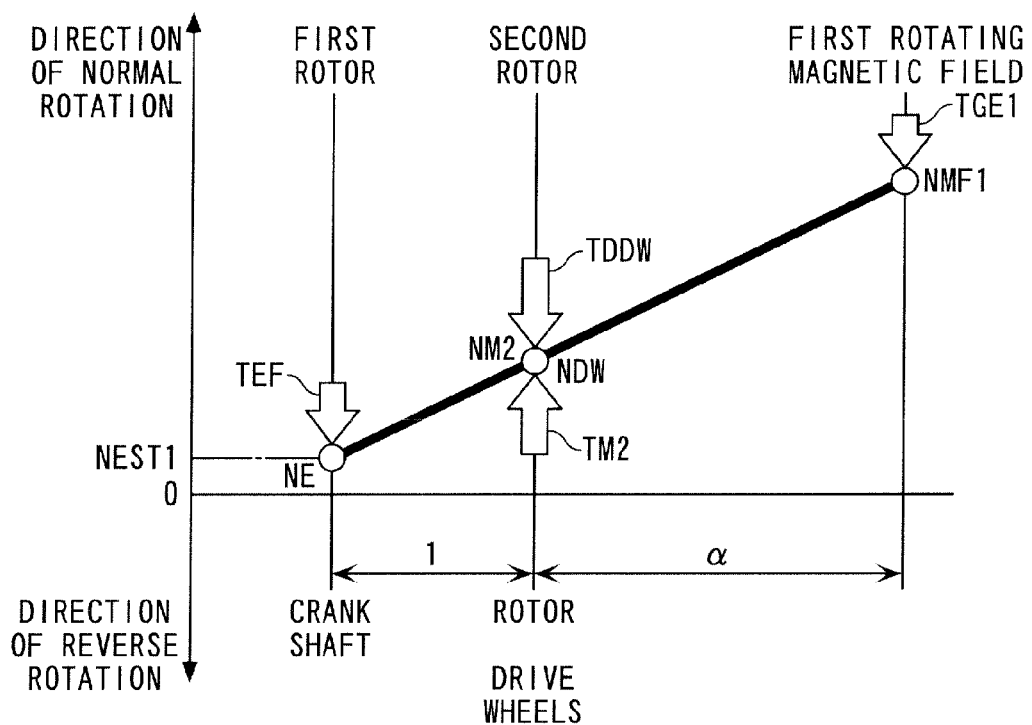

FIG. 32 A velocity collinear chart illustrating an example of the relationship between the rotational speeds of the various types of rotary elements of the power plant shown in FIG. 29 and the relationship between the torques thereof, during execution of the process shown in FIG. 30 but in a situation different from FIG. 31.

Figure 33:
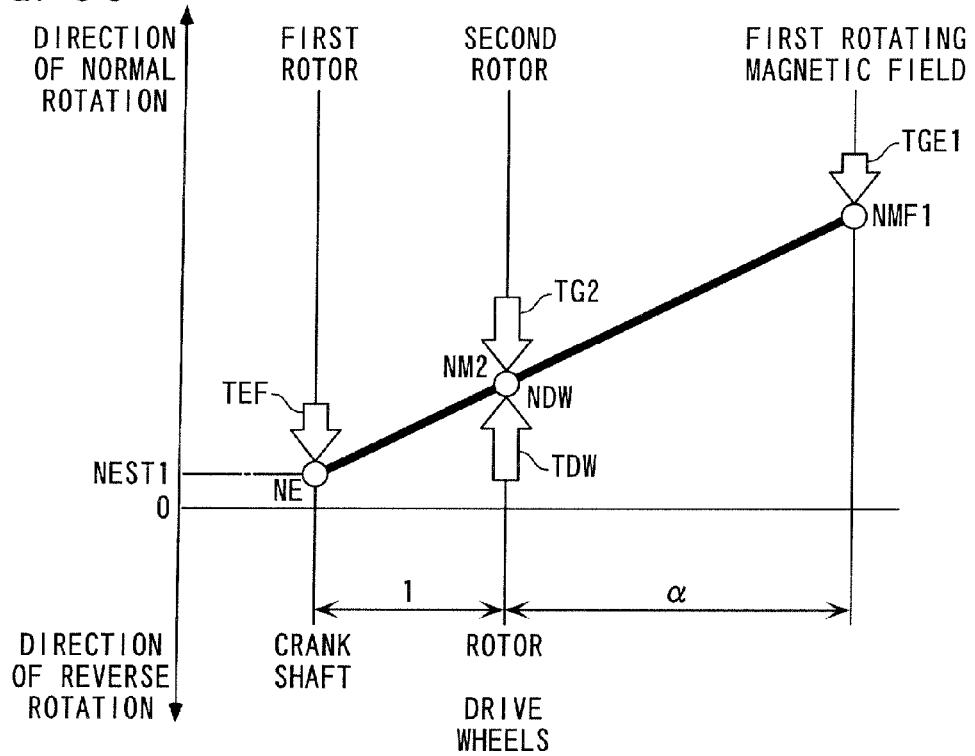

FIG. 33 A velocity collinear chart illustrating an example of the relationship between the rotational speeds of the various types of rotary elements of the power plant shown in FIG. 29 and the relationship between the torques thereof, during decelerating traveling of the vehicle.

Figure 34:
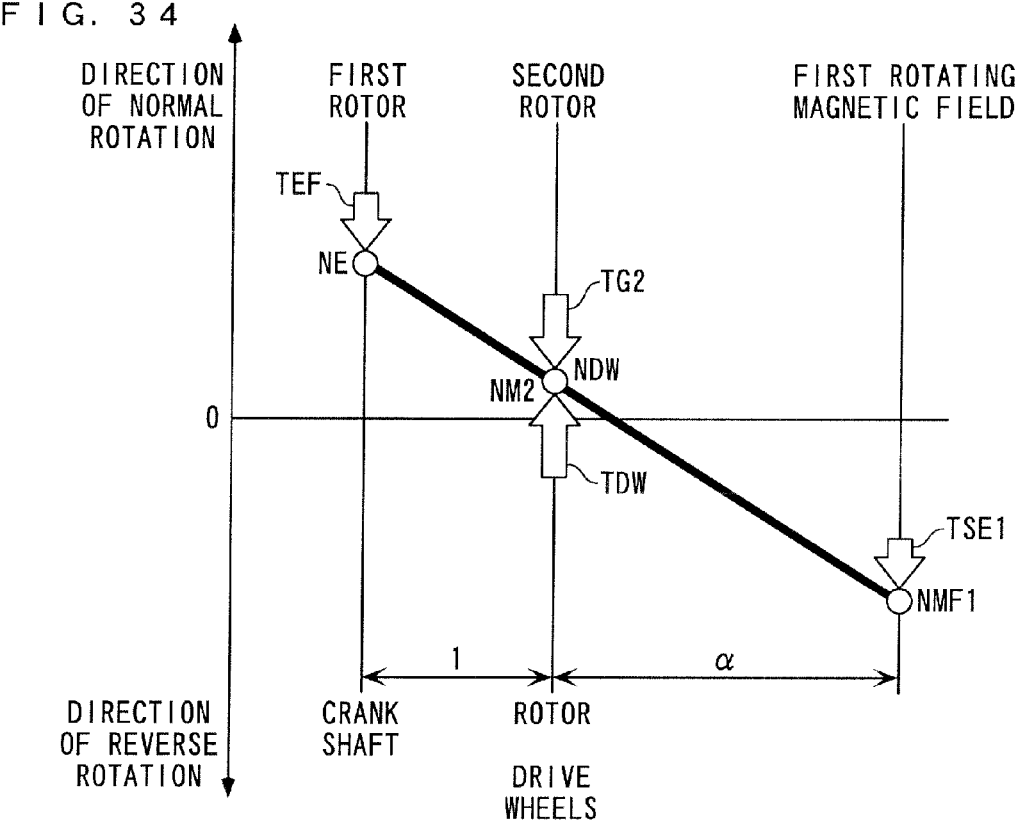

FIG. 34 A velocity collinear chart illustrating an example of the relationship between the rotational speeds of the various types of rotary elements of the power plant shown in FIG. 29 and the relationship between the torques thereof, during decelerating traveling of the vehicle but in a situation different from FIG. 33.

Figure 35:
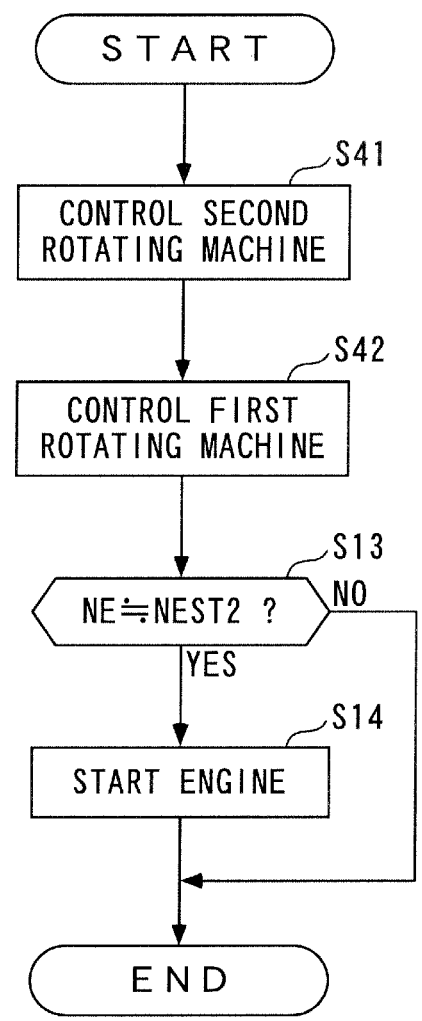

FIG. 35 A flowchart of a process executed by the power plant shown in FIG. 29, which is different from the process in FIG. 30.

Figure 36:
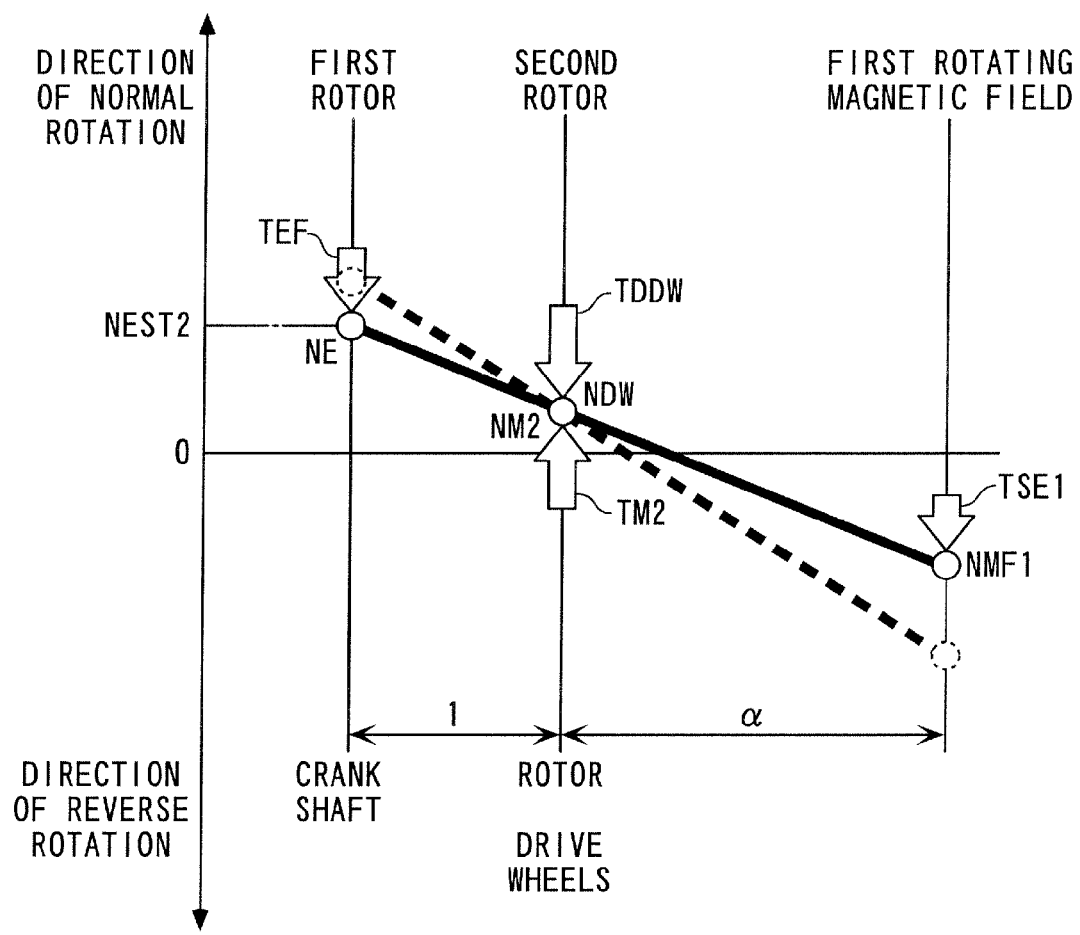

FIG. 36 A velocity collinear chart illustrating an example of the relationship between the rotational speeds of the various types of rotary elements of the power plant shown in FIG. 29 and the relationship between the torques thereof, during execution of the process shown in FIG. 35.

Figure 37:
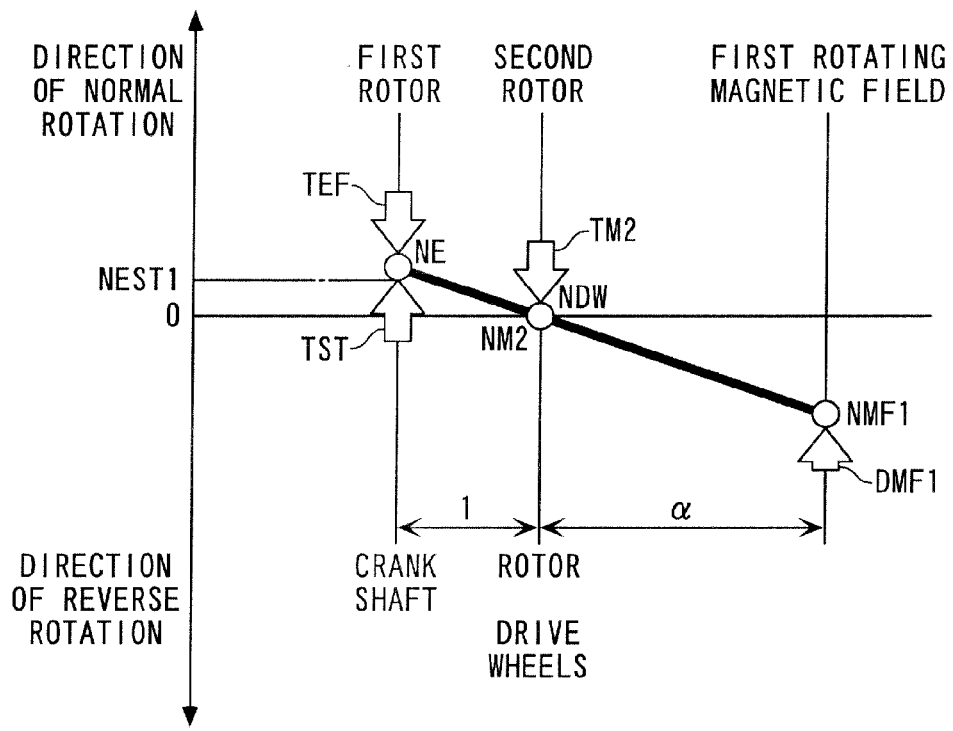

FIG. 37 A velocity collinear chart illustrating an example of the relationship between the rotational speeds of the various types of rotary elements of the power plant shown in FIG. 29 and the relationship between torques thereof, during execution of a process which is different from the processes in FIGS. 30 and 35.

Figure 38:
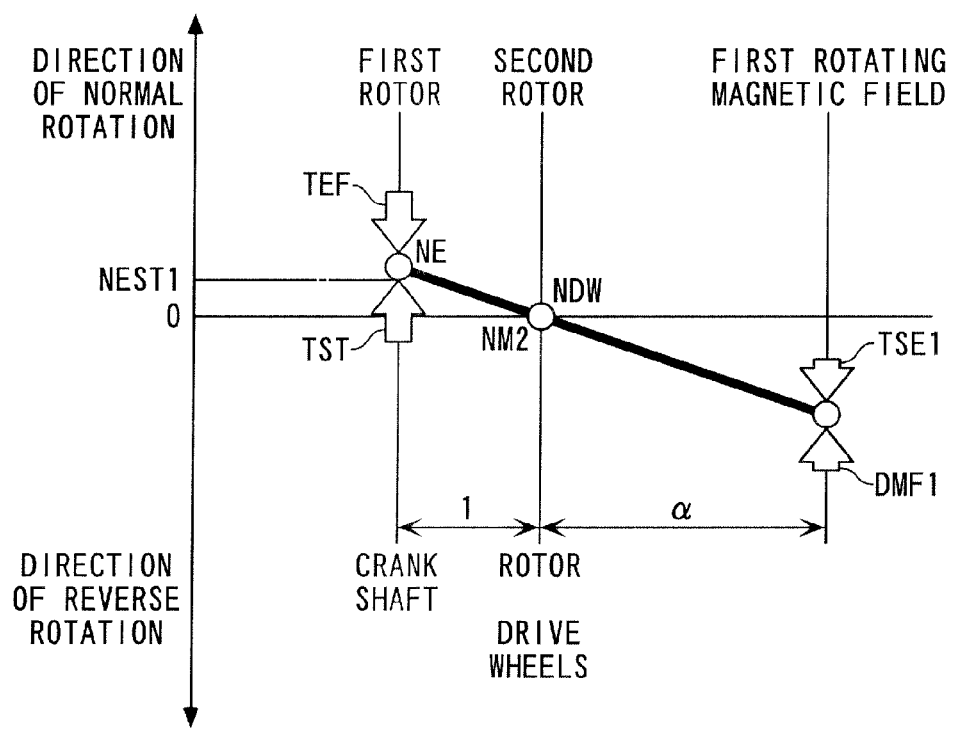

FIG. 38 A velocity collinear chart illustrating an example of the relationship between the rotational speeds of the various types of rotary elements of the power plant shown in FIG. 29 and the relationship between torques thereof, during execution of a process which is different from the processes in FIGS. 30, 35 and 37.

Figure 39:
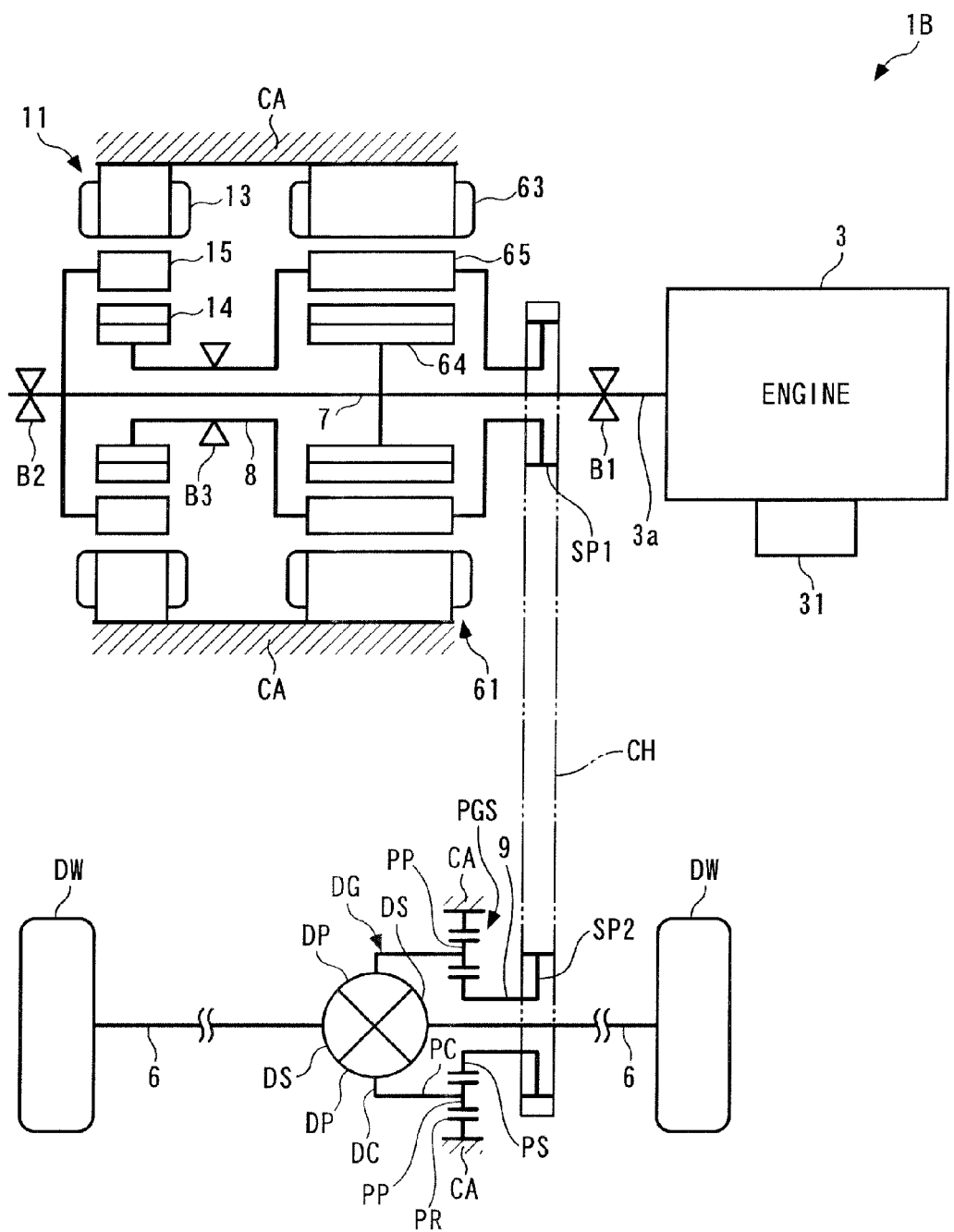

FIG. 39 A schematic view of a power plant according to a third embodiment of the present invention together with drive wheels to which the power plant is applied.

Figure 40:
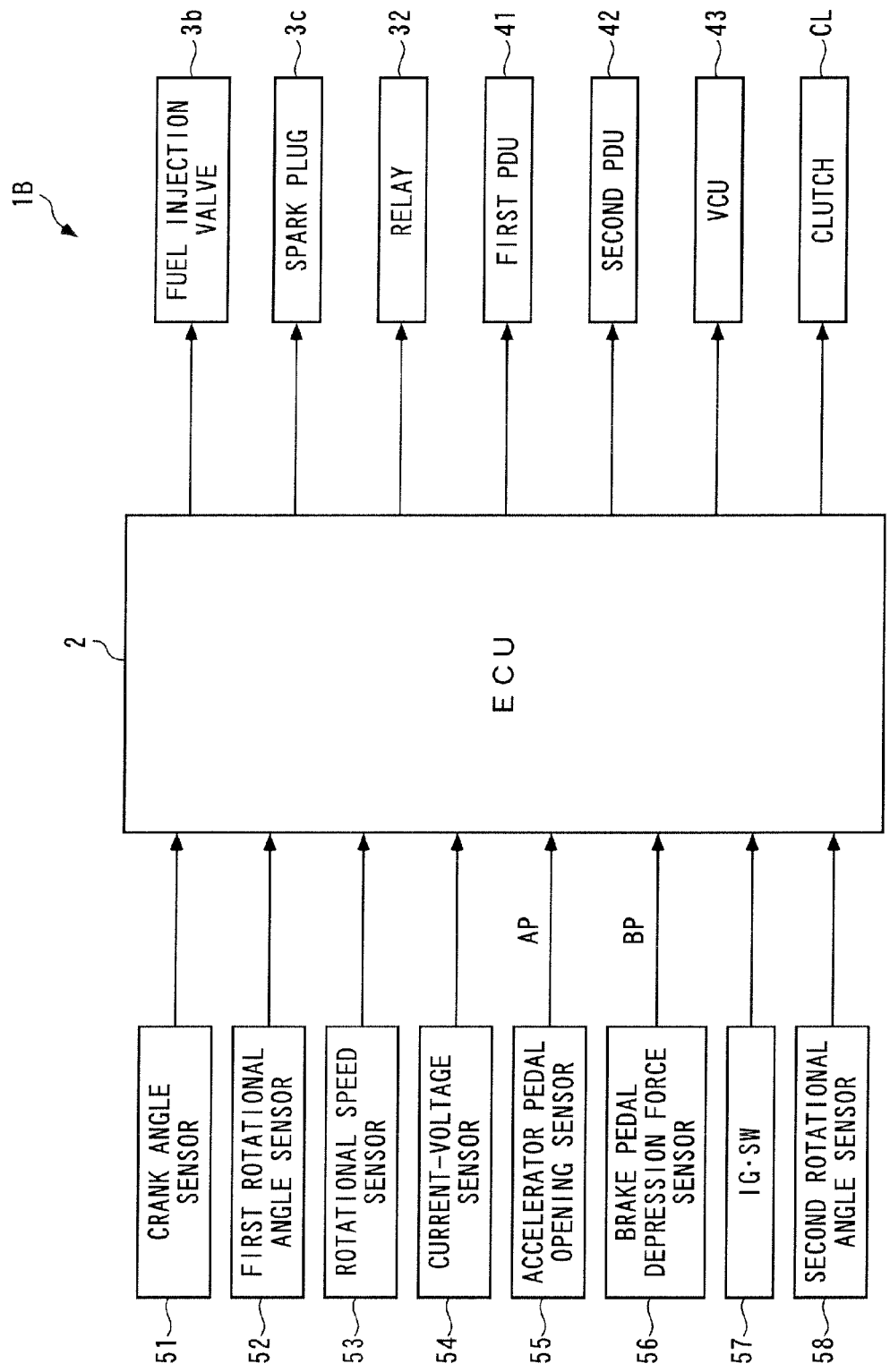

FIG. 40 A block diagram showing an ECU etc. included in the power plant shown in FIG. 1.

Figure 41:
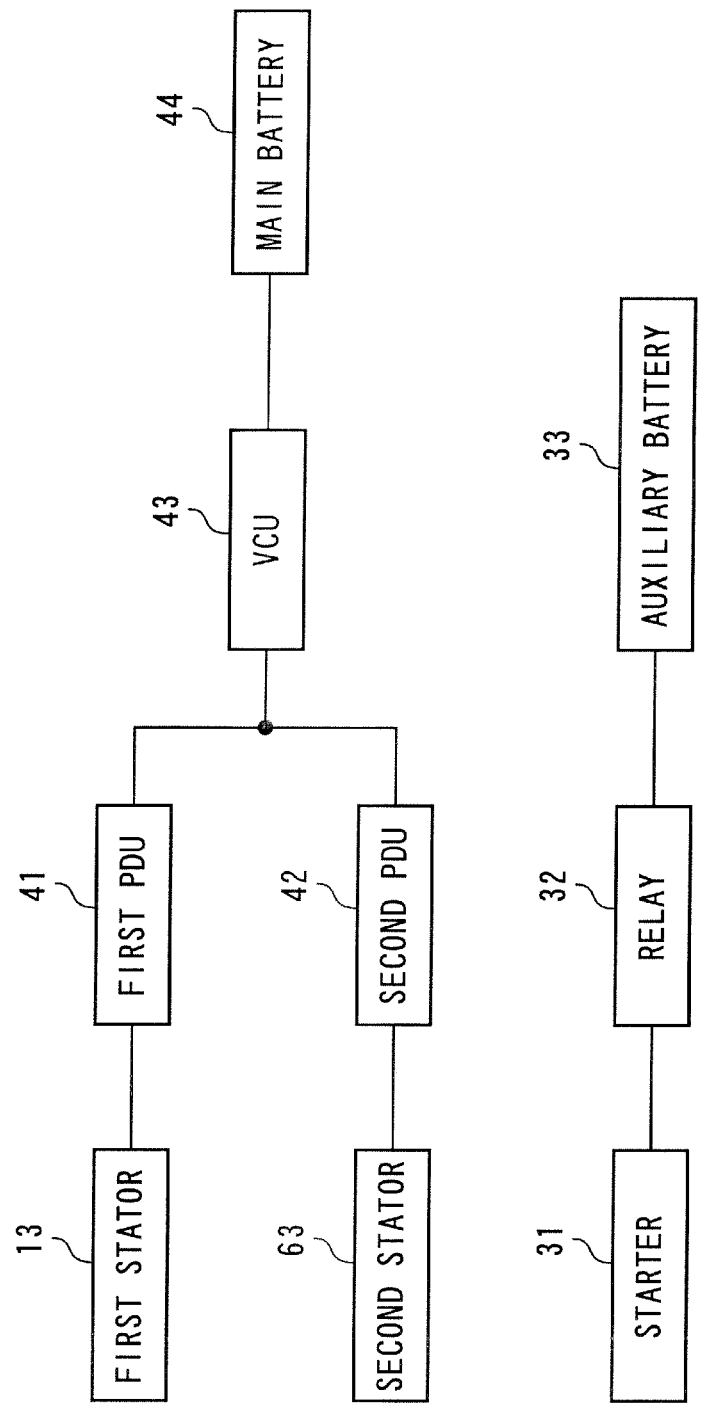

FIG. 41 A block diagram showing a relationship of connections between a first stator, a second stator, a main battery, and so forth, included in the power plant shown in FIG. 39.

Figure 42:
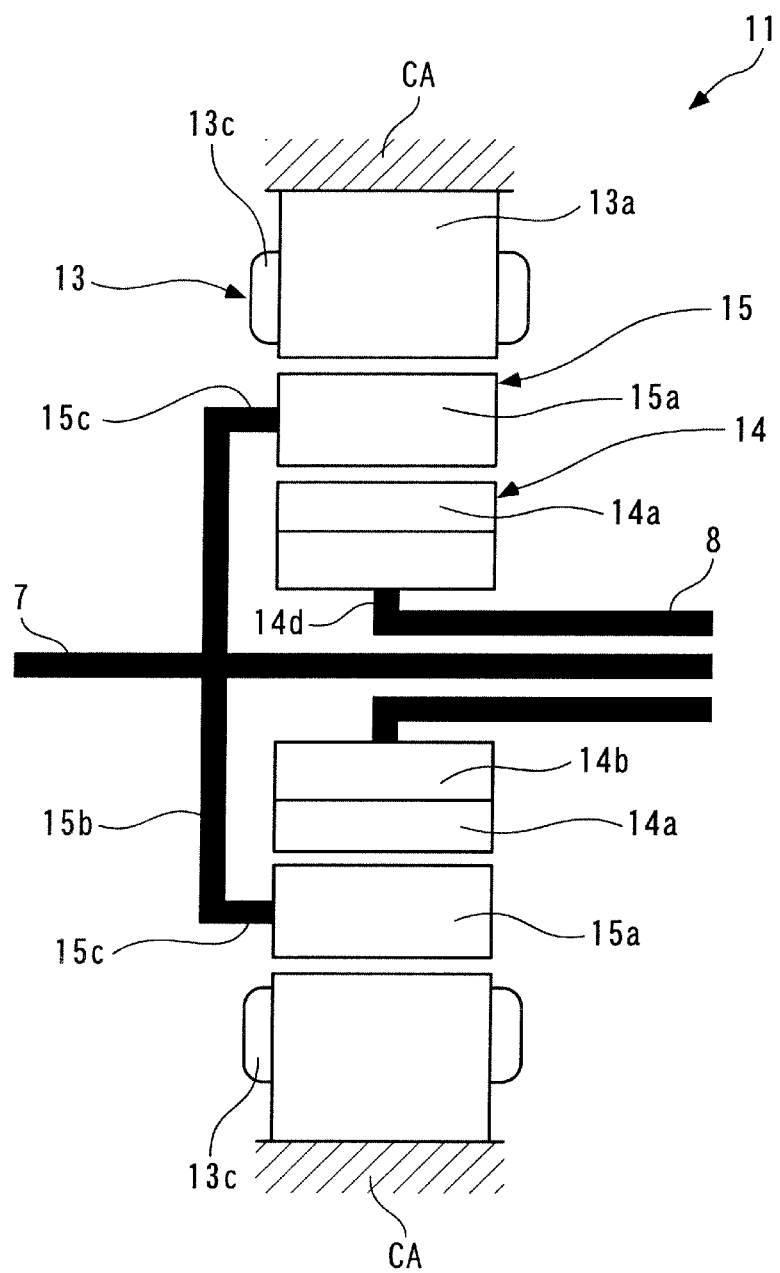

FIG. 42 An enlarged cross-sectional view of the first rotating machine appearing in FIG. 39.

Figure 43:
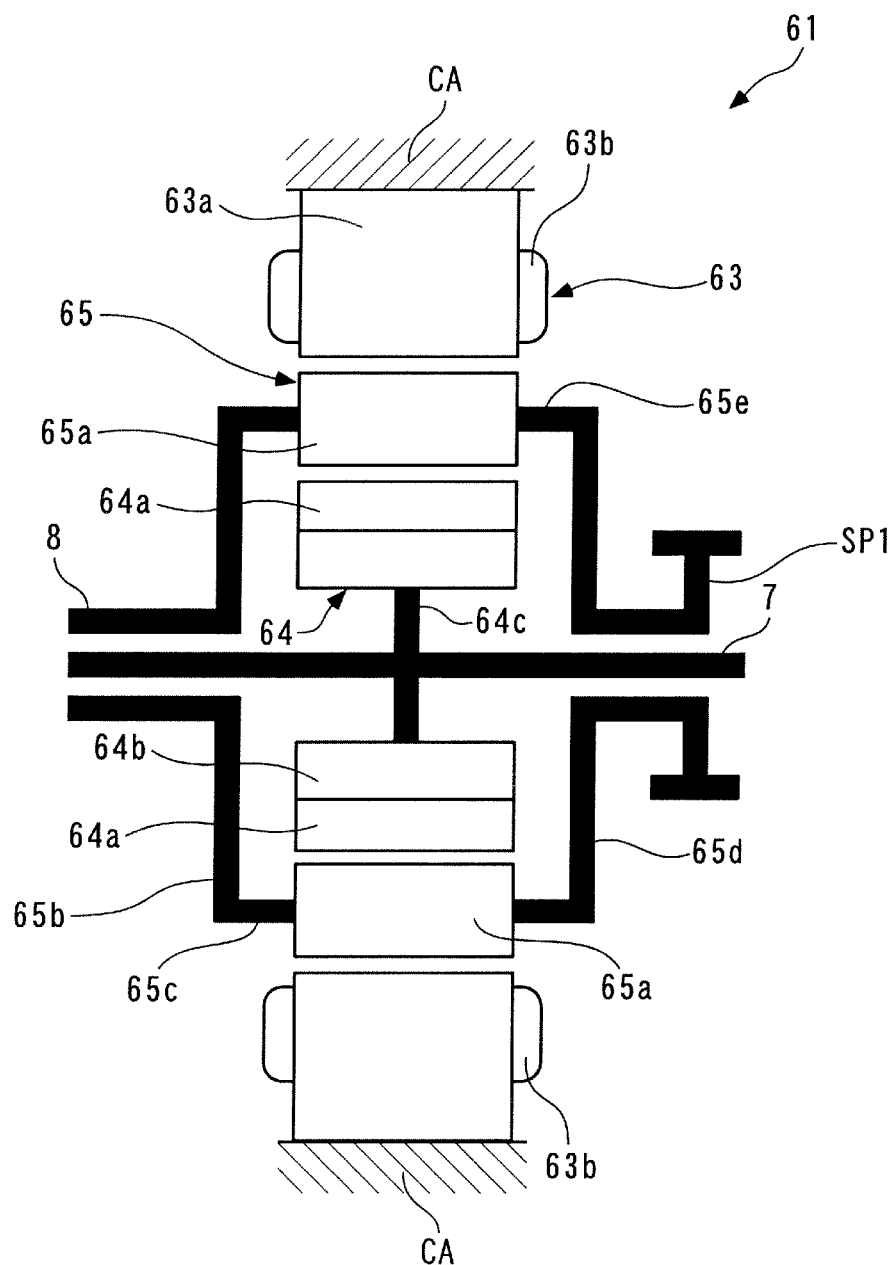

FIG. 43 An enlarged cross-sectional view of a second rotating machine appearing in FIG. 39.

Figure 44:
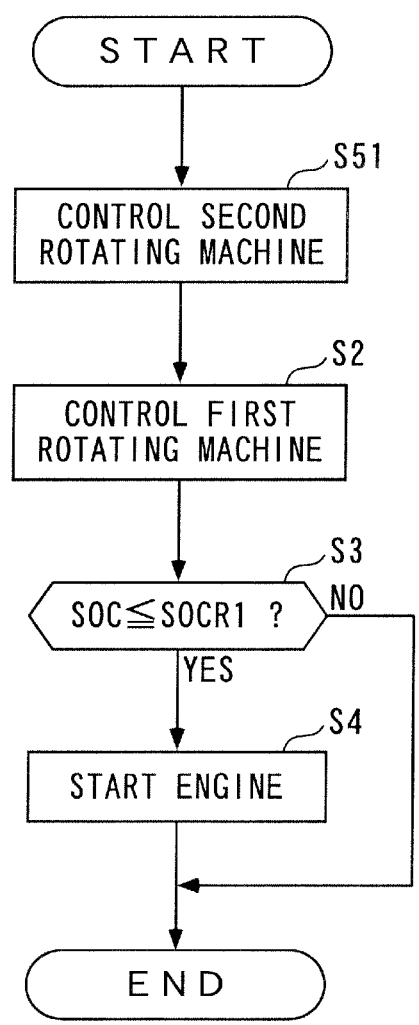

FIG. 44 A flowchart of a process executed by the power plant shown in FIG. 39.

Figure 45:
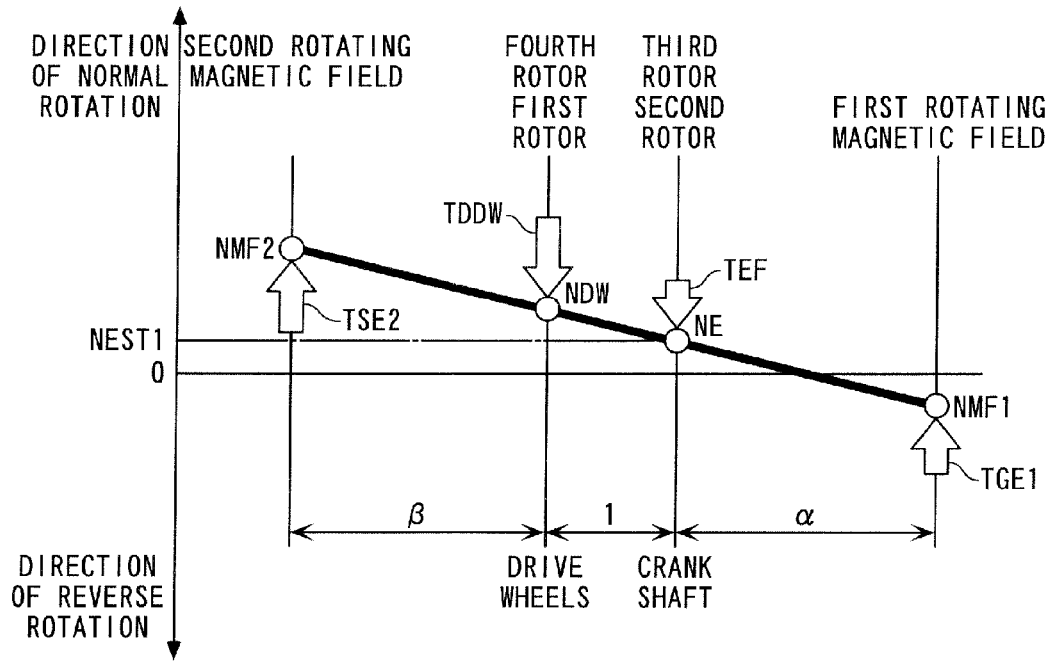

FIG. 45 A velocity collinear chart illustrating an example of the relationship between the rotational speeds of various types of rotary elements of the power plant shown in FIG. 39 and the relationship between torques thereof, during execution of the process shown in FIG. 44.

Figure 46:
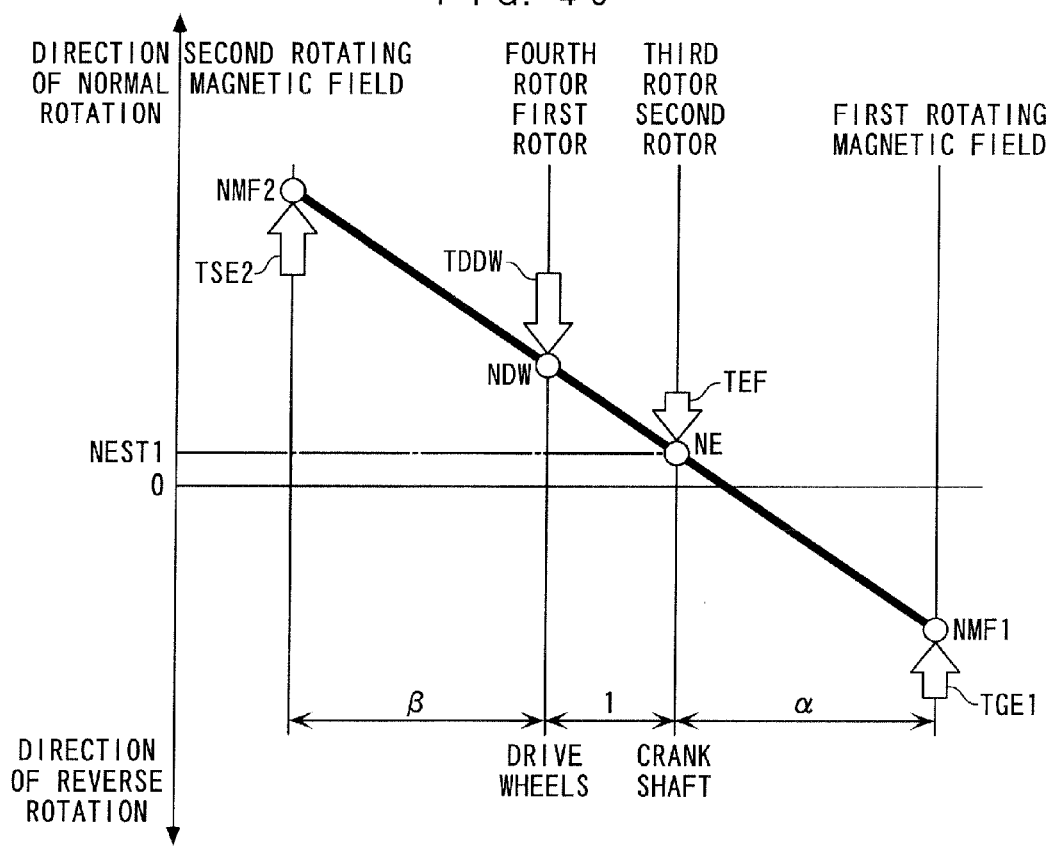

FIG. 46 A velocity collinear chart illustrating an example of the relationship between the rotational speeds of the various types of rotary elements of the power plant shown in FIG. 39 and the relationship between the torques thereof, during execution of the process shown in FIG. 44 but in a situation different from FIG. 45.

Figure 47:
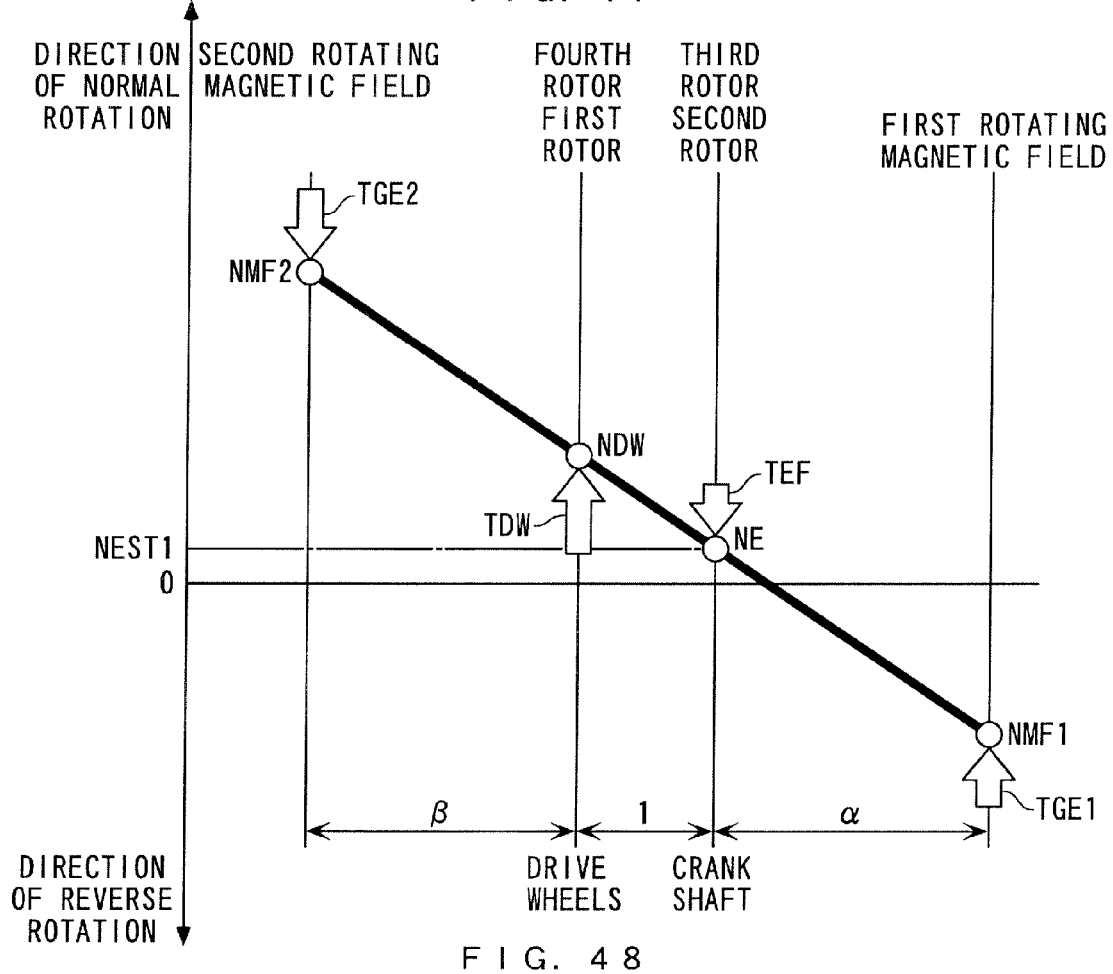

FIG. 47 A velocity collinear chart illustrating an example of the relationship between the rotational speeds of the various types of rotary elements of the power plant shown in FIG. 39 and the relationship between the torques thereof, during decelerating traveling of the vehicle.

Figure 48:
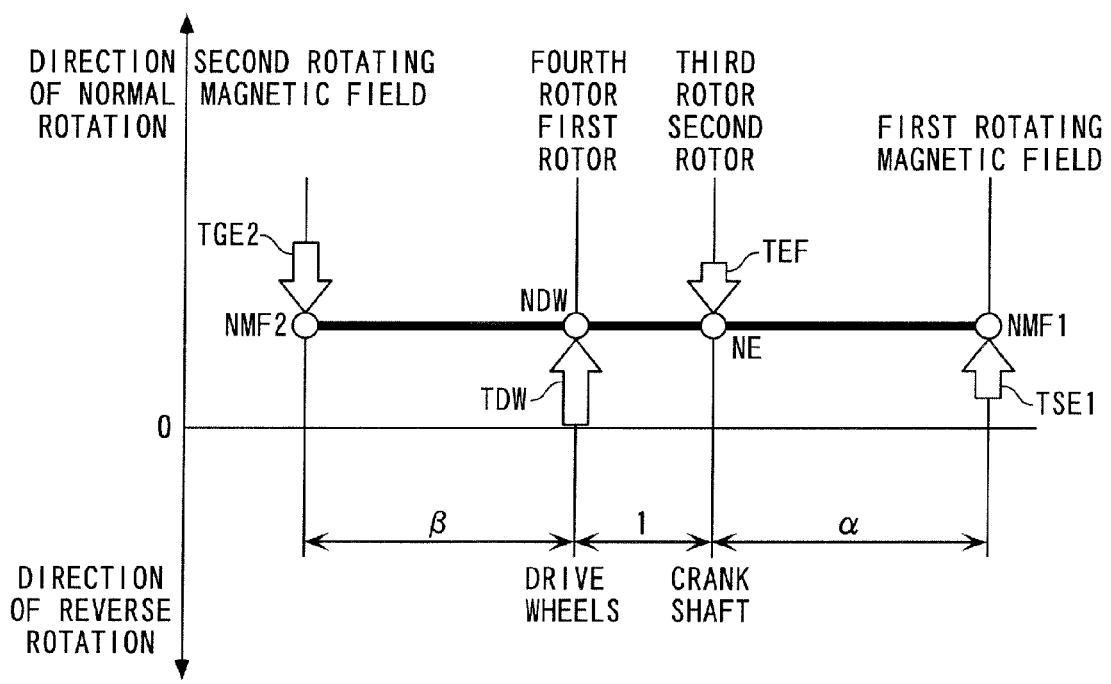

FIG. 48 A velocity collinear chart illustrating an example of the relationship between the rotational speeds of the various types of rotary elements of the power plant shown in FIG. 39 and the relationship between the torques thereof, during decelerating traveling of the vehicle but in a situation different from FIG. 47.

Figure 49:
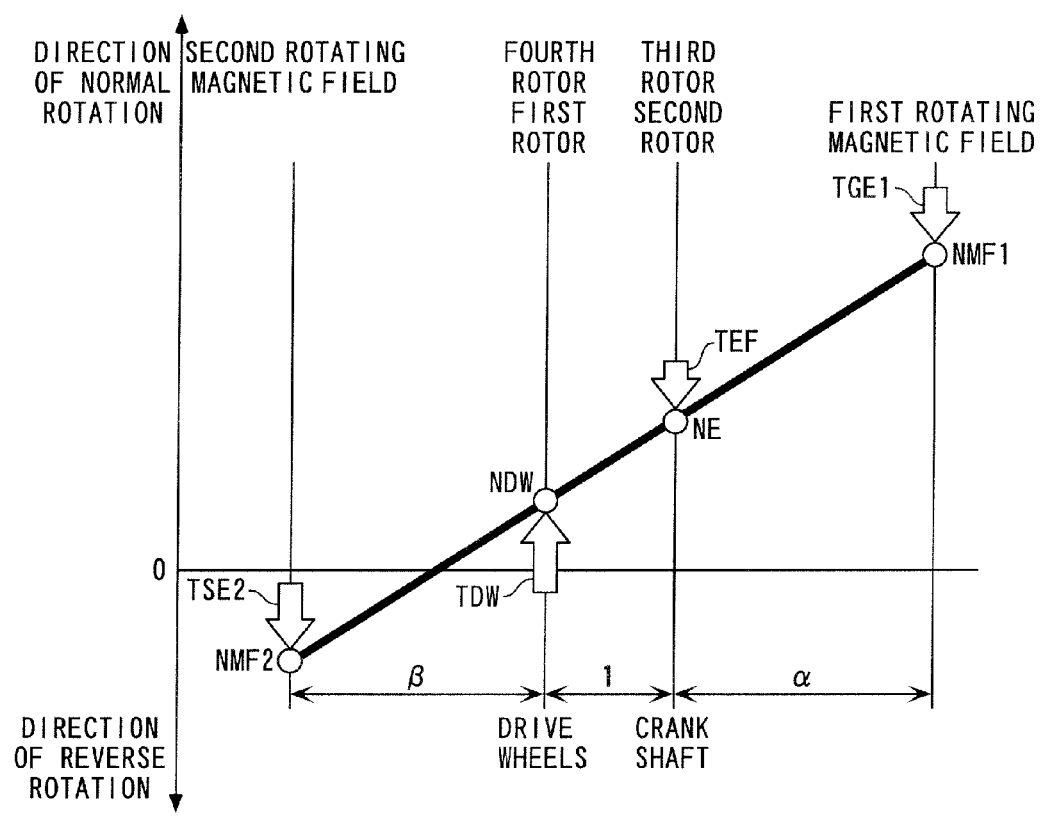

FIG. 49 A velocity collinear chart illustrating an example of the relationship between the rotational speeds of the various types of rotary elements of the power plant shown in FIG. 39 and the relationship between the torques thereof, during decelerating traveling of the vehicle but in a situation different from FIGS. 47 and 48.

Figure 50:
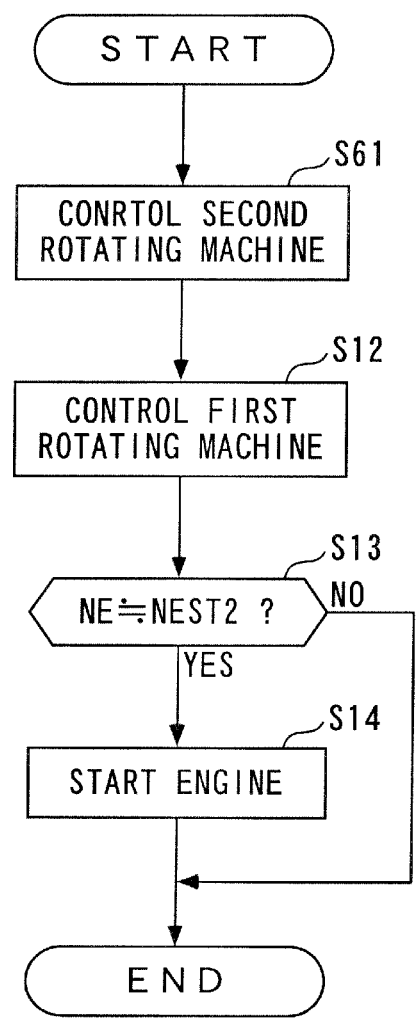

FIG. 50 A flowchart of a process executed by the power plant shown in FIG. 39 which is different from the process in FIG. 44.

Figure 51:
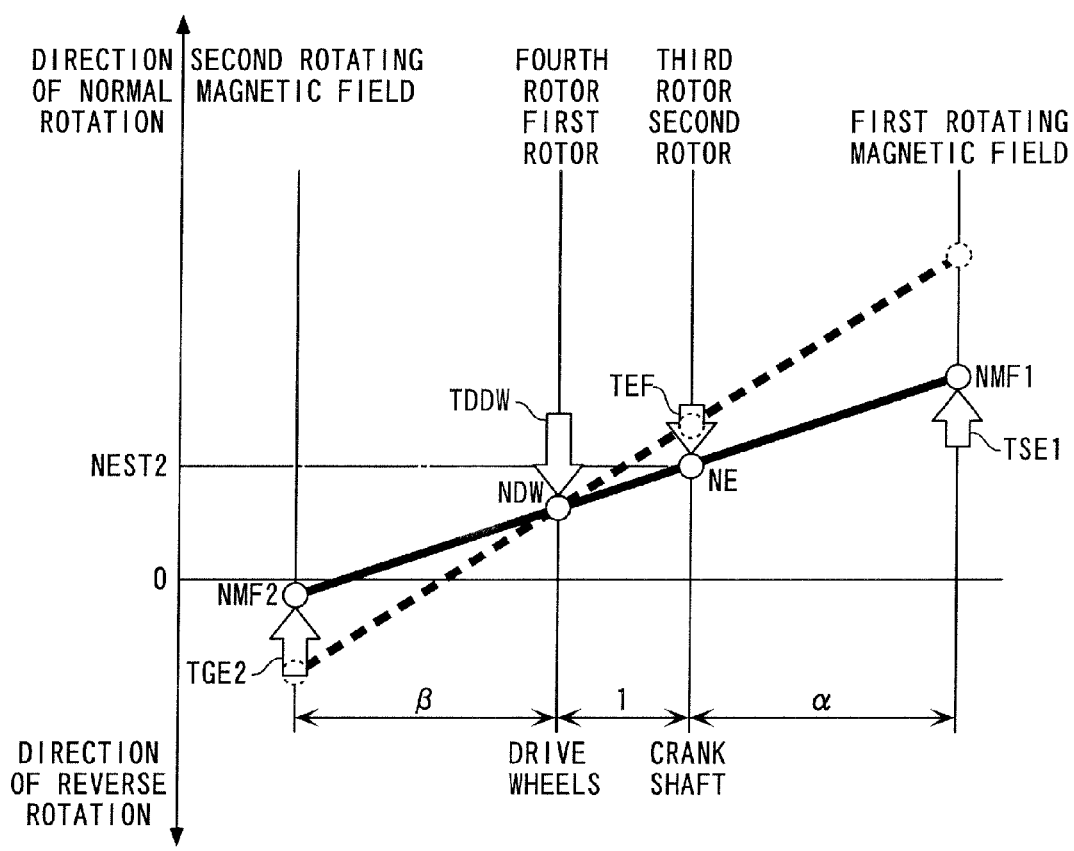

FIG. 51 A velocity collinear chart illustrating an example of the relationship between the rotational speeds of the various types of rotary elements of the power plant shown in FIG. 39 and the relationship between the torques thereof, during execution of the process shown in FIG. 50.

Figure 52:
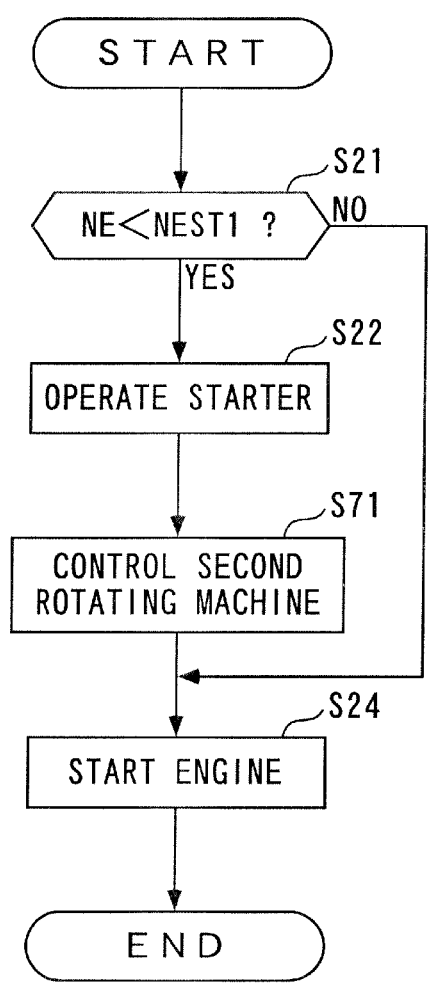

FIG. 52 A flowchart of a process executed by the power plant shown in FIG. 39 which is different from the processes in FIGS. 44 and 50.

Figure 53:
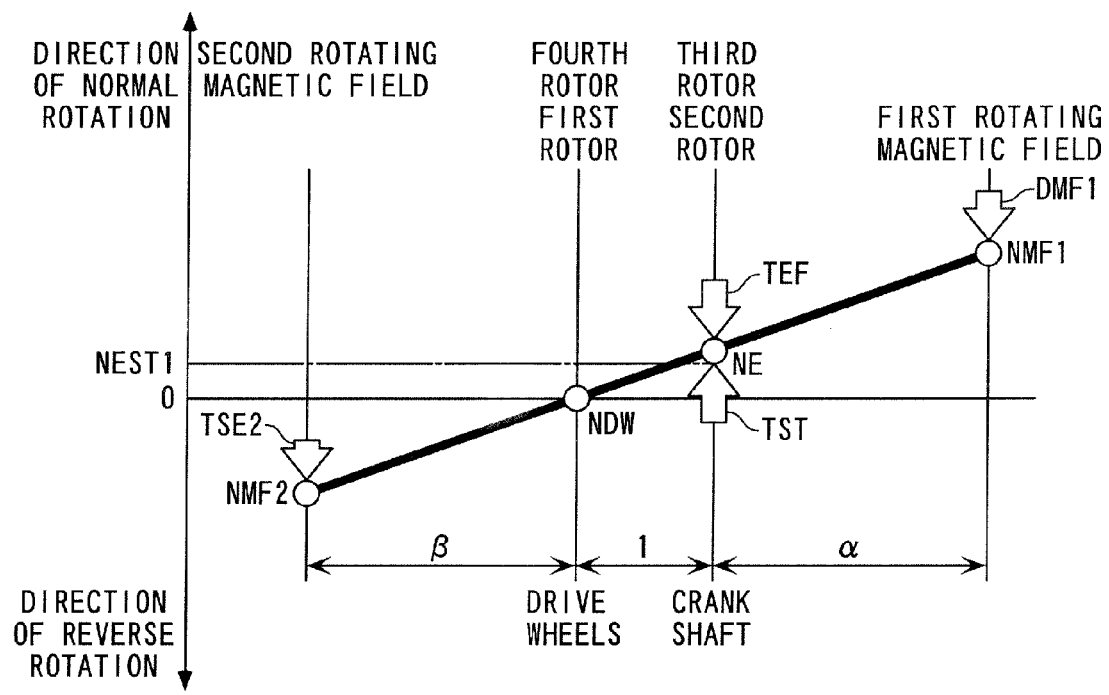

FIG. 53 A velocity collinear chart illustrating an example of the relationship between the rotational speeds of the various types of rotary elements of the power plant shown in FIG. 39 and the relationship between the torques thereof, during execution of the process shown in FIG. 52.

Figure 54:
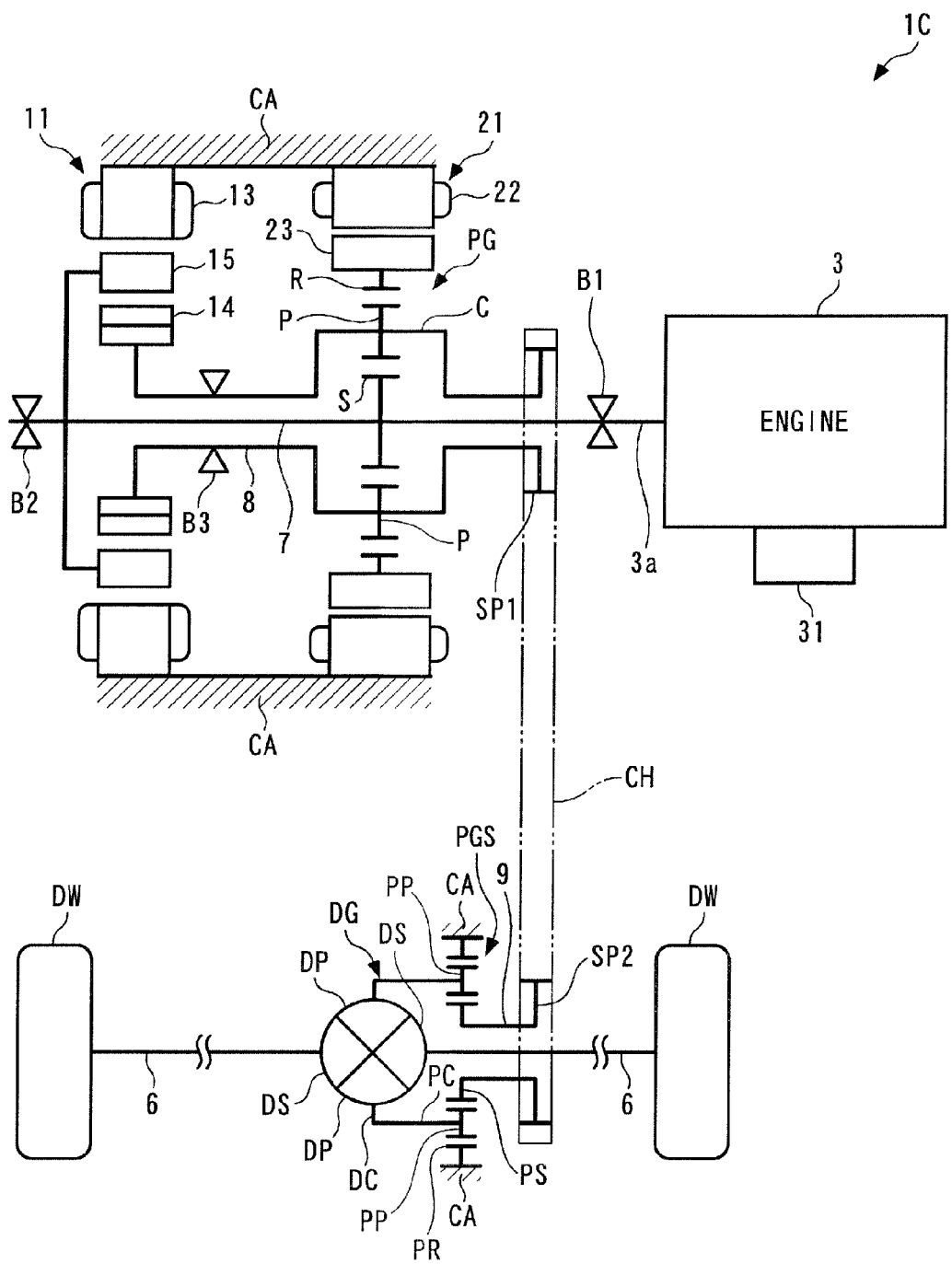

FIG. 54 A schematic view of a power plant according to a fourth embodiment of the present invention together with drive wheels to which the power plant is applied.

Figure 55:
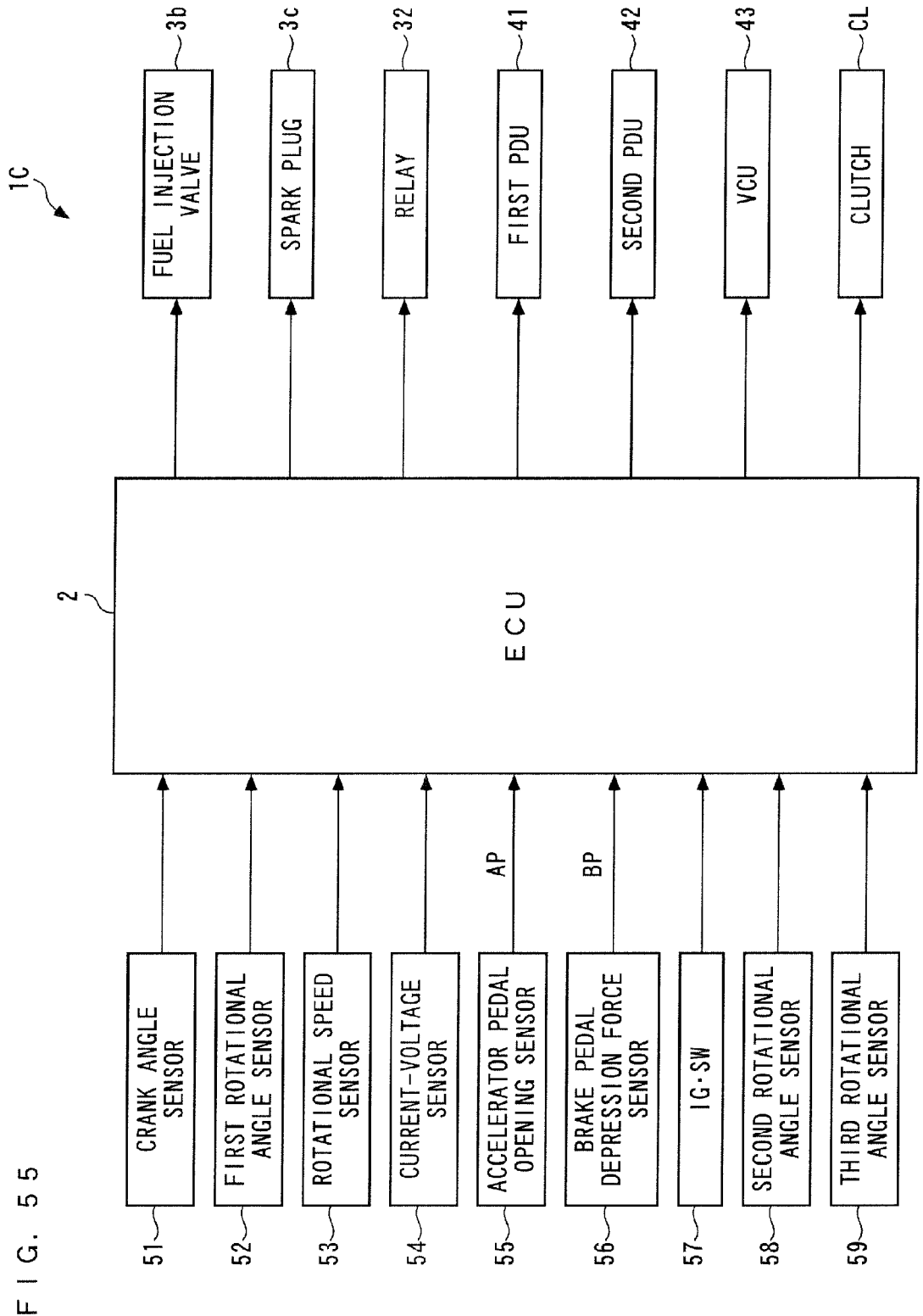

FIG. 55 A block diagram showing an ECU etc. included in the power plant shown in FIG. 54.

Figure 56:
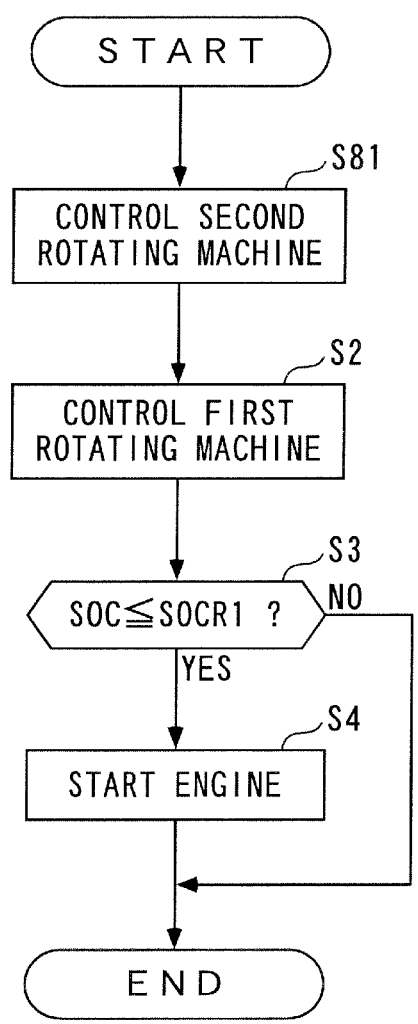

FIG. 56 A flowchart of a process executed by the power plant shown in FIG. 54.

Figure 57:
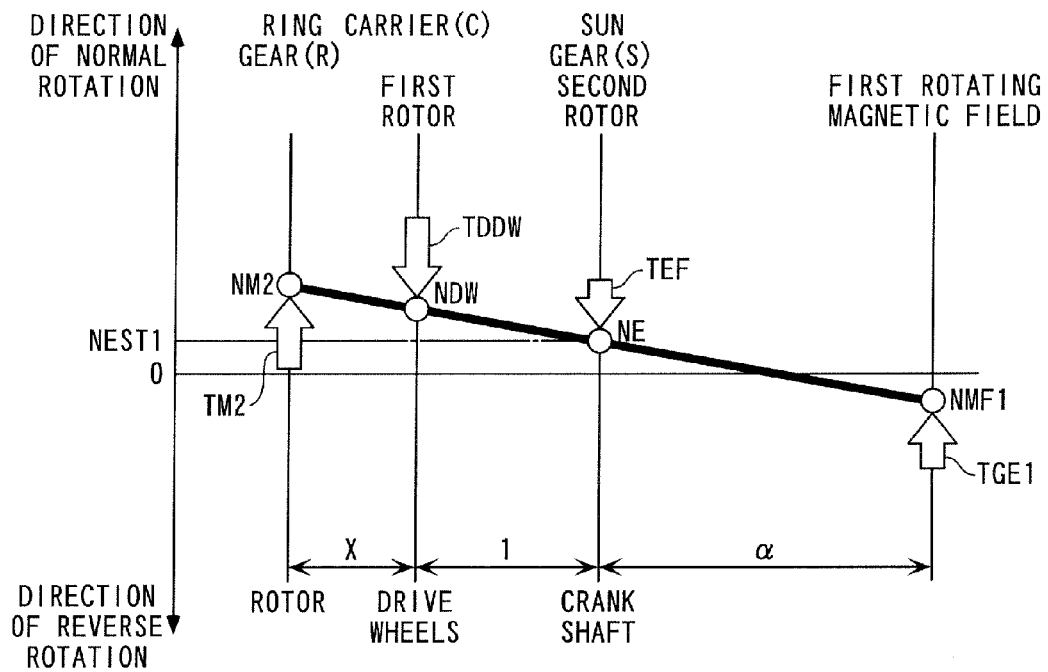

FIG. 57 A velocity collinear chart illustrating an example of the relationship between the rotational speeds of various types of rotary elements of the power plant shown in FIG. 54 and the relationship between torques thereof, during execution of the process shown in FIG. 56.

Figure 58:
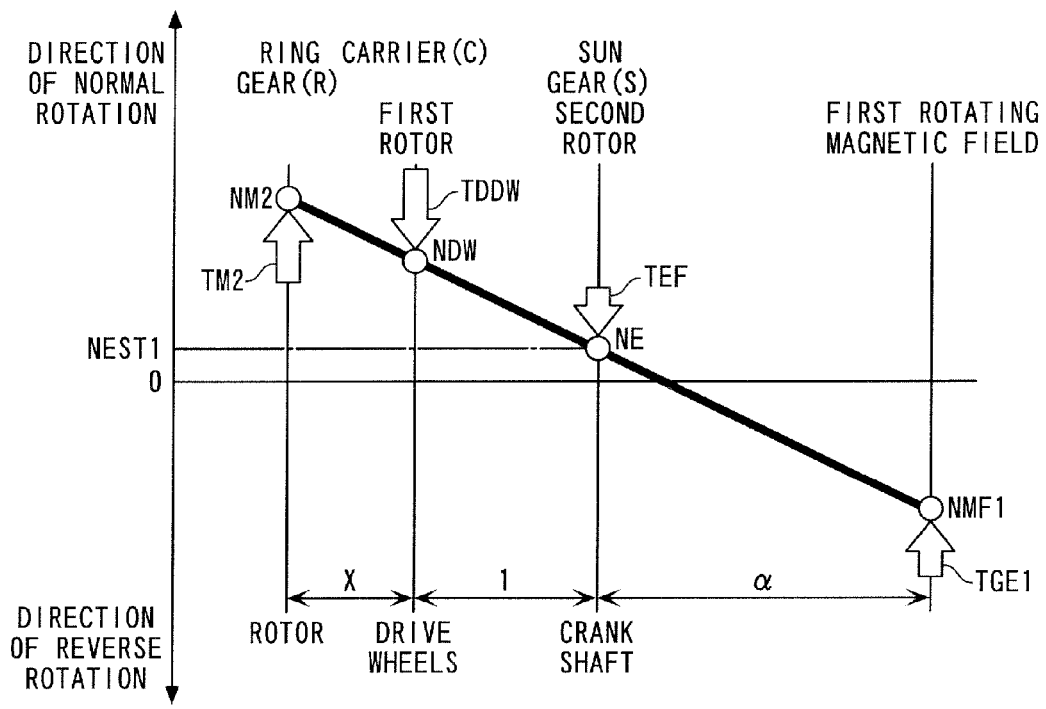

FIG. 58 A velocity collinear chart illustrating an example of the relationship between the rotational speeds of the various types of rotary elements of the power plant shown in FIG. 54 and the relationship between the torques thereof, during execution of the process shown in FIG. 56 but in a situation different from FIG. 57.

Figure 59:
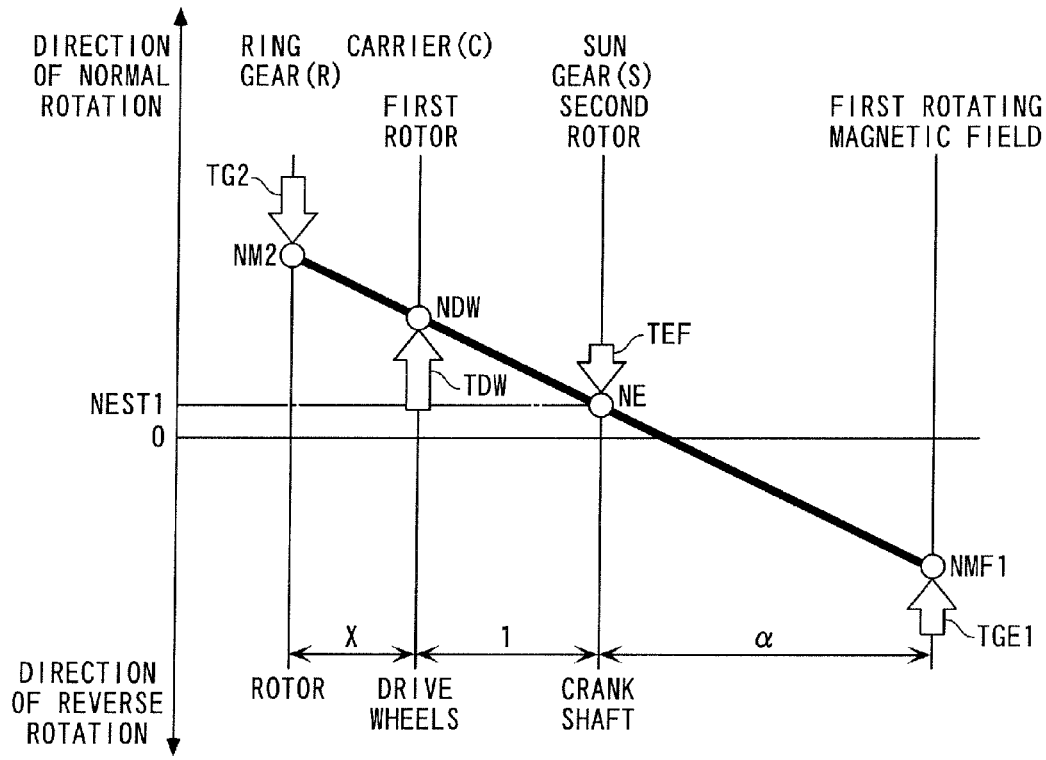

FIG. 59 A velocity collinear chart illustrating an example of the relationship between the rotational speeds of the various types of rotary elements of the power plant shown in FIG. 54 and the relationship between the torques thereof, during decelerating traveling of the vehicle.

Figure 60:
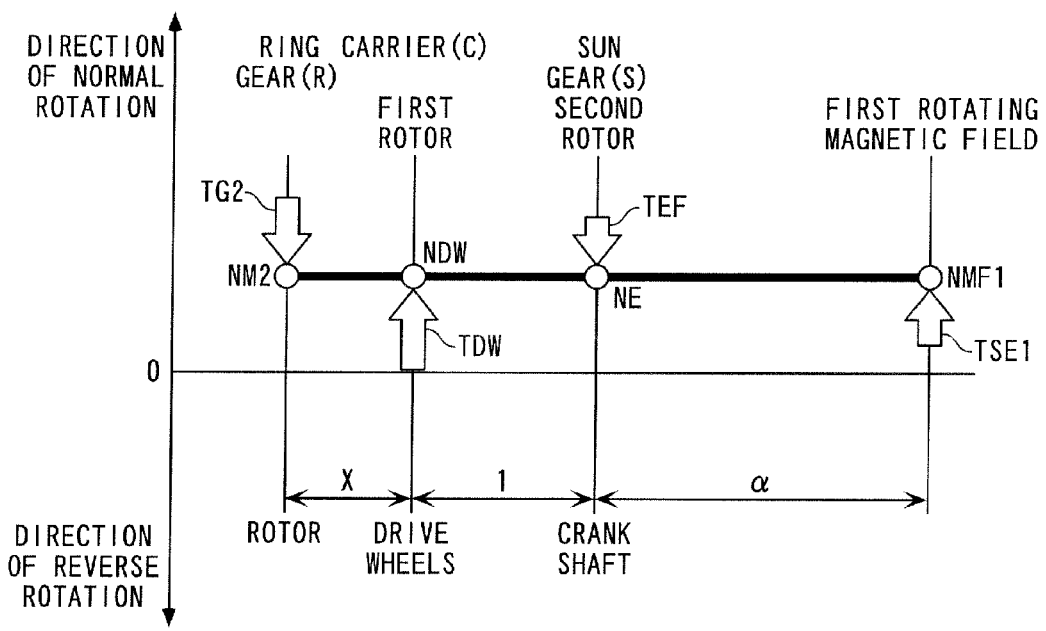

FIG. 60 A velocity collinear chart illustrating an example of the relationship between the rotational speeds of the various types of rotary elements of the power plant shown in FIG. 54 and the relationship between the torques thereof, during decelerating traveling of the vehicle but in a situation different from FIG. 59.

Figure 61:
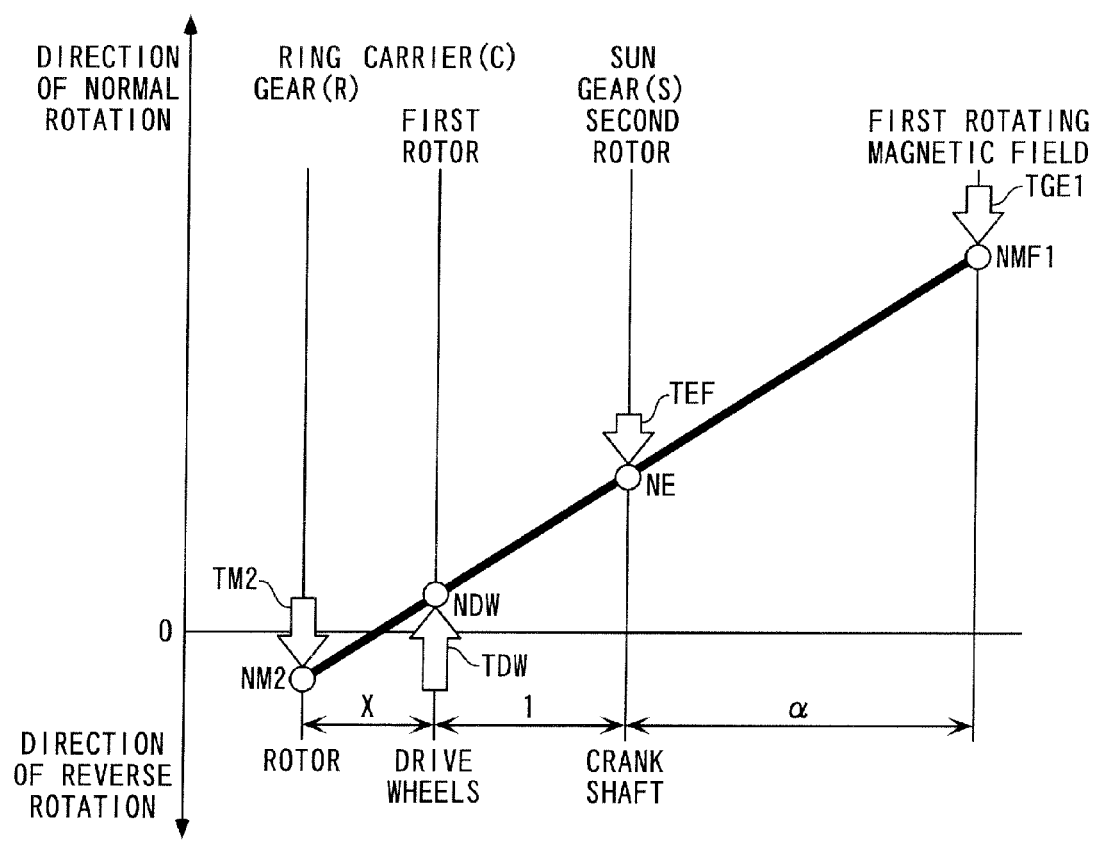

FIG. 61 A velocity collinear chart illustrating an example of the relationship between the rotational speeds of the various types of rotary elements of the power plant shown in FIG. 54 and the relationship between the torques thereof, during decelerating traveling of the vehicle but in a situation different from FIGS. 59 and 60.

Figure 62:
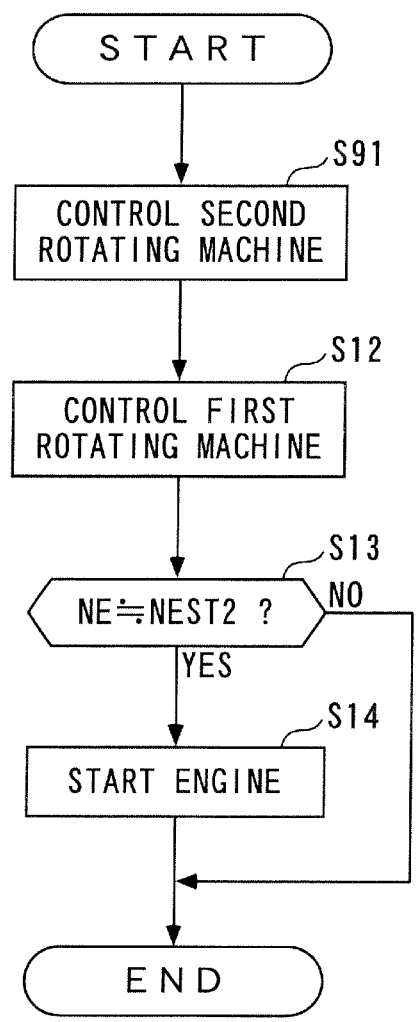

FIG. 62 A flowchart of a process executed by the power plant shown in FIG. 54 but different from FIG. 56.

Figure 63:
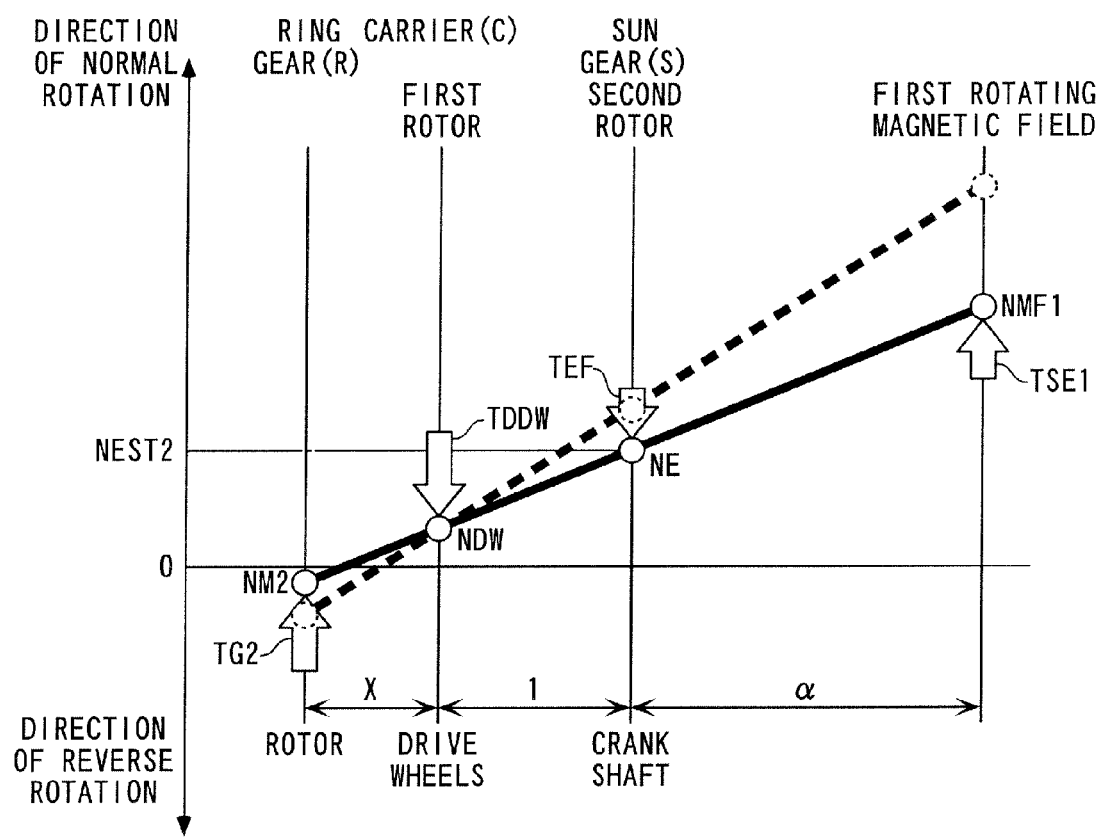

FIG. 63 A velocity collinear chart illustrating an example of the relationship between the rotational speeds of the various types of rotary elements of the power plant shown in FIG. 54 and the relationship between the torques thereof, during execution of the process shown in FIG. 62.

Figure 64:
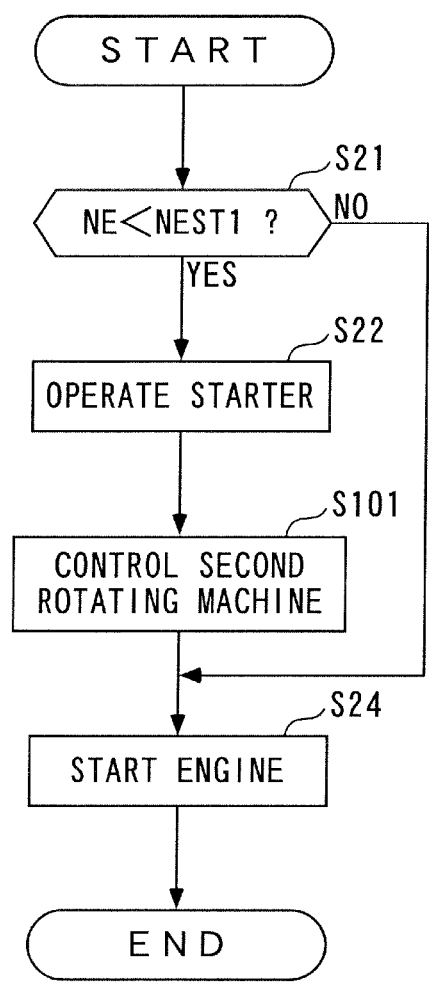

FIG. 64 A flowchart of a process executed by the power plant shown in FIG. 54, which is different from the processes in FIGS. 56 and 62.

Figure 65:
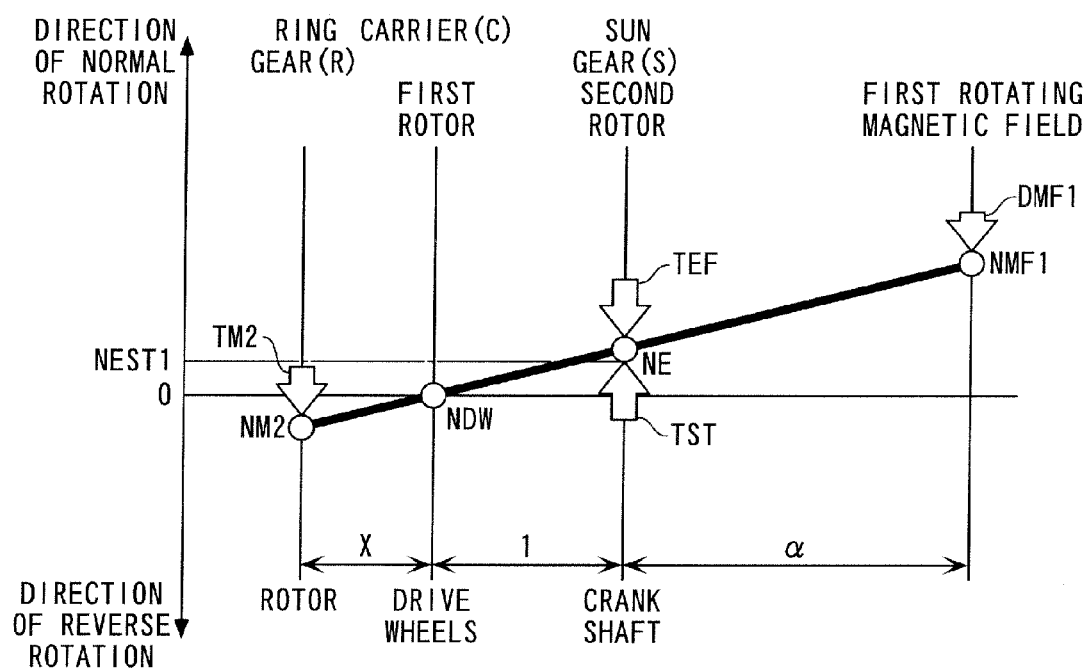

FIG. 65 A velocity collinear chart illustrating an example of the relationship between the rotational speeds of the various types of rotary elements of the power plant shown in FIG. 54 and the relationship between the torques thereof, during execution of the process shown in FIG. 64.

Figure 66:
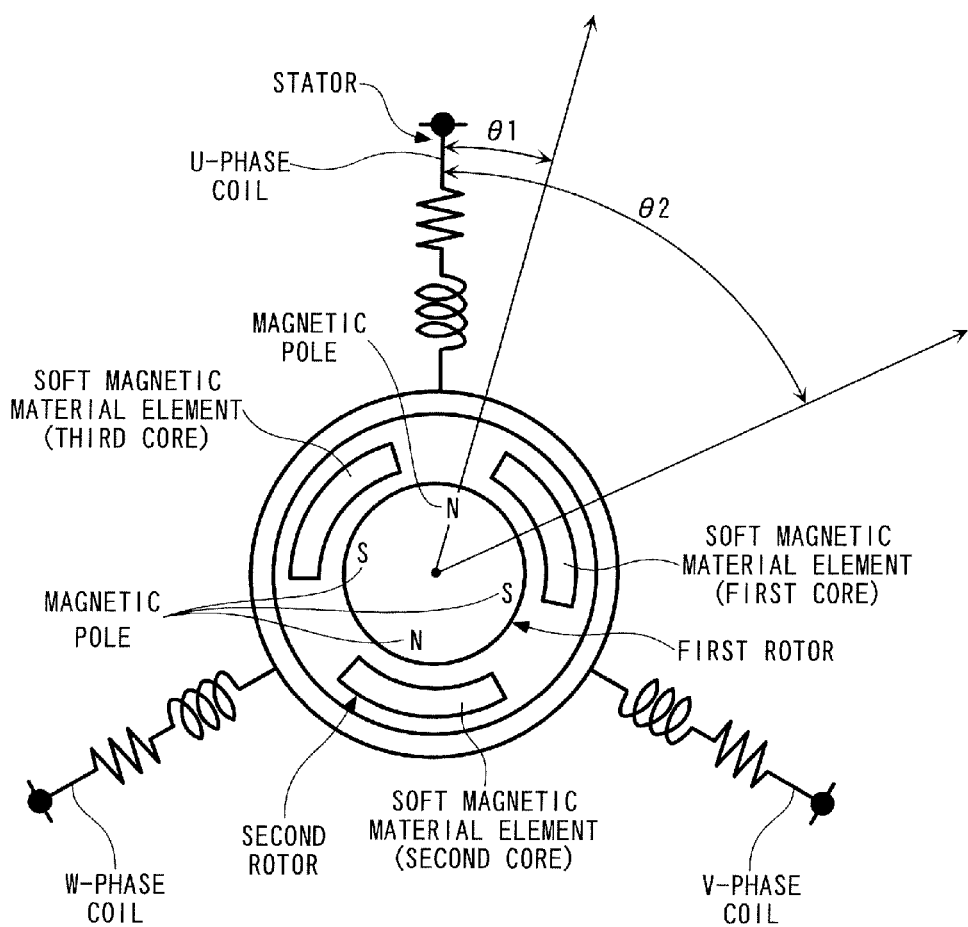

FIG. 66 A view of an equivalent circuit of the first rotating machine of the present invention.

MODE FOR CARRYING OUT INVENTION

Figure 2:
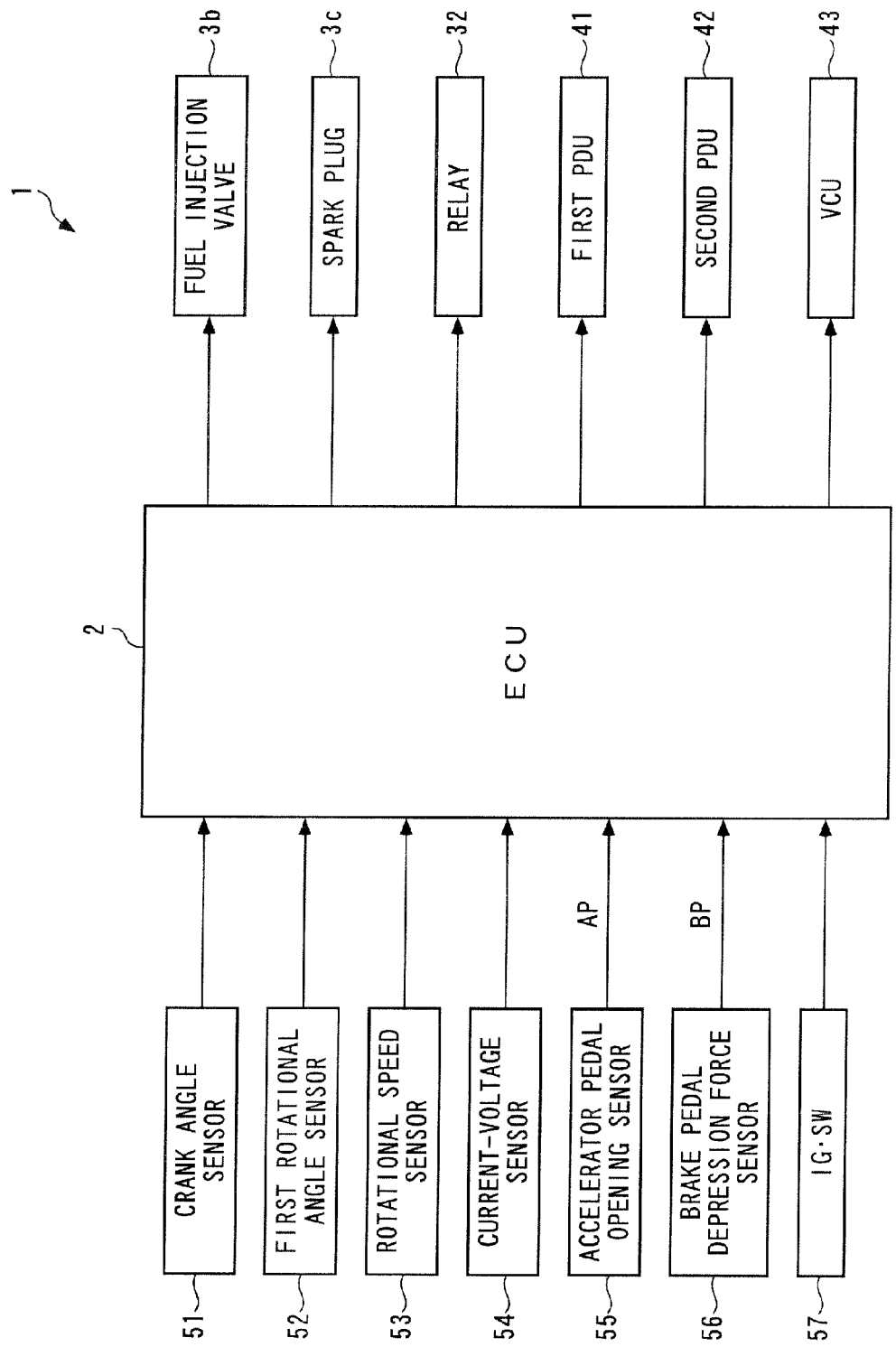
FIG. 2 A block diagram showing an ECU etc. included in the power plant shown in FIG. 1.

The present invention will now be described in detail with reference to the drawings showing preferred embodiments thereof. A power plant 1 according to a first embodiment of the present invention as shown in FIGS. 1 and 2 is for driving left and right drive wheels DW and DW of a vehicle (not shown), and includes an internal combustion engine 3, a first rotating machine 11, and a second rotating machine 21, as motive power sources, and a differential gear DG for transmitting motive power, and an ECU 2 for controlling the operations of the internal combustion engine 3 and the first and second rotating machines 11 and 21. Note that in FIG. 1 and other figures, referred to hereinafter, hatching in portions illustrating cross-sections is omitted for convenience, if appropriate. Hereinafter, connection between elements directly by a shaft or the like without via a transmission mechanism, such as gears, is referred to as "direct connection" as deemed appropriate.

Figure 3:
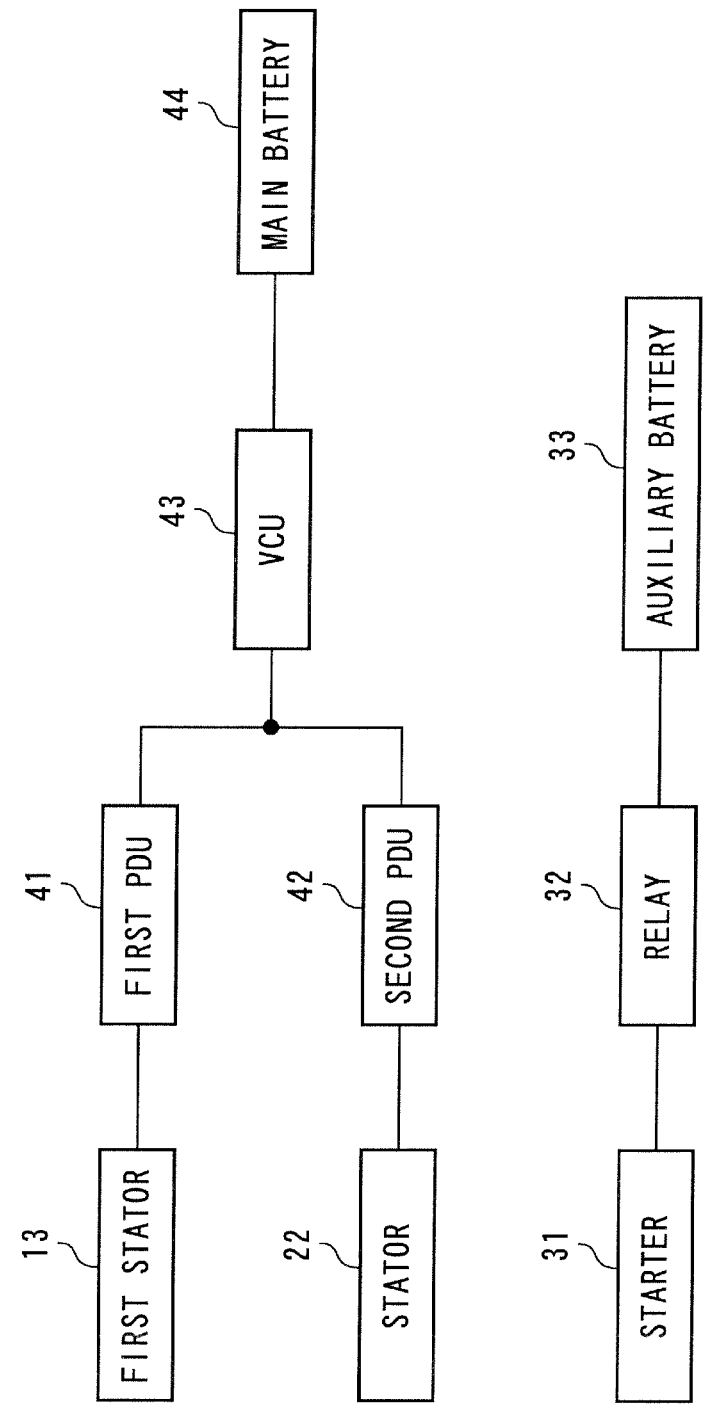
FIG. 3 A block diagram showing a relationship of connections between a first stator, a stator, a main battery, and so forth, included in the power plant shown in FIG. 1.

The internal combustion engine (hereinafter referred to as the "engine") 3 is a gasoline engine, and includes a crankshaft 3a for outputting motive power, fuel injection valves 3b, and spark plugs 3c. The valve-opening time period and the valve-opening timing of each fuel injection valve 3b, and the ignition operation of the spark plugs 3c are controlled by the ECU 2. Further, a starter 31 for starting the engine 3 is mechanically connected to the crankshaft 3a via a one-way clutch (not shown). This one-way clutch connects between the crankshaft 3a and the starter 31 when motive power is transmitted from the starter 31 to the crankshaft 3a, whereas when motive power is transmitted from the crankshaft 3a to the starter 31, the one-way clutch disconnects therebetween. Further, as shown in FIG. 3, an auxiliary battery 33 is electrically connected to the starter 31 via a relay 32. The relay 32 is electrically connected to the ECU 2, and the ECU 2 controls the relay 32 to control the supply of electric power from the auxiliary battery 33 to the starter 31 to thereby control the operation of the starter 31. Further, a first rotating shaft 4 is coaxially directly connected to the crankshaft 3a via a flywheel (not shown). The first rotating shaft 4 is rotatably supported by a bearing B.

Figure 4:
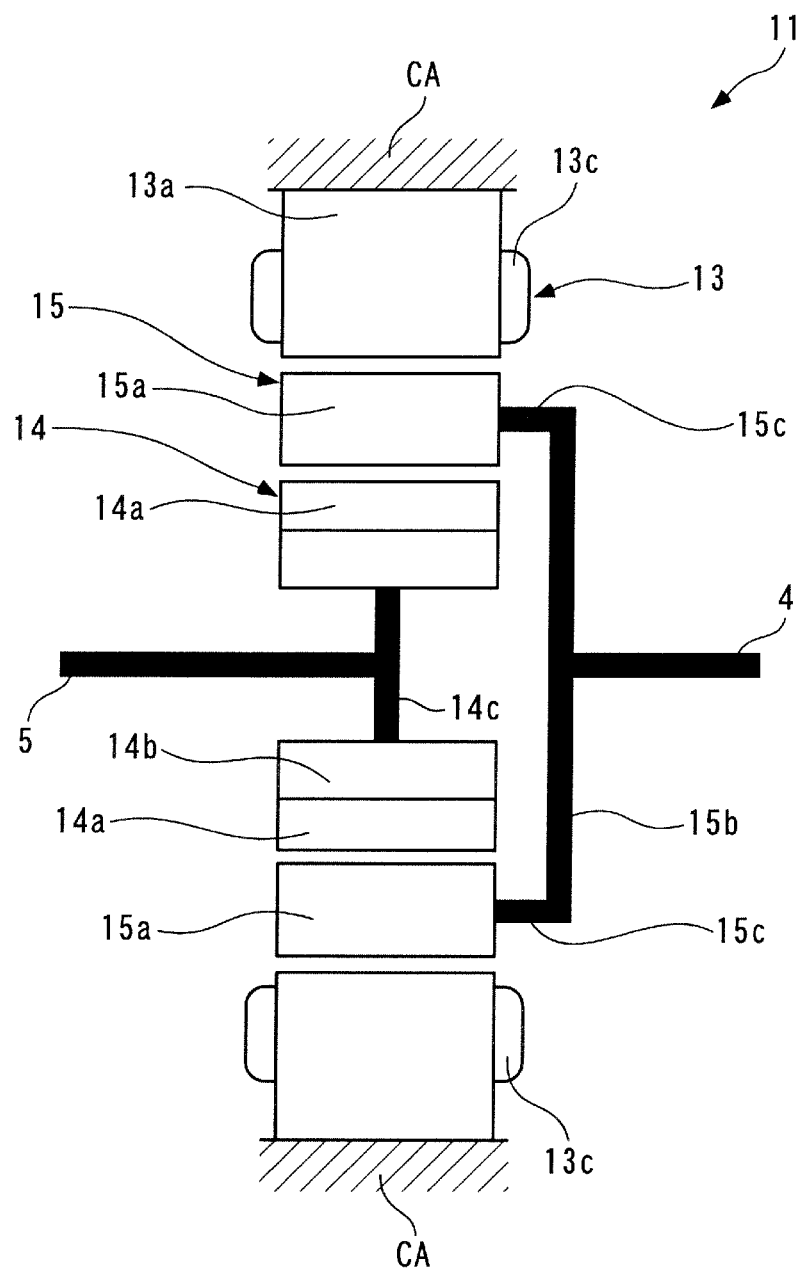
FIG. 4 An enlarged cross-sectional view of a first rotating machine appearing in FIG. 1.

As shown in FIGS. 1 and 4, the first rotating machine 11 is a two-rotor-type rotating machine, and includes an unmovable first stator 13, a first rotor 14 provided in a manner opposed to the first stator 13, and a second rotor 15 disposed between the two 13 and 14. The first rotor 14, the second rotor 15, and the first stator 13 are arranged coaxially with the above-described first rotating shaft 4, and are arranged in the radial direction of the first rotating shaft 4, from inside in the mentioned order.

Figure 5:
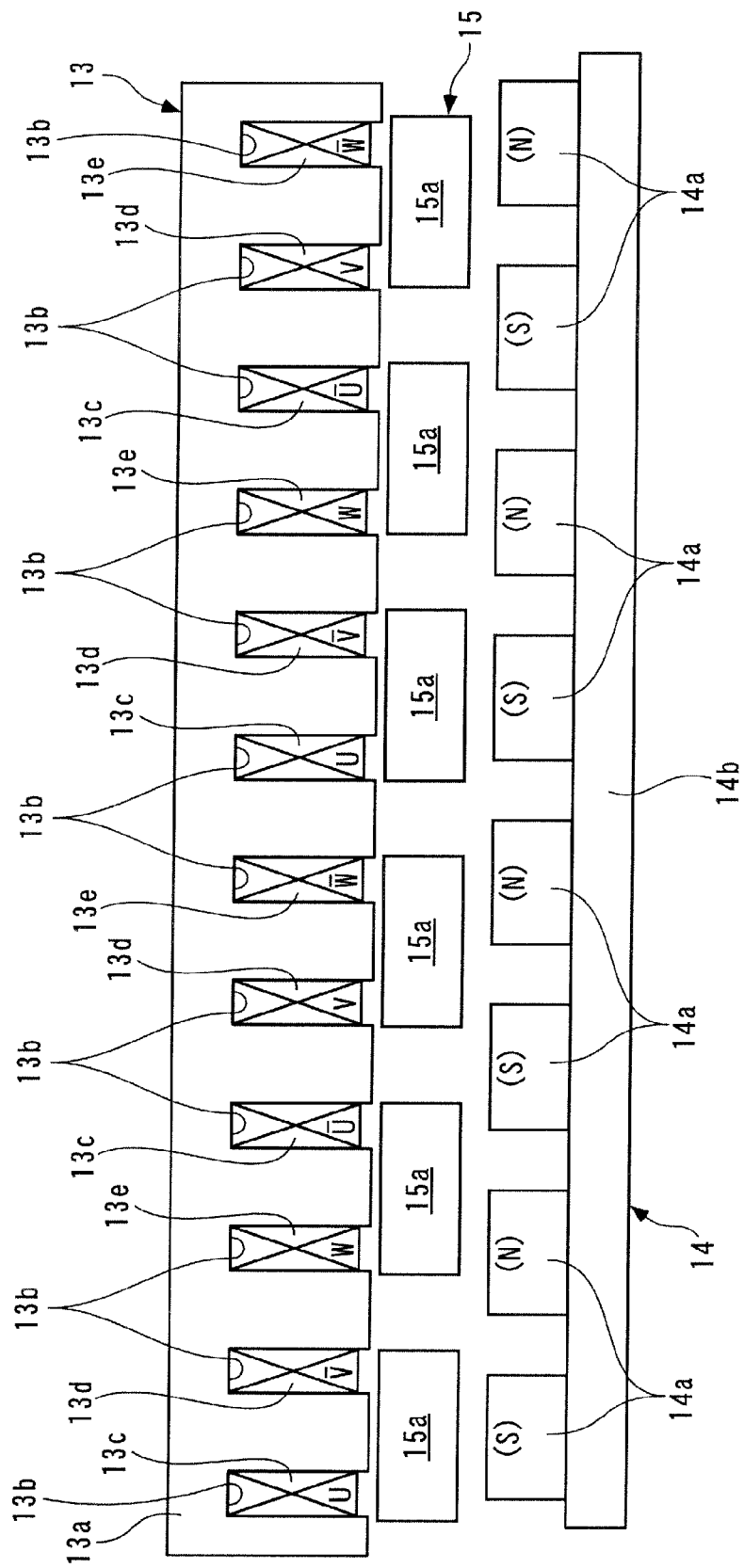
FIG. 5 A schematic development view showing the first stator and first and second rotors of the first rotating machine appearing in FIG. 1, in a state developed in the circumferential direction.

The first stator 13 is for generating a first rotating magnetic field, and as shown in FIGS. 4 and 5, includes an iron core 13a, and U-phase, V-phase and W-phase coils 13c, 13d and 13e provided on the iron core 13a. Note that in FIG. 4, only the U-phase coil 13c is shown for convenience. The iron core 13a, which has a hollow cylindrical shape formed by laminating a plurality of steel plates, extends in the axial direction of the first rotating shaft 4 (hereinafter simply referred to as the "axial direction"), and is fixed to an unmovable casing CA. Further, the inner peripheral surface of the iron core 13a is formed with twelve slots 13b. The slots 13b extend in the axial direction, and are arranged at equally-spaced intervals in the circumferential direction of the first rotating shaft 4 (hereinafter simply referred to as the "circumferential direction"). The U-phase to W-phase coils 13c to 13e are wound in the slots 13b by distributed winding (wave winding).

As shown in FIG. 3, the first stator 13 including the U-phase to W-phase coils 13c to 13e is electrically connected to a main battery 44 capable of being charged and discharged, via a first power drive unit (hereinafter referred to as the "first PDU") 41 and a voltage control unit (hereinafter referred to as the "VCU") 43. The first PDU 41 is implemented as an electric circuit comprising an inverter, and outputs DC power supplied from the main battery 44 to the first stator 13 in a state converted to three-phase AC power. Further, the above-mentioned VCU 43, which is implemented as an electric circuit comprising a DC/DC converter, outputs electric power supplied from the main battery 44, to the first PDU 41 in a state where the voltage of the electric power is boosted, and outputs electric power supplied from the first PDU 41, to the main battery 44 in a state where the voltage of the electric power is dropped. Further, first PDU 41 and the VCU 43 are electrically connected to the ECU 2 (see FIG. 2).

In the first stator 13 constructed as above, when electric power is supplied from the main battery 44 via the VCU 43 and the first PDU 41, or when electric power is generated, as described hereinafter, four magnetic poles are generated at respective ends of the iron core 13a toward the first rotor 14 at equally-spaced intervals in the circumferential direction (see FIG. 7), and the first rotating magnetic field generated by the magnetic poles rotates in the circumferential direction. Hereinafter, the magnetic poles generated on the iron core 13a are referred to as the "first armature magnetic poles". Further, each two first armature magnetic poles which are circumferentially adjacent to each other have polarities different from each other. Note that in FIG. 5 and other figures, referred to hereinafter, the first armature magnetic poles are represented by (N) and (S) over the iron core 13a and the U-phase to W-phase coils 13c to 13e.

As shown in FIG. 5, the first rotor 14 includes a first magnetic pole row formed by eight permanent magnets 14a. These permanent magnets 14a are arranged at equally-spaced intervals in the circumferential direction, and the first magnetic pole row is opposed to the iron core 13a of the first stator 13. Each permanent magnet 14a extends in the axial direction, and the length thereof in the axial direction is set to the same length as that of the iron core 13a of the first stator 13.

Further, the permanent magnets 14a are mounted on an outer peripheral surface of an annular mounting portion 14b. This mounting portion 14b is formed by a soft magnetic material, such as iron or a laminate of a plurality of steel plates, and has an inner peripheral surface thereof attached to an outer peripheral surface of a disk-shaped flange 14c. The flange 14c is integrally formed on a second rotating shaft 5 rotatably supported by bearings (not shown), whereby the first rotor 14 including the permanent magnets 14a is coaxially directly connected to the second rotating shaft 5. Further, the second rotating shaft 5 is disposed coaxially with the crankshaft 3a and the first rotating shaft 4. Furthermore, the permanent magnets 14a are attached to the outer peripheral surface of the mounting portion 14b formed by the soft magnetic material as described above, and hence a magnetic pole of (N) or (S) appears on an end of each permanent magnet 14a toward the first stator 13. Note that in FIG. 5 and other figures, referred to hereinafter, the magnetic poles of the permanent magnets 14a are denoted by (N) and (S). Further, each two permanent magnets 14a circumferentially adjacent to each other have polarities different from each other.

The second rotor 15 includes a single first soft magnetic material element row formed by six cores 15a. These cores 15a are arranged at equally-spaced intervals in the circumferential direction, and the first soft magnetic material element row is disposed between the iron core 13a of the first stator 13 and the magnetic pole row of the first rotor 14, in a manner spaced therefrom by respective predetermined distances. Each core 15a is formed by a soft magnetic material, such as a laminate of a plurality of steel plates, and extends in the axial direction. Further, similarly to the permanent magnet 14a, the length of the core 15a in the axial direction is set to the same length as that of the iron core 13a of the first stator 13. Furthermore, the core 15a is mounted on an outer end of a disk-shaped flange 15b via a hollow cylindrical connecting portion 15c slightly extending in the axial direction. This flange 15b is integrally formed on the aforementioned first rotating shaft 4. With the above-described arrangement, the second rotor 15 including the cores 15a is coaxially directly connected to the crankshaft 3a via the first rotating shaft 4 and the flywheel. Note that in FIGS. 5 and 7, the connecting portion 15c and the flange 15b are omitted from illustration for convenience.

Next, a description will be given of the operation of the first rotating machine 11 constructed as above. As described above, the first rotating machine 11 includes the four first armature magnetic poles, the eight magnetic poles of the permanent magnets 14a (hereinafter referred to as the "first magnet magnetic poles"), and the six cores 15a. That is, the ratio between the number of the first armature magnetic poles, the number of the first magnet magnetic poles, and the number of the cores 15a is set to 1:2.0:(1+2.0)/2, and the ratio of the number of pole pairs of the first magnet magnetic poles to the number of pole pairs of the first armature magnetic poles (hereinafter referred to as the "first pole pair number ratio α") is set to 2.0. As is apparent from this fact and the aforementioned equations (18) to (20), counter-electromotive force voltages, which are generated in the U-phase to W-phase coils 13c to 13e as the first rotor 14 and the second rotor 15 rotate with respect to the first stator 13 (hereinafter referred to as the "U-phase counter-electromotive force voltage Vcu", the "V-phase counter-electromotive force voltage Vcv" and the "W-phase counter-electromotive force voltage Vcw", respectively) are represented by the following equations (33), (34) and (35), respectively.

$$Vcu = -3 \cdot \psi F[(3 \cdot \omega ER2 - 2 \cdot \omega ER1)\sin(3 \cdot \theta ER2 - 2 \cdot \theta ER1)] \quad (33)$$

$$Vcv = -3 \cdot \psi F\left[(3 \cdot \omega ER2 - 2 \cdot \omega ER1)\sin\left(3 \cdot \theta ER2 - 2 \cdot \theta ER1 - \frac{2\pi}{3}\right)\right] \quad (34)$$

$$Vcw = -3 \cdot \psi F\left[(3 \cdot \omega ER2 - 2 \cdot \omega ER1)\sin\left(3 \cdot \theta ER2 - 2 \cdot \theta ER1 + \frac{2\pi}{3}\right)\right] \quad (35)$$

Here, φF represents the maximum value of the magnetic flux from the first magnet magnetic pole. Further, θER1 represents a first rotor electrical angle, which is a value obtained by converting a rotational angle position of a specific permanent magnet 14a of the first rotor 14 with respect to a specific U-phase coil 13c (hereinafter referred to as the "reference coil") to an electrical angular position. More specifically, the first rotor electrical angle θER1 is a value obtained by multiplying the rotational angle position of the specific permanent magnet 14a by a pole pair number of the first armature magnetic poles, i.e. a value of 2. Further, θER2 represents a second rotor electrical angle, which is a value obtained by converting a rotational angle position of a specific core 15a of the second rotor 15 with respect to the aforementioned reference coil to an electrical angular position. More specifically, the second rotor electrical angle θER2 is a value obtained by multiplying the rotational angle position of this specific core 15a by a pole pair number (value of 2) of the first armature magnetic poles.

Further, ωER1 in the equations (33) to (35) represents a first rotor electrical angular velocity, which is a value obtained by differentiating the first rotor electrical angle θER1 with respect to time, i.e. a value obtained by converting an angular velocity of the first rotor 14 with respect to the first stator 13 to an electrical angular velocity. Furthermore, ωER2 represents a second rotor electrical angular velocity, which is a value obtained by differentiating the second rotor electrical angle θER2 with respect to time, i.e. a value obtained by converting an angular velocity of the second rotor 15 with respect to the first stator 13 to an electrical angular velocity.

As is apparent from the above-described first pole pair number ratio α and the aforementioned equations (21) to (23), electric currents flowing through the U-phase, V-phase and W-phase coils 13c, 13d, and 13e, respectively, (hereinafter referred to as the "U-phase electric current Iu", the "V-phase electric current Iv", and the "W-phase electric current Iw", respectively) are expressed by the following equations (36), (37) and (38):

$$Iu = I \cdot \sin(3 \cdot \theta ER2 - 2 \cdot \theta ER1) \quad (36)$$

$$Iv = I \cdot \sin\left(3 \cdot \theta ER2 - 2 \cdot \theta ER1 - \frac{2\pi}{3}\right) \quad (37)$$

$$Iw = I \cdot \sin\left(3 \cdot \theta ER2 - 2 \cdot \theta ER1 + \frac{2\pi}{3}\right) \quad (38)$$

Here, I represents the amplitude (maximum value) of the U-phase to W-phase electric currents Iu to Iw. Further, as is apparent from the first pole pair number ratio α (=2.0) and the aforementioned equations (24) and (23), an electrical angular position θMFR of a vector of the first rotating magnetic field of the first stator 13 with respect to the reference coil is expressed by the following equation (39), and the electrical angular velocity of the first rotating magnetic field with respect to the first stator 13 (hereinafter referred to as the "first magnetic field electrical angular velocity ωMFR") is expressed by the following equation (40):

$$\theta MFR = (\alpha+1)\theta ER2 - \alpha \cdot \theta ER1 = 3 \cdot \theta ER2 - 2 \cdot \theta ER1 \quad (39)$$

$$\omega MFR = (\alpha+1)\omega ER2 - \alpha \cdot \omega ER1 = 3 \cdot \omega ER2 - 2 \cdot \omega ER1 \quad (40)$$

Figure 6:
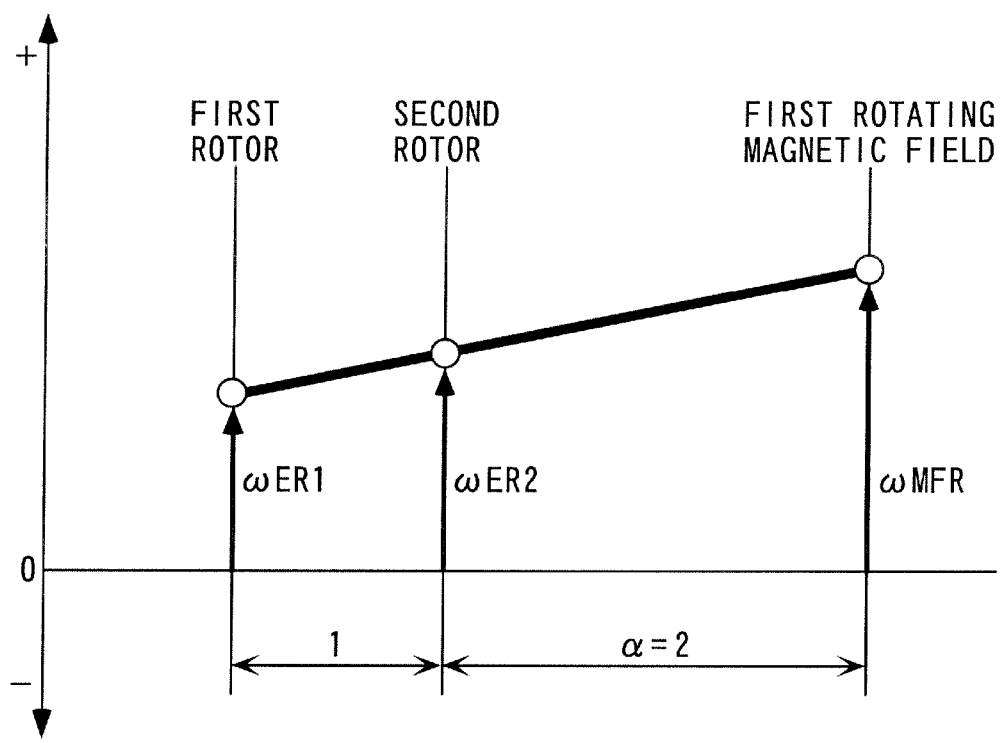
FIG. 6 A velocity collinear chart illustrating an example of the relationship between a first magnetic field electrical angular velocity, and first and second rotor electrical angular velocities of the first rotating machine appearing in FIG. 1.

Therefore, the relationship between the first magnetic field electrical angular velocity ωMFR, the first rotor electrical angular velocity ωER1, and the second rotor electrical angular velocity ωER2, which is represented in a so-called velocity collinear chart, is illustrated e.g. as in FIG. 6. In FIG. 6 and other velocity collinear charts, described hereinafter, vertical lines intersecting with a horizontal line indicative of a value of 0 are for representing the respective rotational speeds of rotary elements, and the distance from the horizontal line to a white circle shown on each vertical line corresponds to the angular velocity (rotational speed) of each of the rotary elements denoted at opposite ends of the vertical line.

Further, assuming that torque equivalent to electric power supplied to the first stator 13 and the first magnetic field electrical angular velocity ωMFR is referred to as the first driving equivalent torque TSE1, the relationship between this first driving equivalent torque TSE1, a torque transmitted to the first rotor 14 (hereinafter referred to as the "first rotor-transmitted torque TR1"), and a torque transmitted to the second rotor 15 (hereinafter referred to as the "second rotor-transmitted torque TR2") is expressed by the following equation (41), as is apparent from the first pole pair number ratio α (=2.0) and the aforementioned equation (32):

$$TSE1 = \frac{TR1}{\alpha} = \frac{-TR2}{(\alpha+1)} = \frac{TR1}{2} = \frac{-TR2}{3} \quad (41)$$

The relationship between the electrical angular velocities, expressed by the equation (40), and the relationship between the torques, expressed by the equation (41) are quite the same as the relationship between the rotational speeds of a sun gear, a ring gear, and a carrier of a planetary gear unit having a gear ratio between the sun gear and the ring gear set to 1:2, and the relationship between torques of the same.

Next, a more specific description will be given of how electric power supplied to the first stator 13 is converted to motive power and is output from the first rotor 14 and the second rotor 15. First, a case where electric power is supplied to the first stator 13 in a state in which the first rotor 14 is held unrotatable will be described with reference to FIGS. 7 to 9. Note that in FIGS. 7 to 9, reference numerals indicative of a plurality of component elements are omitted from illustration for convenience. This also applies to other figures, referred to hereinafter. Further, in FIGS. 7 to 9, one identical first armature magnetic pole and one identical core 15*a* are indicated by hatching for clarity.

Figure 7:
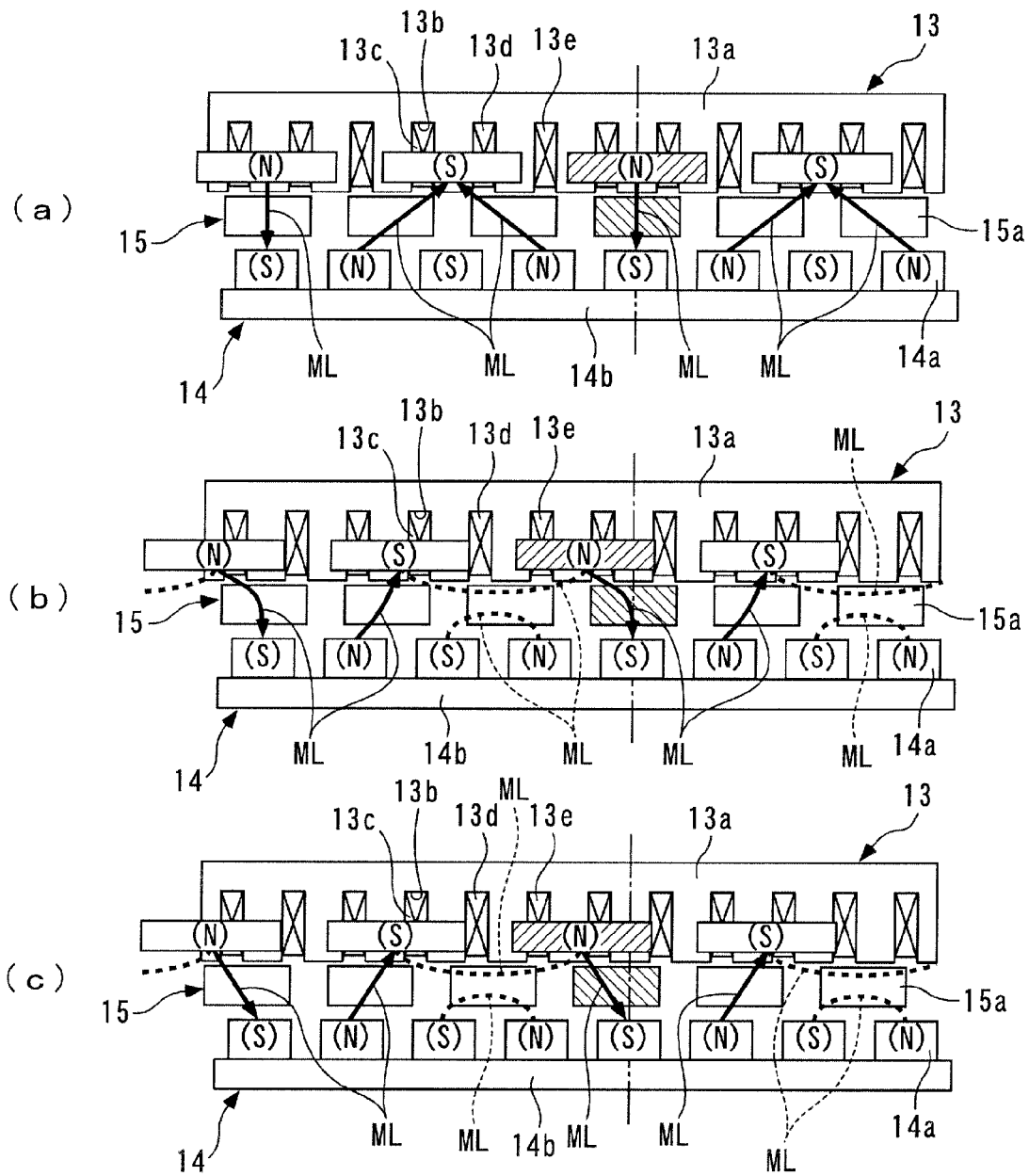
FIG. 7 Diagrams illustrating the operation of the first rotating machine appearing in FIG. 1 in a case where electric power is supplied to the first stator in a state of the first rotor being held unrotatable.
Figure 8:
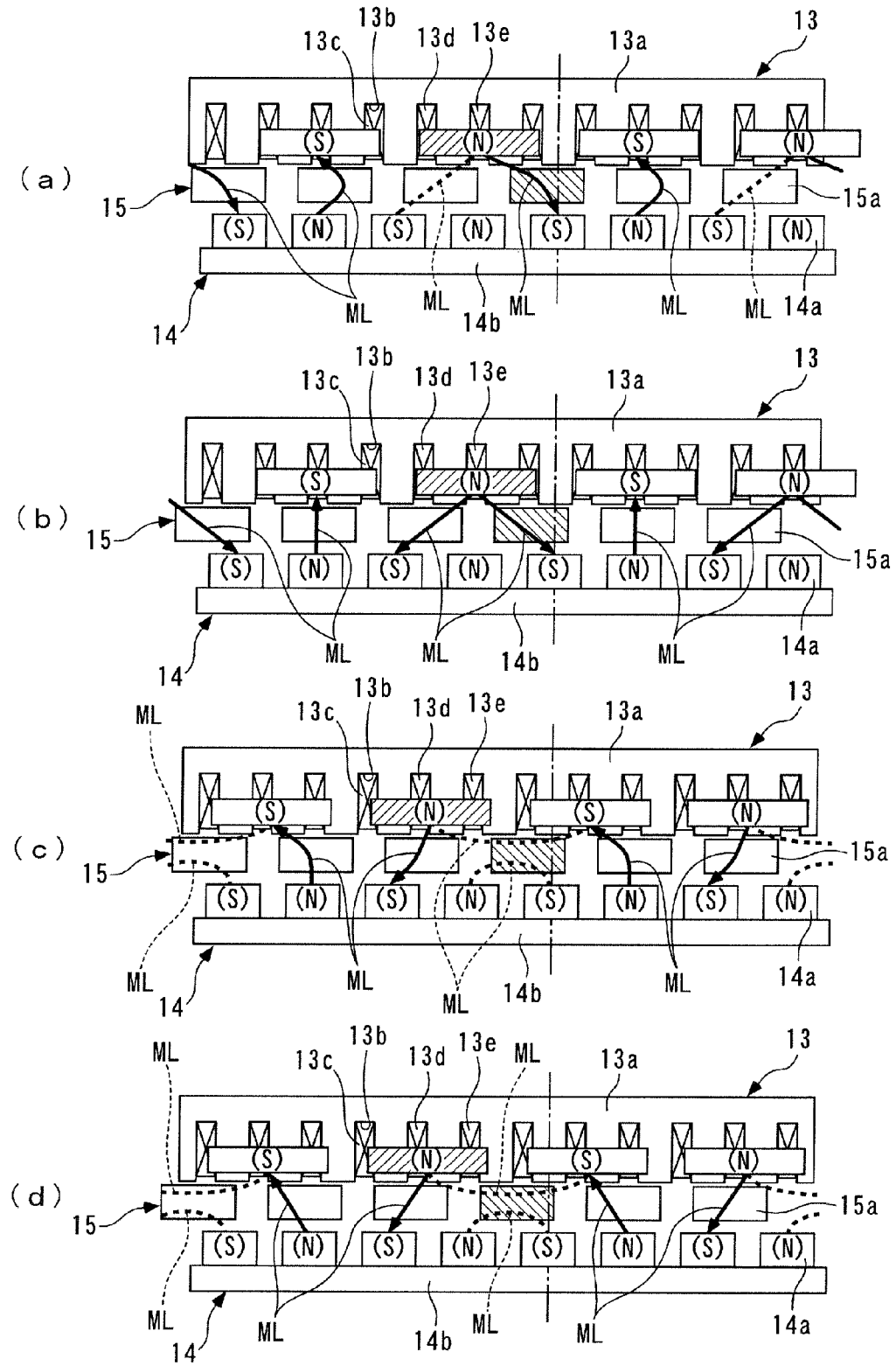
FIG. 8 Diagrams illustrating a continuation of the operation illustrated in FIG. 7.

First, as shown in FIG. 7(*a*), from a state where the center of a certain core 15*a* and the center of a certain permanent magnet 14*a* are circumferentially coincident with each other, and the center of a third core 15*a* from the certain core 15*a* and the center of a fourth permanent magnet 14*a* from the certain permanent magnet 14*a* are circumferentially coincident with each other, the first rotating magnetic field is generated such that it rotates leftward, as viewed in the figure. At the start of generation of the first rotating magnetic field, the positions of two first armature magnetic poles adjacent but one to each other that have the same polarity are caused to circumferentially coincide with the centers of ones of the permanent magnets 14*a* the centers of which are coincident with the centers of cores 15*a*, respectively, and the polarity of these first armature magnetic poles is made different from the polarity of the first magnet magnetic poles of these permanent magnets 14*a*.

Since the first rotating magnetic field is generated in the first stator 13, between the same and the first rotor 14, and the second rotor 15 having the cores 15*a* is disposed between the first stator 13 and the first rotor 14, as described hereinabove, the cores 15*a* are magnetized by the first armature magnetic poles and the first magnet magnetic poles. Because of this fact and the fact that the cores 15*a* adjacent to each other are spaced from each other, magnetic force lines ML are generated in a manner connecting between the first armature magnetic poles, the cores 15*a*, and the first magnet magnetic poles. Note that in FIGS. 7 to 9, magnetic force lines ML at the iron core 13*a* and the mounting portion 14*b* are omitted from illustration for convenience. This also applies to other figures, referred to hereinafter.

In the state shown in FIG. 7(*a*), the magnetic force lines ML are generated in a manner connecting the first armature magnetic poles, cores 15*a*, and first magnet magnetic poles the circumferential positions of which are coincident with each other, and at the same time in a manner connecting first armature magnetic poles, cores 15*a*, and first magnet magnetic poles which are adjacent to the above-mentioned first armature magnetic poles, cores 15*a*, and first magnet magnetic poles, on respective circumferentially opposite sides thereof. Further, in this state, since the magnetic force lines ML are straight, no magnetic forces for circumferentially rotating the cores 15*a* act on the cores 15*a*.

When the first armature magnetic poles rotate from the positions shown in FIG. 7(*a*) to respective positions shown in FIG. 7(*b*) in accordance with rotation of the first rotating magnetic field, the magnetic force lines ML are bent, and accordingly magnetic forces act on the cores 15*a* in such a manner that the magnetic force lines ML are made straight. In this case, the magnetic force lines ML are bent at the cores 15*a* in a manner convexly curved in an opposite direction to a direction of rotation of the first rotating magnetic field (hereinafter, this direction is referred to as the "magnetic field rotation direction") with respect to the straight lines each connecting a first armature magnetic pole and a first magnet magnetic pole which are connected to each other by an associated one of the magnetic force lines ML. Therefore, the above-described magnetic forces act to drive the cores 15*a* in the magnetic field rotation direction. The cores 15*a* are driven in the magnetic field rotation direction by such action of the magnetic forces caused by the magnetic force lines ML, for rotation to respective positions shown in FIG. 7(*c*), and the second rotor 15 provided with the cores 15*a* also rotates in the magnetic field rotation direction. Note that broken lines in FIGS. 7(*b*) and 7(*c*) represent very small magnetic flux amounts of the magnetic force lines ML, and hence weak magnetic connections between the first armature magnetic poles, the cores 15*a*, and the first magnet magnetic poles. This also applies to other figures, referred to hereinafter.

As the first rotating magnetic field further rotates, a sequence of the above-described operations, that is, the operations that "the magnetic force lines ML are bent at the cores 15*a* in a manner convexly curved in the direction opposite to the magnetic field rotation direction→the magnetic forces act on the cores 15a in such a manner that the magnetic force lines ML are made straight→the cores 15a and the second rotor 15 rotate in the magnetic field rotation direction" are repeatedly performed as shown in FIGS. 8(a) to 8(d), and FIGS. 9(a) and 9(b). As described above, in the case where electric power is supplied to the first stator 13 in the state of the first rotor 14 being held unrotatable, the action of the magnetic forces caused by the magnetic force lines ML as described above converts electric power supplied to the first stator 13 to motive power, and outputs the motive power from the second rotor 15.

FIG. 10 shows a state in which the first armature magnetic poles have rotated from the FIG. 7(a) state through an electrical angle of 2π. As is apparent from a comparison between FIG. 10 and FIG. 7(a), it is understood that the cores 15a have rotated in the same direction through ⅓ of a rotational angle of the first armature magnetic poles. This agrees with the fact that by substituting ωER1=0 into the aforementioned equation (40), ωER2=ωMFR/3 is obtained.

Figure 11:
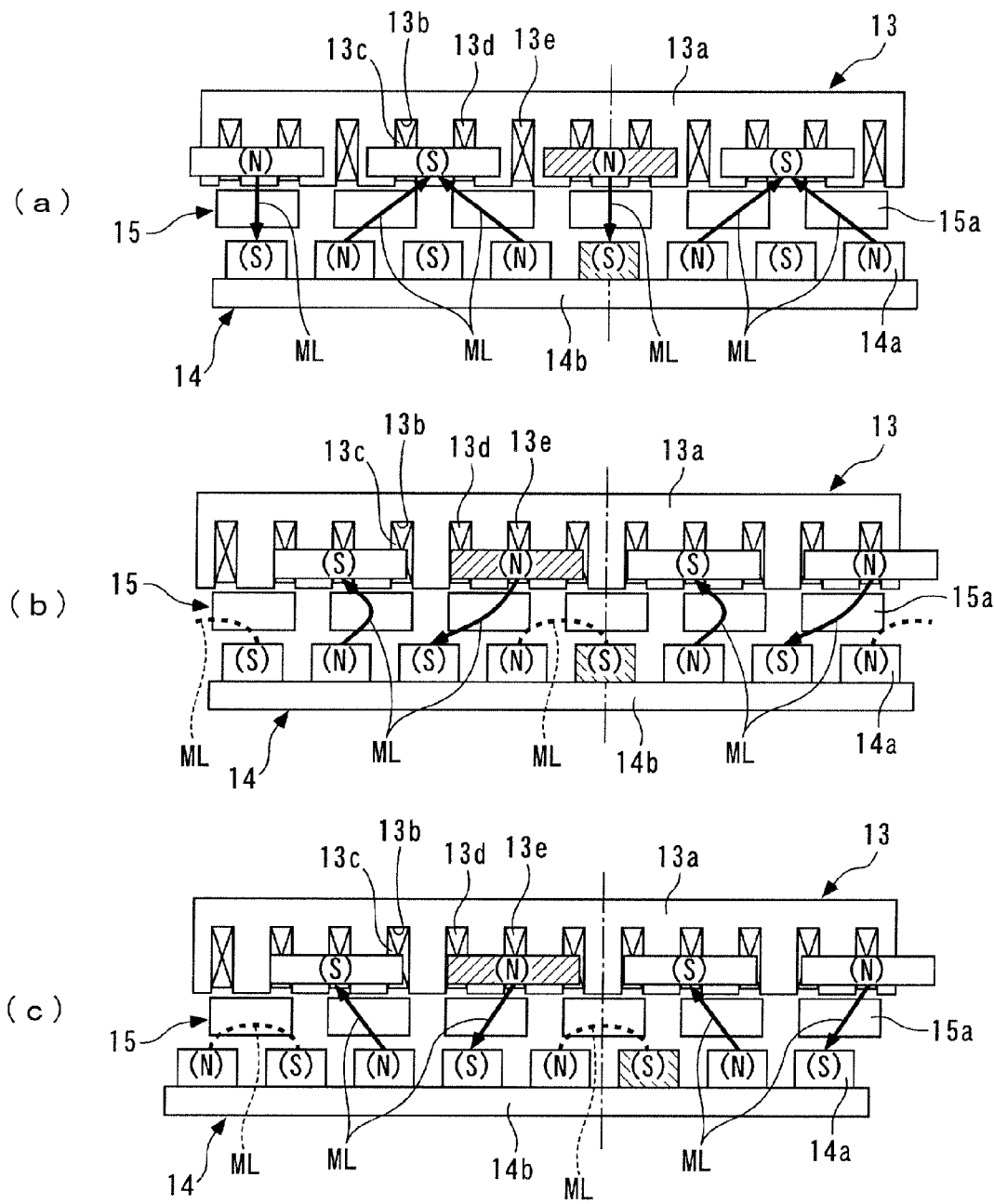
FIG. 11 Diagrams illustrating the operation of the first rotating machine appearing in FIG. 1 in a case where electric power is supplied to the first stator in a state of the second rotor being held unrotatable.
Figure 12:
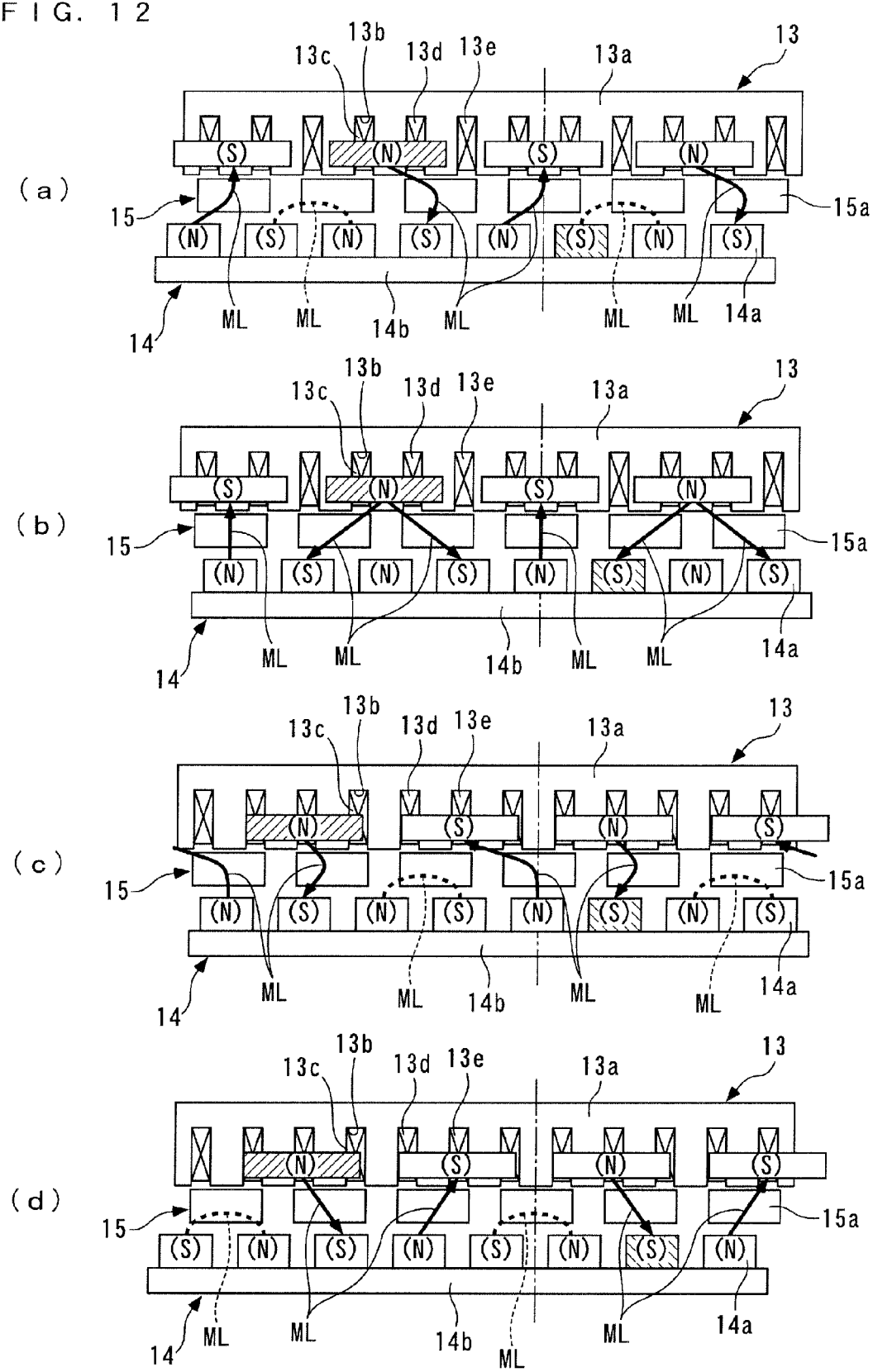
FIG. 12 Diagrams illustrating a continuation of the operation illustrated in FIG. 11.
Figure 13:
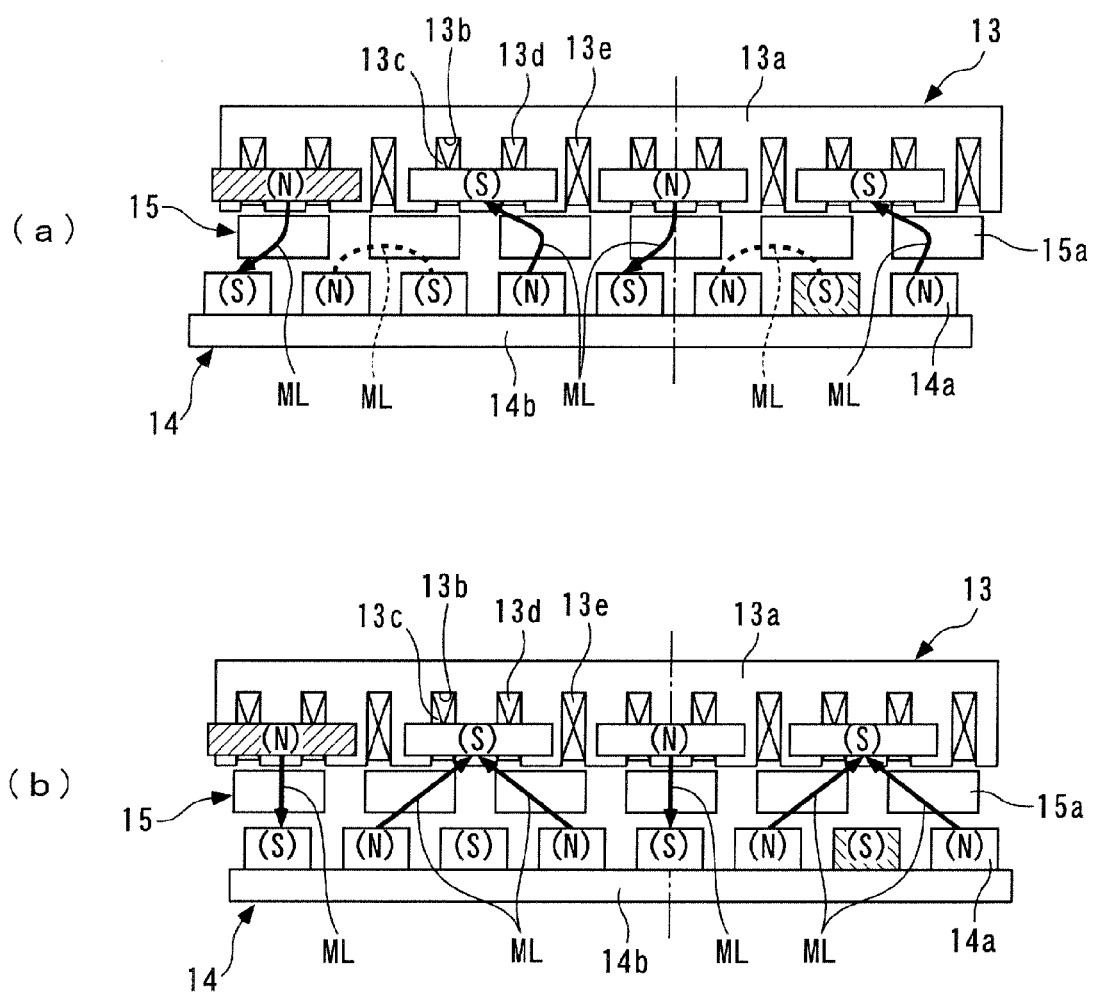
FIG. 13 Diagrams illustrating a continuation of the operation illustrated in FIG. 12.

Next, an operation in a case where electric power is supplied to the first stator 13 in a state in which the second rotor 15 is held unrotatable will be described with reference to FIGS. 11 to 13. Note that in FIGS. 11 to 13, similarly to FIGS. 7 to 9, one identical first armature magnetic pole and one identical permanent magnet 14a are indicated by hatching for clarity. First, as shown in FIG. 11(a), similarly to the above-described case shown in FIG. 7(a), from a state where the center of a certain core 15a and the center of a certain permanent magnet 14a are circumferentially coincident with each other, and the center of the third core 15a from the certain core 15a and the center of the fourth permanent magnet 14a from the certain permanent magnet 14a are circumferentially coincident with each other, the first rotating magnetic field is generated such that it rotates leftward, as viewed in the figure. At the start of generation of the first rotating magnetic field, the positions of first armature magnetic poles adjacent but one to each other that have the same polarity are caused to circumferentially coincide with the centers of corresponding ones of the respective permanent magnets 14a having centers coincident with the centers of cores 15a, and the polarity of these first armature magnetic poles is made different from the polarity of the first magnet magnetic poles of these permanent magnets 14a.

In the state shown in FIG. 11(a), similarly to the case shown in FIG. 7(a), magnetic force lines ML are generated in a manner connecting the first armature magnetic poles, cores 15a, and first magnet magnetic poles the circumferential positions of which are coincident with each other, and at the same time in a manner connecting first armature magnetic poles, cores 15a, and first magnet magnetic poles which are adjacent to the above-mentioned first armature magnetic pole, core 15a, and first magnet magnetic pole, on respective circumferentially opposite sides thereof. Further, in this state, since the magnetic force lines ML are straight, no magnetic forces for circumferentially rotating the permanent magnets 14a act on the permanent magnets 14a.

When the first armature magnetic poles rotate from the positions shown in FIG. 11(a) to respective positions shown in FIG. 11(b) in accordance with rotation of the first rotating magnetic field, the magnetic force lines ML are bent, and accordingly magnetic forces act on the permanent magnets 14a in such a manner that the magnetic force lines ML are made straight. In this case, the permanent magnets 14a are each positioned forward of a line of extension from a first armature magnetic pole and a core 15a which are connected to each other by an associated one of the magnetic force lines ML, in the magnetic field rotation direction, and therefore the above-described magnetic forces act on the permanent magnets 14a such that each permanent magnet 14a is caused to be positioned on the extension line, i.e. such that the permanent magnet 14a is driven in a direction opposite to the magnetic field rotation direction. The permanent magnets 14a are driven in a direction opposite to the magnetic field rotation direction by such action of the magnetic forces caused by the magnetic force lines ML, and rotate to respective positions shown in FIG. 11(c). The first rotor 14 provided with the permanent magnets 14a also rotates in the direction opposite to the magnetic field rotation direction.

As the first rotating magnetic field further rotates, a sequence of the above-described operations, that is, the operations that "the magnetic force lines ML are bent and the permanent magnets 14a are each positioned forward of a line of extension from a first armature magnetic pole and a core 15a which are connected to each other by an associated one of the magnetic force lines ML, in the magnetic field rotation direction→the magnetic forces act on the permanent magnets 14a in such a manner that the magnetic force lines ML are made straight→the permanent magnets 14a and the first rotor 14 rotate in the direction opposite to the magnetic field rotation direction" are repeatedly performed as shown in FIGS. 12(a) to 12(d), and FIGS. 13(a) and 13(b). As described above, in the case where electric power is supplied to the first stator 13 in the state of the second rotor 15 being held unrotatable, the above-described action of the magnetic forces caused by the magnetic force lines ML converts electric power supplied to the first stator 13 to motive power, and outputs the motive power from the first rotor 14.

FIG. 13(b) shows a state in which the first armature magnetic poles have rotated from the FIG. 11(a) state through the electrical angle of 2π. As is apparent from a comparison between FIG. 13(b) and FIG. 11(a), it is understood that the permanent magnets 14a have rotated in the opposite direction through ½ of a rotational angle of the first armature magnetic poles. This agrees with the fact that by substituting ωER2=0 into the aforementioned equation (40), −ωER1=ωMFR/2 is obtained.

Figure 14:
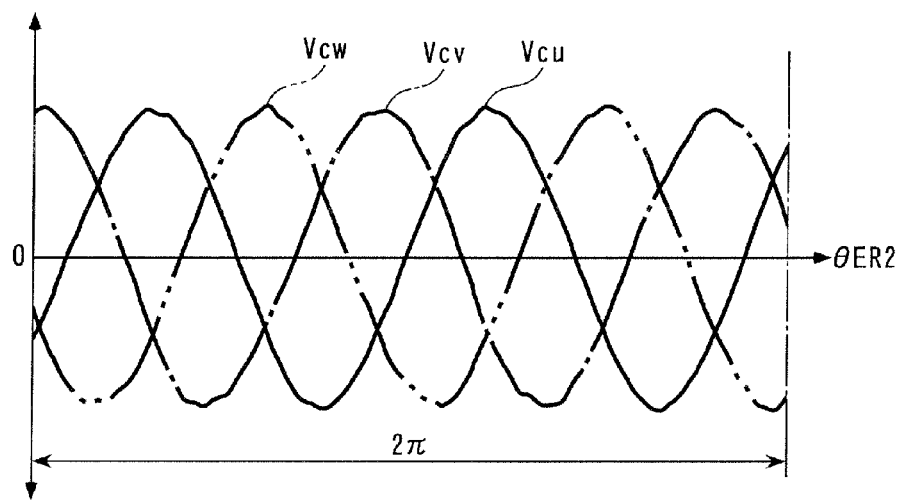
FIG. 14 A diagram illustrating an example of changes in U-phase to W-phase counter-electromotive force voltages in the first rotating machine appearing in FIG. 1, in a case where the number of the first armature magnetic poles, the number of the cores, and the number of first magnet magnetic poles are set to 16, 18 and 20, respectively, and the first rotor is held unrotatable.
Figure 15:
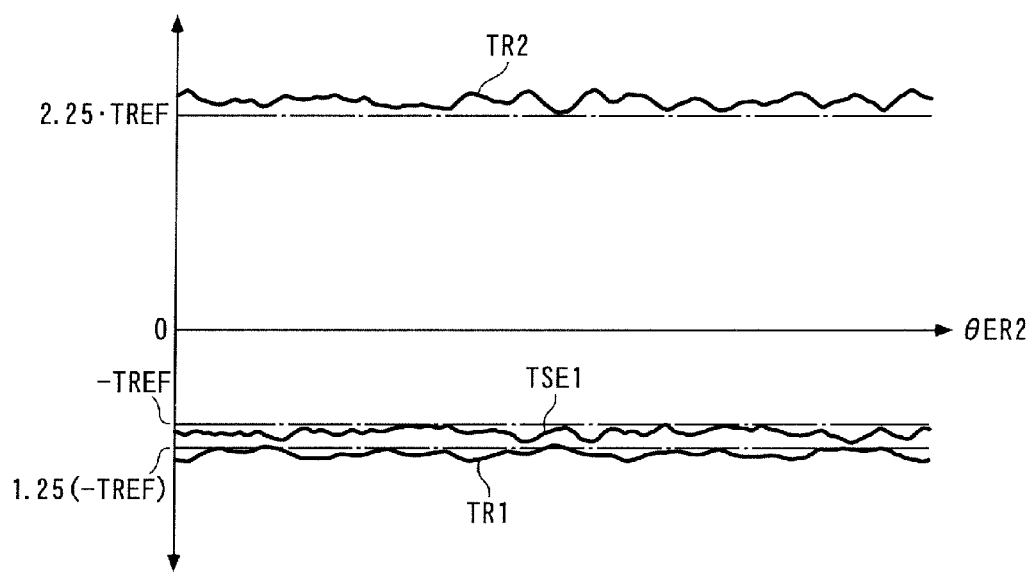
FIG. 15 A diagram illustrating an example of changes in a first driving equivalent torque and first and second rotor-transmitted torques in the first rotating machine appearing in FIG. 1, in the case where the number of the first armature magnetic poles, the number of the cores, and the number of the first magnet magnetic poles are set to 16, 18 and 20, respectively, and the first rotor is held unrotatable.

FIGS. 14 and 15 show results of a simulation of control in which the numbers of the first armature magnetic poles, the cores 15a, and the permanent magnets 14a are set to 16, 18 and 20, respectively; the first rotor 14 is held unrotatable; and motive power is output from the second rotor 15 by supplying electric power to the first stator 13. FIG. 14 shows an example of changes in the U-phase to W-phase counter-electromotive force voltages Vcu to Vcw during a time period over which the second rotor electrical angle θER2 changes from 0 to 2π.

In this case, due to the fact that the first rotor 14 is held unrotatable, and the fact that the pole pair numbers of the first armature magnetic poles and the first magnet magnetic poles are equal to 8 and 10, respectively, and from the aforementioned equation (25), the relationship between the first magnetic field electrical angular velocity ωMFR and the first and second rotor electrical angular velocities ωER1 and ωER2 is expressed by ωMFR=2.25·ωER2. As shown in FIG. 14, during a time period over which the second rotor electrical angle θER2 changes from 0 to 2π, the U-phase to W-phase counter-electromotive force voltages Vcu to Vcw are generated over approximately 2.25 repetition periods thereof. Further, FIG. 14 shows changes in the U-phase to W-phase counter-electromotive force voltages Vcu to Vcw, as viewed from the second rotor 15. As shown in the figure, with the second rotor electrical angle θER2 as the horizontal axis, the counter-electromotive force voltages are arranged in the order of the W-phase counter-electromotive force voltage Vcw, the V-phase counter-electromotive force voltage Vcv, and the U-phase counter-electromotive force voltage Vcu. This represents that the second rotor 15 rotates in the magnetic field rotation direction. The simulation results described above with reference to FIG. 14 agree with the relationship of ωMFR=2.25·ωER2, based on the aforementioned equation (25).

Further, FIG. 15 shows an example of changes in the first driving equivalent torque TSE1, and the first and second rotor-transmitted torques TR1 and TR2. In this case, due to the fact that the pole pair numbers of the first armature magnetic poles and the first magnet magnetic poles are equal to 8 and 10, respectively, and from the aforementioned equation (32), the relationship between the first driving equivalent torque TSE1, and the first and second rotor-transmitted torques TR1 and TR2 is represented by TSE1=TR1/1.25=−TR2/2.25. As shown in FIG. 15, the first driving equivalent torque TSE1 is approximately equal to −TREF; the first rotor-transmitted torque TR1 is approximately equal to 1.25·(−TREF); and the second rotor-transmitted torque TR2 is approximately equal to 2.25·TREF. This symbol TREF represents a predetermined torque value (e.g. 200 Nm). The simulation results described above with reference to FIG. 15 agree with the relationship of TSE1=TR1/1.25=−TR2/2.25, based on the aforementioned equation (32).

Figure 16:
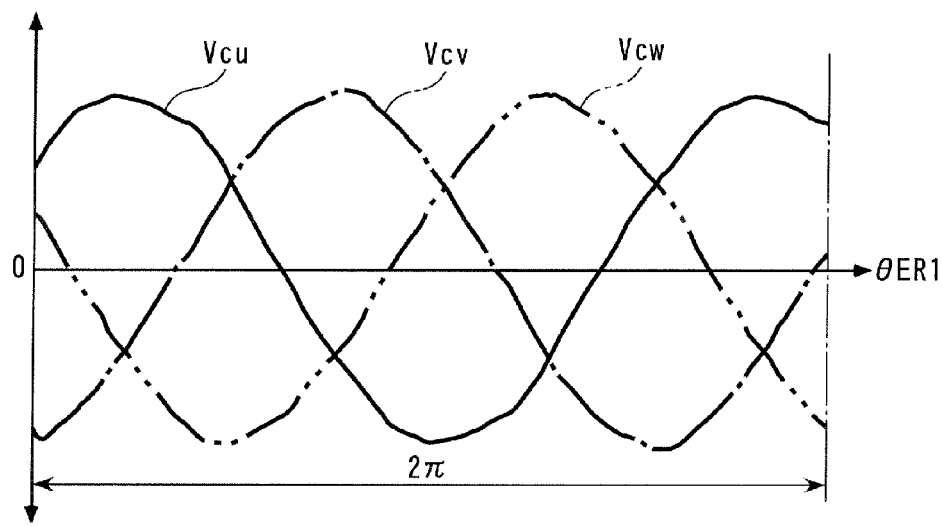
FIG. 16 A diagram illustrating an example of changes in the U-phase to W-phase counter-electromotive force voltages in the first rotating machine appearing in FIG. 1, in a case where the number of the first armature magnetic poles, the number of the cores and the number of the first magnet magnetic poles are set to 16, 18 and 20, respectively, and the second rotor is held unrotatable.
Figure 17:
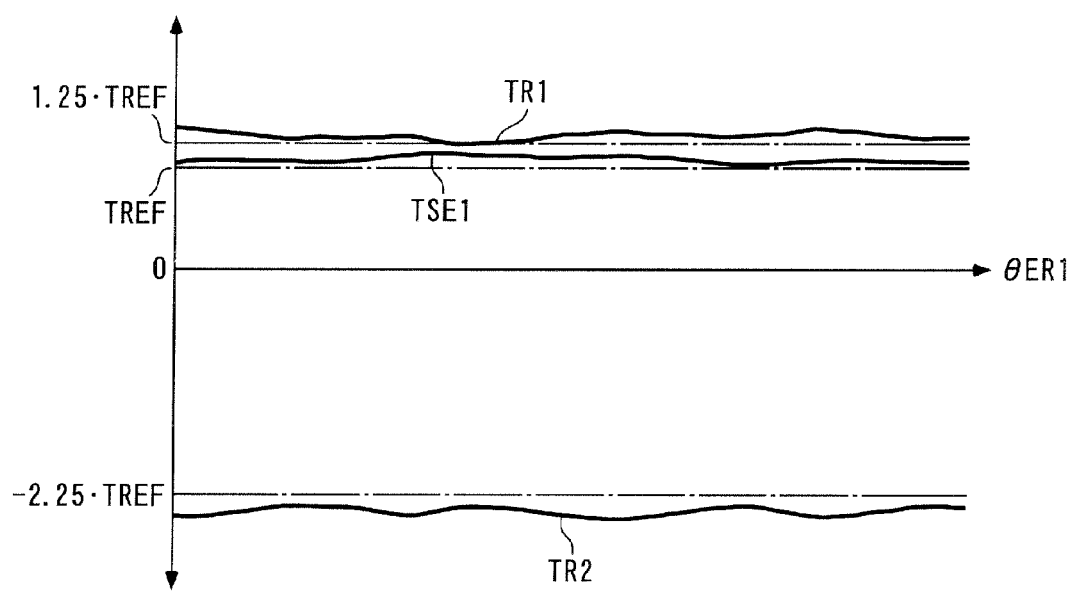
FIG. 17 A diagram illustrating an example of changes in the first driving equivalent torque and the first and second rotor-transmitted torques in the first rotating machine appearing in FIG. 1, in the case where the number of the first armature magnetic poles, the number of the cores, and the number of the first magnet magnetic poles are set to 16, 18 and 20, respectively, and the second rotor is held unrotatable.

FIGS. 16 and 17 show results of a simulation of control in which the numbers of the first armature magnetic poles, the cores 15a, and the permanent magnets 14a are set in the same manner as in the cases illustrated in FIGS. 14 and 15; the second rotor 15 is held unrotatable in place of the first rotor 14; and motive power is output from the first rotor 14 by supplying electric power to the first stator 13. FIG. 16 shows an example of changes in the U-phase to W-phase counter-electromotive force voltages Vcu to Vcw during a time period over which the first rotor electrical angle θER1 changes from 0 to 2π.

In this case, due to the fact that the second rotor 15 is held unrotatable, and the fact that the pole pair numbers of the first armature magnetic poles and the first magnet magnetic poles are equal to 8 and 10, respectively, and from the aforementioned equation (25), the relationship between the first magnetic field electrical angular velocity ωMFR, and the first and second rotor electrical angular velocities ωER1 and ωER2 is expressed by ωMFR=−1.25·ωER1. As shown in FIG. 16, during a time period over which the first rotor electrical angle θER1 changes from 0 to 2π, the U-phase to W-phase counter-electromotive force voltages Vcu to Vcw are generated over approximately 1.25 repetition periods thereof. Further, FIG. 16 shows changes in the U-phase to W-phase counter-electromotive force voltages Vcu to Vcw, as viewed from the first rotor 14. As shown in the figure, with the first rotor electrical angle θER1 as the horizontal axis, the counter-electromotive force voltages are arranged in the order of the U-phase counter-electromotive force voltage Vcu, the V-phase counter-electromotive force voltage Vcv, and the W-phase counter-electromotive force voltage Vcw. This represents that the first rotor 14 rotates in the direction opposite to the magnetic field rotation direction. The simulation results described above with reference to FIG. 16 agree with the relationship of ωMFR=−1.25·ωER1, based on the aforementioned equation (25).

Further, FIG. 17 shows an example of changes in the first driving equivalent torque TSE1 and the first and second rotor-transmitted torques TR1 and TR2. Also in this case, similarly to the FIG. 15 case, the relationship between the first driving equivalent torque TSE1, and the first and second rotor-transmitted torques TR1 and TR2 is represented by TSE1=TR1/1.25=−TR2/2.25 from the aforementioned equation (32). As shown in FIG. 17, the first driving equivalent torque TSE1 is approximately equal to TREF; the first rotor-transmitted torque TR1 is approximately equal to 1.25·TREF; and the second rotor-transmitted torque TR2 is approximately equal to −2.25·TREF. The simulation results described above with reference to FIG. 17 agree with the relationship of TSE1=TR1/1.25=−TR2/2.25, based on the aforementioned equation (32).

As described above, in the first rotating machine 11, when the first rotating magnetic field is generated by supplying electric power to the first stator 13, magnetic force lines ML are generated in a manner connecting between the aforementioned first magnet magnetic poles, the core 15a, and the first armature magnetic poles, and the action of the magnetism of the magnetic force lines ML converts the electric power supplied to the first stator 13 to motive power. The motive power is output from the first rotor 14 or the second rotor 15. In this case, the relationship as expressed by the aforementioned equation (40) holds between the first magnetic field electrical angular velocity ωMFR, and the first and second rotor electrical angular velocities ωER1 and ωER2, and the relationship as expressed by the aforementioned equation (41) holds between the first driving equivalent torque TSE1, and the first and second rotor-transmitted torques TR1 and TR2.

Therefore, by inputting motive power to at least one of the first and second rotors 14 and 15 in a state where electric power is not being supplied to the first stator 13, to thereby cause the same to rotate with respect to the first stator 13, electric power is generated in the first stator 13, and the first rotating magnetic field is generated. In this case as well, such magnetic force lines ML that connect between the first magnet magnetic poles, the core 15a and the first armature magnetic poles are generated, and the action of the magnetism of the magnetic force lines ML causes the electrical angular velocity relationship shown in the equation (40) and the torque relationship shown in the equation (41) to hold.

That is, assuming that a torque equivalent to the generated electric power and the first magnetic field electrical angular velocity ωMFR, is referred to as the first electric power-generating equivalent torque TGE1, a relationship shown in the equation (41) also holds between the first electric power-generating equivalent torque TGE1 and the first and second rotor-transmitted torques TR1 and TR2. As is apparent from the above, the first rotating machine 11 has the same functions as those of an apparatus formed by combining a planetary gear unit and a general one-rotor-type rotating machine.

By controlling the first PDU 41 and the VCU 43, the ECU 2 controls electric current supplied to the first stator 13, electric current generated in the first stator 13, and the rotational speed of the first rotating magnetic field (hereinafter referred to as the "first magnetic field rotational speed) NMF1.

The above-described second rotating machine 21 is a general brushless DC motor, and includes an unmovable stator 22, and a rotatable rotor 23. The stator 22 is formed e.g. by three-phase coils, and is fixed to the casing CA. Further, the stator 22 is electrically connected to the main battery 44 via a second power drive unit (hereinafter referred to as the "second PDU") 42 and the above-mentioned VCU 43. Furthermore, the rotor 23 is formed e.g. by a plurality of magnets, and is disposed in a manner opposed to the stator 22.

Similarly to the aforementioned first PDU 41, the above-mentioned second PDU 42 is implemented as an electric circuit comprising an inverter, and outputs DC power supplied from the main battery 44 to the stator 22, in a state converted to three-phase AC power. Further, the second PDU 42 is electrically connected to the first PDU 41, whereby the first stator 13 of the first rotating machine 11 and the stator 22 of the second rotating machine 21 are electrically connected to each other via the first and second PDUs 41 and 42. Furthermore, the second PDU 42 is electrically connected to the ECU 2. Further, the VCU 43 outputs electric power from the main battery 44, to the second PDU 42 in a state where the voltage of the electric power is boosted, and outputs electric power supplied from the second PDU 42 to the main battery 44, in a state where the voltage of the electric power is dropped.

In the second rotating machine 21 constructed as above, when electric power is supplied from the main battery 44 to the stator 22 via the VCU 43 and the second PDU 42, the supplied electric power is converted to motive power, and is output from the rotor 23. Further, when no electric power is supplied to the stator 22, if the rotor 23 is caused to rotate with respect to the stator 22 by inputting motive power to the rotor 23, the motive power input to the rotor 23 is converted to electric power (electric power generation) in the stator 22, and is output from the stator 22. The ECU 2 controls the second PDU 42 and the VCU 43 to thereby control electric current supplied to the stator 22, electric current generated in the stator 22, and the rotational speed of the rotor 23 (hereinafter referred to as the "second rotating machine rotational speed") NM2.

The rotor 23 is integrally formed on the above-mentioned second rotating shaft 5, whereby the rotor 23 is coaxially directly connected to the first rotor 14 of the first rotating machine 11. Further, a gear G1 is integrally formed on the second rotating shaft 5.

The aforementioned differential gear DG is for distributing motive power to the left and right drive wheels DW and DW, and comprises left and right side gears DS and DS having gear teeth equal in number to each other, a plurality of pinion gears DP in mesh with the gears DS and DS, and a differential case DC rotatably supporting the pinion gears DP. The left and right side gears DS and DS are connected to the left and right drive wheels DW and DW via left and right axles 6 and 6, respectively.

In the differential gear DS constructed as above, motive power transmitted to the differential case DC is distributed to the left and right side gears DS and DS via the pinion gears DP, and is further distributed to the left and right drive wheels DW and DW via the left and right axles 6 and 6. Further, the differential case DC is integrally formed with a gear G2. The gear G2 is in mesh with the above-described gear G1 via an intermediate gear G3.

As described above, in the power plant 1, the second rotor 15 of the first rotating machine 11 is mechanically connected to the crankshaft 3a. Further, the first rotor 14 of the first rotating machine 11 and the rotor 23 of the second rotating machine 21 are mechanically connected to each other, and are mechanically connected to the drive wheels DW and DW via the gear G1, the gear G3, the differential gear DG, and the axles 6 and 6.

The above-described main battery 44 is formed by a combination of a plurality of battery modules, and is set to a voltage higher than the voltage of the auxiliary battery 33. Further, although not shown, the auxiliary battery 33 is electrically connected to the main battery 44 via a downverter. This downverter is configured to be capable of charging the auxiliary battery 33 by supplying electric power from the main battery 44 to the auxiliary battery 33 in a state where the voltage of the electric power is dropped, and the operation thereof is controlled by the ECU 2.

Further, as shown in FIG. 2, a crank angle sensor 51 and a first rotational angle sensor 52 are electrically connected to the ECU 2. The crank angle sensor 51 detects the rotational angular position of the crankshaft 3a, and delivers a signal indicative of the detected rotational angular position to the ECU 2. The ECU 2 calculates the rotational speed of the engine 3 (hereinafter referred to as the "engine speed") NE based on the detected rotational angular position of the crankshaft 3a. Further, the second rotor 15 is directly connected to the crankshaft 3a, as described above, and hence the ECU 2 calculates the rotational angular position of the second rotor 15 with respect to the stator 13, based on the detected rotational angular position of the crankshaft 3a, and calculates the rotational speed of the second rotor 15 (hereinafter referred to as the "second rotor rotational speed") NR2.

The above-mentioned first rotational angle sensor 52 detects the rotational angular position of the first rotor 14 with respect to the first stator 13, and delivers a signal indicative of the detected rotational angular position of the first rotor 14 to the ECU 2. The ECU 2 calculates the rotational speed of the first rotor 14 (hereinafter referred to as the "first rotor rotational speed") NR1 based on the detected rotational angular position of the first rotor 14. Further, the first rotor 14 and the rotor 23 are directly connected to each other, as described above, so that the ECU 2 calculates the rotational angular position of the rotor 23 with respect to the stator 22, based the detected rotational angular position of the first rotor 14, and calculates the second rotating machine rotational speed NM2 (rotational speed of the rotor 23).

Furthermore, delivered to the ECU 2 are a detection signal indicative of the rotational speed of the drive wheels DW and DW (hereinafter referred to as the "drive wheel rotational speed") NDW from a rotational speed sensor 53, and detection signals indicative of the values of current and voltage input to and output from the main battery 44 from a current-voltage sensor 54. The ECU 2 calculates a charge state SOC of the main battery 44 based on the detection signals from the current-voltage sensor 54. Also delivered to the ECU 2 is a detection signal indicative of an operation amount of an accelerator pedal (not shown) of the vehicle (hereinafter referred to as the "accelerator pedal opening") AP from an accelerator pedal opening sensor 55. Further, a brake pedal depression force sensor 56 detects a force by which a driver depresses a brake pedal (not shown) of the vehicle (hereinafter referred to as the "brake pedal depression force") BP, and delivers a detection signal indicative of the detected brake pedal depression force BP to the ECU 2. Further, the vehicle is provided with an ignition switch (hereinafter referred to as the "IG·SW") 57. The IG·SW 57 delivers a signal indicative of an ON/OFF state thereof to the ECU 2, according to an operation of an ignition key (not shown).

The ECU 2 is implemented by a microcomputer comprising an I/O interface, a CPU, a RAM and a ROM. The ECU 2 controls the operations of the engine 3, the starter 31, and the first and second rotating machines 11 and 21 based on the detection signals from the aforementioned sensors and switches 51 to 57, according to control programs stored in the ROM. This causes the vehicle to be operated in various operation modes. The operation modes include an EV travel-time ENG start mode, a recovery-from-deceleration ENG start mode, and a vehicle stoppage-time ENG start mode. Now, a description will be given of these operation modes, in order.

[EV Travel-Time ENG Start Mode]

This EV travel-time ENG start mode is an operation mode for starting the engine 3 during an EV travel mode which is an operation mode for causing the vehicle to travel by driving the drive wheels DW and DW using only the second rotating machine 21 as a motive power source in a state where the engine 3 is stopped and no output is generated from the engine 3. Control in the EV travel-time mode and the EV travel-time ENG start mode is performed according to a process shown in FIG. 18.

Referring to FIG. 18, first, in a step 1 (shown as "S1" in FIG. 18; the following steps are also shown in the same way), the operation of the second rotating machine 21 is controlled in the following manner: First, a target value TM2OBJ of an output torque of the second rotating machine 21 is calculated by the following equation (42):

$$TM2OBJ = TREQ + \alpha \cdot TR2OBJZ/(1+\alpha) \qquad (42)$$

wherein TREQ represents a torque which the driver demands of the drive wheels DW and DW, and is calculated by searching a predetermined map (not shown) according to the calculated engine speed NE and the detected accelerator pedal opening AP. Further, TR2OBJZ represents the immediately preceding value of the target value TR2OBJ of the second rotor-transmitted torque TR2, calculated as described hereinafter, and is set to 0 when the calculation thereof has not yet been carried out.

Then, electric power is supplied from the main battery 44 to the stator 22, and electric current supplied to the stator 22 is controlled such that a torque corresponding to the target value TM2OBJ acts on the rotor 23 in the direction of normal rotation.

In a step 2 following the step 1, the operation of the first rotating machine 11 is controlled in the following manner: First, the target value TR2OBJ is calculated with a predetermined feedback control algorithm such that the engine speed NE becomes equal to a predetermined first start-time rotational speed NEST1. This first start-time rotational speed NEST1 is a predetermined rotational speed capable of starting the engine 3 and is set to a predetermined rotational speed within a range of 500 to 700 rpm, for example.

Figure 19:
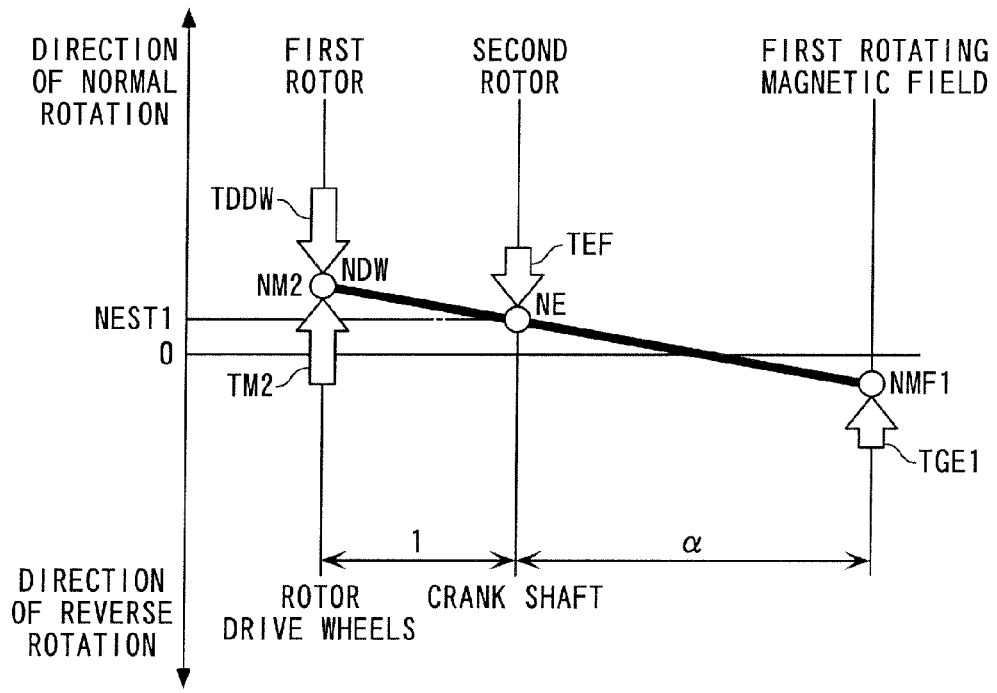
FIG. 19 A velocity collinear chart illustrating an example of the relationship between the rotational speeds of various types of rotary elements of the power plant shown in FIG. 1 and the relationship between torques thereof, during execution of the process shown in FIG. 18.

Next, as shown in FIG. 19, referred to hereinafter, in a case where the direction of rotation of the first rotating magnetic field determined by the drive wheel rotational speed NDW and the engine speed NE is the direction of reverse rotation, electric power is generated in the first stator 13, and electric current generated in the first stator 13 is controlled such that the second rotor-transmitted torque TR2 becomes equal to the calculated target value TR2OBJ. Thus, the first electric power-generating equivalent torque TGE1 is generated, and the generated first electric power-generating equivalent torque TGE1 acts to cause the second rotor 15 and the crankshaft 3a to perform normal rotation, whereby the second rotor-transmitted torque TR2 is controlled such that it becomes equal to the target value TR2OBJ.

On the other hand, in a case where the direction of rotation of the first rotating magnetic field determined by the drive wheel rotational speed NDW and the engine speed NE is the direction of normal rotation, electric power is supplied from the main battery 44 to the first stator 13, and electric current supplied to the first stator 13 is controlled such that the second rotor-transmitted torque TR2 becomes equal to the calculated target value TR2OBJ. Thus, the first driving equivalent torque TSE1 is generated, and the generated first driving equivalent torque TSE1 acts to cause the second rotor 15 and the crankshaft 3a to perform normal rotation, whereby the second rotor-transmitted torque TR2 is controlled such that it becomes equal to the target value TR2OBJ.

In a step 3 following the step 2, it is determined whether or not the calculated charge state SOC is not larger than a first predetermined value SOCR1. The first predetermined value SOCR1 represents such a predetermined charge state in which the electric power of the main battery 44 is short when the drive wheels DW and DW are driven using the second rotating machine 21 without using the engine 3, and is set to 30%, for example.

If the answer to the question of the step 3 is negative (NO) (SOC>SOCR1), i.e. if the amount of electric power remaining in the main battery 44 is large enough, the present process is immediately terminated. As a consequence, the EV travel mode is continued. On the other hand, if the answer to the question of the step 3 is affirmative (YES), i.e. if the charge state SOC has become not larger than the first predetermined value SOCR1, the ignition operation of the fuel injection valves 3b and the spark plugs 3c of the engine 3 is controlled, whereby the engine 3 at rest is started (step 4), followed by terminating the present process.

Next, an example of the above-described process shown in FIG. 18 will be described with reference to FIG. 19. First, a description is given of FIG. 19. As is apparent from the above-described relationship of connections between the various rotary elements of the power plant 1, the engine speed NE and the second rotor rotational speed NR2 are equal to each other, and the first rotor rotational speed NR1 and the second rotating machine rotational speed NM2 are equal to each other. Further, the first rotor rotational speed NR1 and the second rotating machine rotational speed NM2 are equal to the drive wheel rotational speed NDW provided that a change in speed e.g. by the gear G1 and the differential gear DG is ignored. Furthermore, the first magnetic field rotational speed NMF1, and the first and second rotor rotational speeds NR1 and NR2 are in a predetermined collinear relationship expressed by the aforementioned equation (40).

From the above, the relationship between the first magnetic field rotational speed NMF1, the engine speed NE, the drive wheel rotational speed NDW, and the second rotating machine rotational speed NM2 is represented by a velocity collinear chart as shown in FIG. 19. Note that in FIG. 19 and other velocity collinear charts, referred to hereinafter, similarly to the above-mentioned FIG. 6 velocity collinear chart, the distance from a horizontal line indicative of a value of 0 to a white circle shown on each vertical line corresponds to the rotational speed of each of the rotary elements denoted at opposite ends of the vertical line. For convenience, symbols indicative of the rotational speeds of the rotary elements are denoted close to the white circles associated therewith. Further, in FIG. 19, TEF represents the friction of the engine 3 acting on the crankshaft 3a (hereinafter referred to as the "engine friction"). Further, TM2 represents an output torque of the second rotating machine 21 acting on the rotor 23 along with the supply of electric power to the stator 22 (hereinafter referred to as the "second powering torque"), and TDDW represents a reaction force against a torque transmitted to the drive wheels DW and DW (hereinafter referred to as the "drive wheel-transmitted torque"). Note that it is assumed that in the following description, a change in speed e.g. by the differential gear DG is ignored.

As is apparent from FIG. 19, part of the second powering torque TM2 is transmitted to the first rotor 14, and is transmitted to the crankshaft 3a via the second rotor 15, using the first electric power-generating equivalent torque TGE1 as a reaction force, which causes the crankshaft 3a to be driven for normal rotation. Further, the remainder of the second powering torque TM2 is transmitted to the drive wheels DW and DW, whereby the drive wheels DW and DW are driven for normal rotation, to thereby cause forward travel of the vehicle.

In this case, by controlling the operation of the first rotating machine 11 in the step 2, the electric current generated in the first stator 13 is controlled such that the second rotor-transmitted torque TR2 becomes equal to the target value TR2OBJ, whereby the engine speed NE is feedback-controlled such that it becomes equal to the first start-time rotational speed NEST1, and is held at the first start-time rotational speed NEST1. Further, in a state where the engine speed NE is held at the first start-time rotational speed NEST1, as described above, when the charge state SOC has become not larger than the first predetermined value SOCR1 (YES to the step 3), the engine 3 is started without changing the engine speed NE (step 4).

Further, as is apparent from FIG. 19, the first driving equivalent torque TSE1 acts to cause the first rotor 14, the rotor 23, and the drive wheels DW and DW to perform reverse rotation, using the engine friction TEF as a reaction force. A torque thus acting to cause the first rotor 14 and so forth to perform reverse rotation (hereinafter referred to as the "first rotor reverse rotation torque") is represented by $-\alpha \cdot TR2/(1+\alpha)$ using the second rotor-transmitted torque TR2 and the first pole pair number ratio $\alpha$, as is apparent from the aforementioned equation (41).

On the other hand, by controlling the operation of the second rotating machine 21 in the step 1, the electric current supplied to the stator 22 is controlled such that the torque corresponding to the target value TM2OBJ acts on the rotor 23 in the direction of normal rotation, and the target value TM2OBJ is calculated by the aforementioned equation (42), i.e. $TM2OBJ=TREQ+\alpha \cdot TR2OBJZ/(1+\alpha)$. As is apparent from this fact and the fact that the first rotor reverse rotation torque is represented by $-\alpha \cdot TR2/(1+\alpha)$, as described above, a torque equal to the demanded torque TREQ is transmitted to the drive wheels DW and DW.

As described hereinabove, when the EV travel mode is shifted to the EV travel-time ENG start mode to start the engine 3, the engine 3 is started in a state where motive power transmitted from the second rotating machine 21 to the crankshaft 3a is not increased and the engine speed NE is not increased from the first start-time rotational speed NEST1.

Further, in a case where immediately after the start of the engine 3 in the EV travel-time ENG start mode, the direction of rotation of the first rotating magnetic field determined by the engine speed NE and the drive wheel rotational speed NDW is the direction of normal rotation, electric power is generated in the first stator 13 using part of motive power of the engine 3 transmitted to the second rotor 15; part of the generated electric power is charged into the main battery 44; the remainder of the generated electric power is supplied to the stator 22; and the rotor 23 is caused to perform normal rotation. Inversely to the above, in a case where the direction of rotation of the first rotating magnetic field is the direction of reverse rotation, electric power is generated in the stator 22 using part of motive power transmitted to the rotor 23; part of the generated electric power is charged into the main battery 44; the remainder thereof is supplied to the first stator 13; and the first rotating magnetic field is caused to perform normal rotation. Thus, part of motive power of the engine 3 is converted to electric power to charge the electric power into the main battery 44, and the remainder thereof is transmitted to the drive wheels DW and DW. As a consequence, the drive wheels DW and DW continue to be driven for normal rotation. In this case, the EV travel mode is not selected and the process appearing in FIG. 18 is not carried out either until the charge state SOC becomes equal to a second predetermined value larger than the first predetermined value SOCR1.

[Recovery-from-Deceleration ENG Start Mode]

Figure 20:
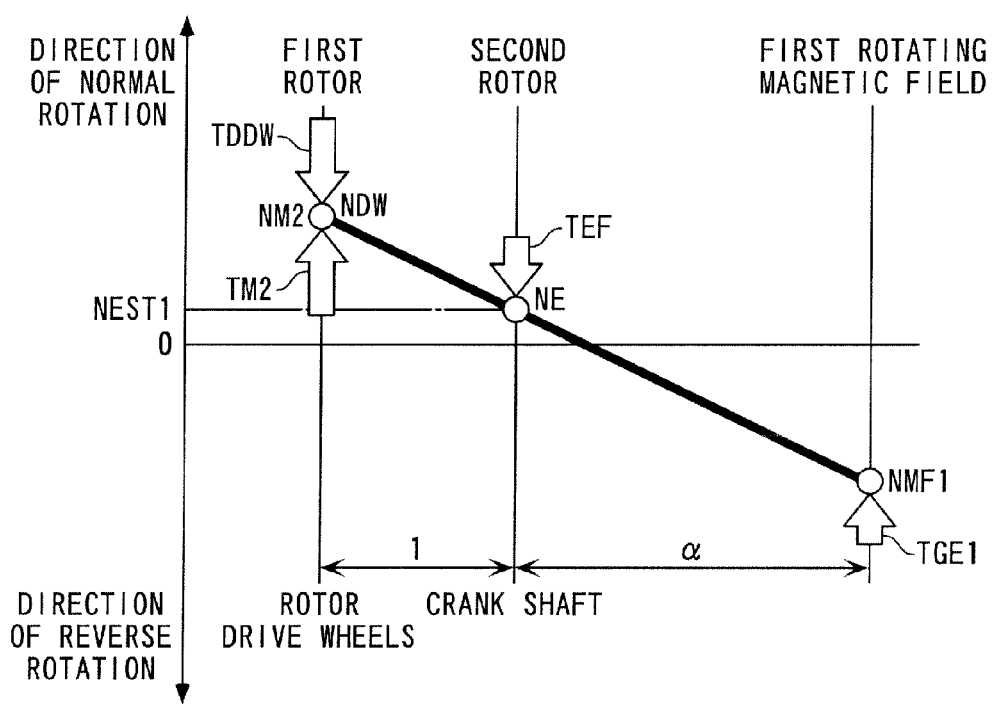
FIG. 20 A velocity collinear chart illustrating an example of the relationship between the rotational speeds of the various types of rotary elements of the power plant shown in FIG. 1 and the relationship between the torques thereof, during execution of the process shown in FIG. 18 but in a situation different from FIG. 19.

The recovery-from-deceleration ENG start mode is selected in a case where when the vehicle is traveling at high speed in the above-described EV travel mode, the vehicle is decelerated in response to a request from the driver, and thereafter the demanded torque TREQ has exceeded an acceleration-time predetermined value, that is, a relatively large acceleration of the vehicle has been requested by the driver. First, a description will be sequentially given of operations performed when the vehicle is performing high-speed traveling and then decelerating travel in the EV travel mode, and until after the vehicle shifts to the recovery-from-deceleration ENG start mode. FIG. 20 shows the relationship between the rotational speeds of the various types of rotary elements and the relationship between torques thereof, during the high-speed traveling in the EV travel mode.

Figure 21:
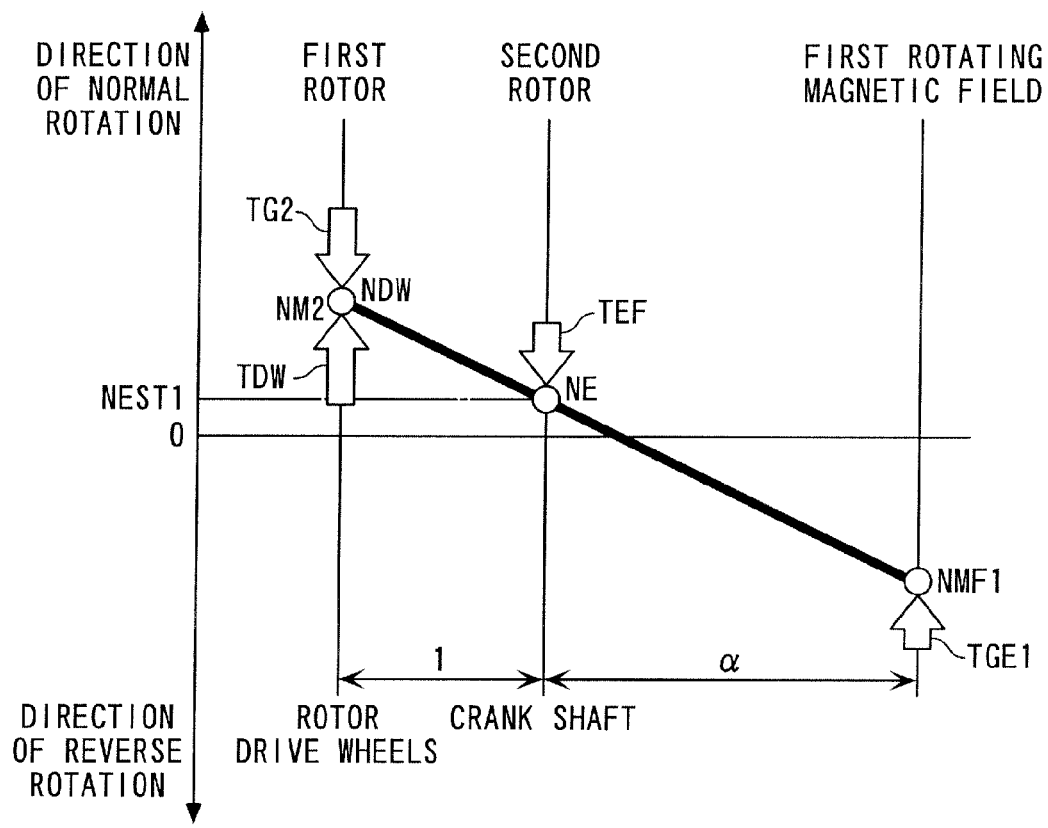
FIG. 21 A velocity collinear chart illustrating an example of the relationship between the rotational speeds of the various types of rotary elements of the power plant shown in FIG. 1 and the relationship between the torques thereof, during decelerating traveling of the vehicle.

As is apparent from FIG. 20, during high-speed traveling of the vehicle in the EV travel mode, the operations of the first and second rotating machines 11 and 21 are controlled, similarly to the above-described case shown in FIG. 18, whereby the drive wheels DW and DW continue to be driven for normal rotation, and the engine speed NE is controlled such that it becomes equal to the first start-time rotational speed NEST1. Then, from this state, when the accelerator pedal opening AP becomes approximately equal to 0 and the brake pedal is stepped on to demand deceleration of the vehicle, the vehicle is decelerated in the following manner:

The supply of electric power from the main battery 44 to the stator 22 is stopped, and electric power is generated in the stator 22 using motive power transmitted from the drive wheels DW and DW rotating by inertia to the rotor 23, to charge the generated electric power into the main battery 44. At the start of the electric power generation, because of the fact that the drive wheel rotational speed NDW is high and the fact that the engine speed NE is controlled such that it becomes equal to the first start-time rotational speed NEST1, the first rotating magnetic field performs reverse rotation. Further, electric power continues to be generated in the first stator 13, and the generated electric power is charge into the main battery 44. FIG. 21 shows the relationship between the rotational speeds of the various types of rotary elements and the relationship between the torques thereof, in this case. In the figure, TDW represents torque of the drive wheels DW and DW by inertia (hereinafter referred to as the "drive wheel torque"), and TG2 represents a braking torque of the second rotating machine 21 generated along with the electric power generation in the second stator 22 (hereinafter referred to as the "second electric power generation torque").

As is apparent from FIG. 21, the second electric power generation torque TG2 acts to brake the drive wheels DW and DW, whereby the drive wheel rotational speed NDW is lowered. Further, the first electric power-generating equivalent torque TGE1 acts to brake the first rotor 14 together with the drive wheels DW and DW, using the engine friction TEF acting on the second rotor 15 as a reaction force, which also lowers the drive wheel rotational speed NDW. Further, since the engine speed NE is controlled such that it becomes equal to the first start-time rotational speed NEST1, the first magnetic field rotational speed NMF1 is lowered as the drive wheel rotational speed NDW is lowered as described above.

In this case, the electric current generated in the first stator 13 is controlled as described in the step 2. Further, electric current generated in the stator 22 is controlled such that the braking torque acting on the drive wheels DW and DW becomes equal to a target braking torque TBOBJ. This target braking torque TBOBJ is calculated by searching a predetermined map (not shown) according to the detected brake pedal depression force BP. In this map, the target braking torque TBOBJ is set to a larger vale as the brake pedal depression force BP is larger, i.e. as the degree of demanded deceleration is larger. Specifically, the electric current generated in the stator 22 is controlled such that a braking torque corresponding to a target value TG2OBJ calculated by the following equation (43) acts on the rotor 23:

$$TG2OBJ = TBOBJ - \alpha \cdot TR2OBJZ/(1+\alpha) \quad (43)$$

Figure 22:
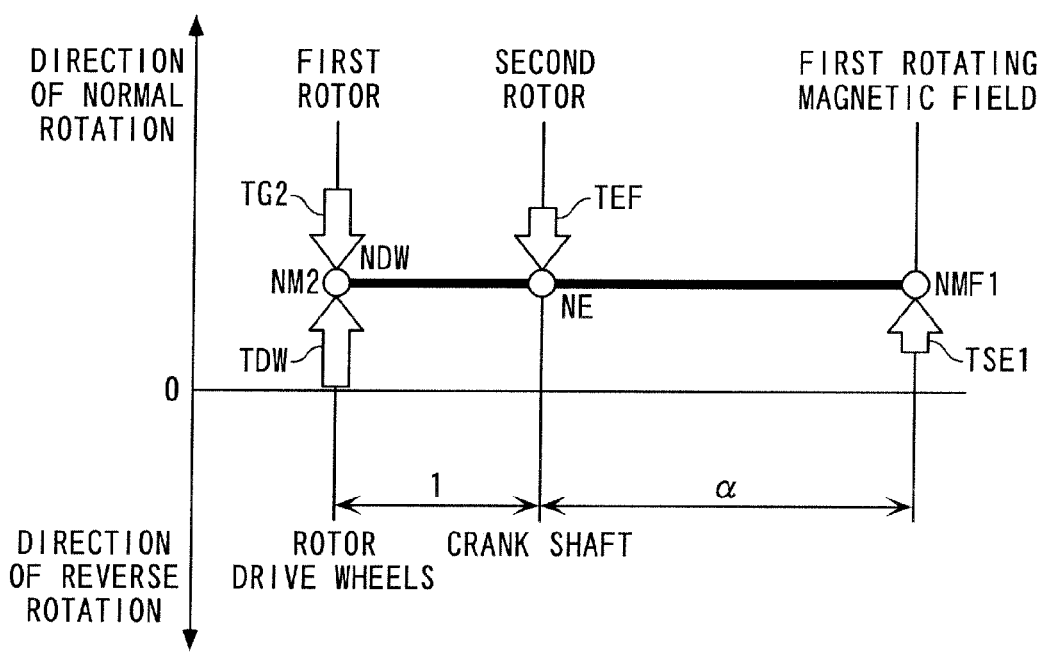
FIG. 22 A velocity collinear chart illustrating an example of the relationship between the rotational speeds of the various types of rotary elements of the power plant shown in FIG. 1 and the relationship between the torques thereof, during decelerating traveling of the vehicle but in a situation different from FIG. 21.

When the above-described charge of the main battery 44 has caused the charge state SOC to reach a value close to an upper limit value larger than the aforementioned second predetermined value, the first magnetic field rotational speed NMF1 is controlled such that it becomes equal to 0. That is, energy is reduced which is distributed as electric power from the drive wheels DW and DW to the first stator 13 via the first rotor 14, and energy is increased which is distributed to the second rotor 15 as motive power. As a consequence, the second rotor rotational speed NR2 is increased and the engine speed NE becomes higher than the first start-time rotational speed NEST1. Then, after the first magnetic field rotational speed NMF1 has become equal to 0, the electric power generated in the stator 22 is directly supplied to the first stator 13 without being charged into the main battery 44, to cause the first rotating magnetic field to perform normal rotation. FIG. 22 shows the relationship between the rotational speeds of the various types of rotary elements and the relationship between the torques thereof, in this case.

As is apparent from FIG. 22, the first driving equivalent torque TSE1 is transmitted to the crankshaft 3a via the second rotor 15, using the drive wheel torque TDW acting on the first rotor 14 as a reaction force, whereby the engine speed NE is increased.

From this state, when the accelerator pedal is largely stepped on to demand high acceleration of the vehicle, the operation mode is shifted to the recovery-from-deceleration ENG start mode. Control in the recovery-from-deceleration ENG start mode is performed according to a process shown in FIG. 23. The present process is repeatedly executed whenever the detected rotational angular position of the crankshaft 3a is positioned at a predetermined crank angle position, and is executed until the start of the engine 3 is completed. First, in a step 11, the operation of the second rotating machine 21 is controlled similarly to the step 1.

Then, the operation of the first rotating machine 11 is controlled in the following manner (step 12): First, the target value TR2OBJ is calculated with a predetermined feedback control algorithm such that the engine speed NE becomes equal to a second start-time rotational speed NEST2. This second start-time rotational speed NEST2 is a predetermined rotational speed that will make it possible to obtain a maximum torque capable of being output from the engine 3, and is set to a predetermined rotational speed within a range of 3500 to 4500 rpm, for example.

Next, electric power is supplied from the main battery 44 to the first stator 13, and electric current supplied to the first stator 13 is controlled such that the second rotor-transmitted torque TR2 becomes equal to the calculated target value TR2OBJ. Thus, the first driving equivalent torque TSE1 is generated, and the generated first driving equivalent torque TSE1 acts to cause the second rotor 15 and the crankshaft 3a to perform normal rotation, whereby the second rotor-transmitted torque TR2 is controlled such that it becomes equal to the target value TR2OBJ.

In a step 13 following the step 12, it is determined whether or not the engine speed NE is approximately equal to the second start-time rotational speed NEST2. If the answer to this question is negative (NO), the present process is immediately terminated, whereas if the answer to the question of the step 13 is affirmative (YES), the ignition operation of the fuel injection valves 3b and the spark plugs 3c of the engine 3 is controlled, whereby the engine 3 at rest is started (step 14), followed by terminating the present process.

Next, an example of the above-described process shown in FIG. 23 will be described with reference to FIG. 24. As is apparent from FIG. 24, part of the second powering torque TM2 is transmitted to the first rotor 14, and is transmitted to the crankshaft 3a via the second rotor 15, using the first driving equivalent torque TSE1 as a reaction force. This causes the crankshaft 3a to continue to be driven for normal rotation. Further, the remainder of the second powering torque TM2 is transmitted to the drive wheels DW and DW, whereby the drive wheels DW and DW continue to be driven for normal rotation.

In this case, by controlling the operation of the first rotating machine 11 in the step 12, the electric current supplied to the first stator 13 is controlled such that the second rotor-transmitted torque TR2 becomes equal to the target value TR2OBJ, whereby the engine speed NE is feedback-controlled such that it becomes equal to the second start-time rotational speed NEST2. Further, the operation of the second rotating machine 21 is controlled, similarly to the step 1, whereby torque equal to the demanded torque TREQ is transmitted to the drive wheels DW and DW.

Figure 24:
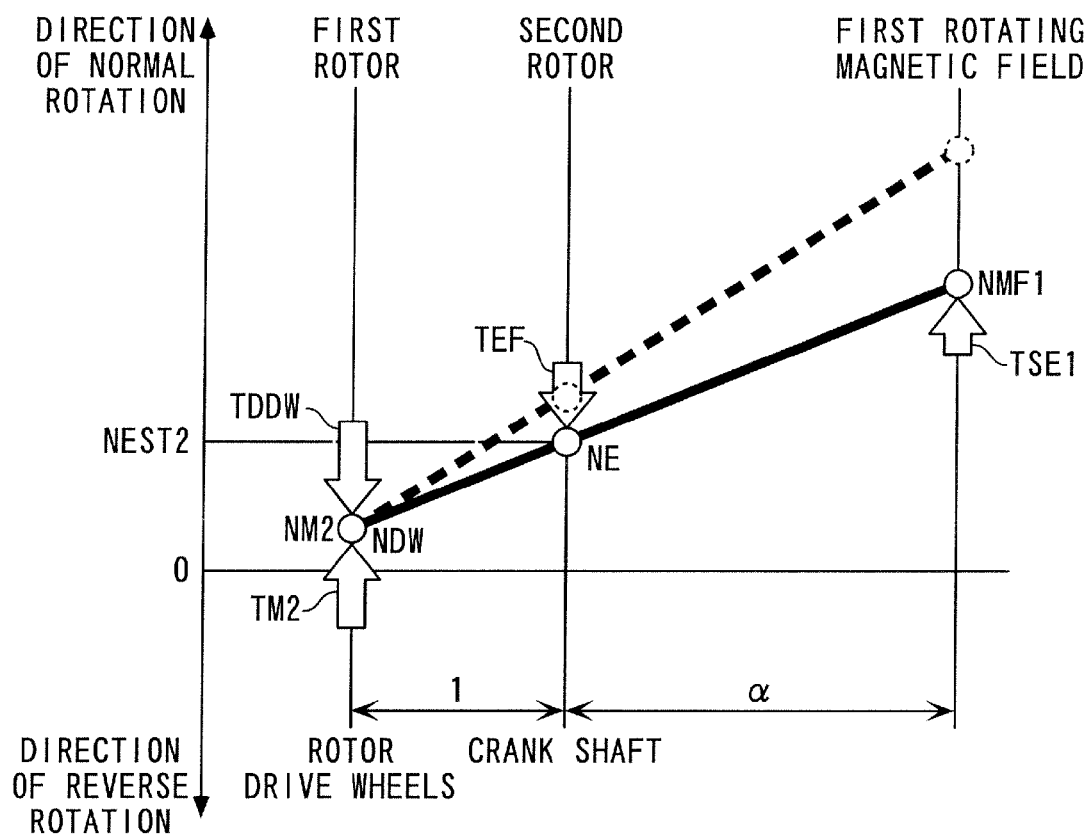
FIG. 24 A velocity collinear chart illustrating an example of the relationship between the rotational speeds of the various types of rotary elements of the power plant shown in FIG. 1 and the relationship between the torques thereof, during execution of the process shown in FIG. 23.

From the above, as indicated by a broken line in FIG. 24, when the engine speed NE immediately before a shift to the recovery-from-deceleration ENG start mode is higher than the second start-time rotational speed NEST2, the operation of the first rotating machine 11 is controlled such that the engine speed NE is lowered to the second start-time rotational speed NEST2. Further, the engine 3 is started in a state where the engine speed NE is controlled to the second start-time rotational speed NEST2 (step 14).

Furthermore, in a case where immediately after the start of the engine 3 in the recovery-from-deceleration ENG start mode, the direction of rotation of the first rotating magnetic field determined by the engine speed NE and the drive wheel rotational speed NDW is the direction of normal rotation, electric power is generated in the first stator 13 using motive power transmitted from the engine 3 to the second rotor 15, and the generated electric power is directly supplied to the stator 22 to cause the rotor 23 to perform normal rotation. Inversely to the above, in a case where the direction of rotation of the first rotating magnetic field is the direction of reverse rotation, electric power is generated in the stator 22 using part of motive power transmitted to the rotor 23, and the generated electric power is directly supplied to the first stator 13 to cause the first rotating magnetic field to perform reverse rotation. This causes a relatively large motive power to be transmitted from the engine 3 to the drive wheels DW and DW to cause high acceleration of the vehicle. Further, when the demanded torque TREQ is very large, electric power may be further supplied from the main battery 44 to the stator 22 to assist the engine 3 with the second rotating machine 21, which enables higher acceleration of the vehicle.

[Vehicle Stoppage-Time ENG Start Mode]

The vehicle stoppage-time ENG start mode is an operation mode for starting the engine 3 during stoppage of the vehicle. Control in the vehicle stoppage-time ENG start mode is performed according to a process shown in FIG. 25. The present process is executed in a case where an ON signal has been delivered from the IG·SW 57 during stoppage of the vehicle, and when the charge state SOC is smaller than a third predetermined value. The third predetermined value represents the lowest charge state that makes it possible to drive the crankshaft 3a at rest, and is set to a predetermined value smaller than the aforementioned first predetermined value SOCR1, e.g. to 20%. This causes the vehicle stoppage-time ENG start mode to be selected when it is impossible to properly drive the crankshaft 3a using electric power from the main battery 44.

In a step 21 in FIG. 25, it is determined whether or not the engine speed NE is lower than the aforementioned first start-time rotational speed NEST1. If the answer to this question is affirmative (YES), electric power is supplied from the auxiliary battery 33 to the stator 31 to operate the starter 31 (step 22). This causes the crankshaft 3a to be driven for normal rotation.

Next, the operation of the second rotating machine 21 is controlled in the following manner (step 23): First, the target value TM2OBJ of the second powering torque TM2 is calculated with a predetermined feedback control algorithm such that the calculated drive wheel rotational speed NDW becomes equal to 0. Then, electric current supplied to the stator 22 is controlled such that a torque corresponding to the target value TM2OBJ acts on the rotor 23.

Further, in a step 24 following the step 23, the ignition operation of the fuel injection valves 3b and the spark plugs 3c is controlled, whereby the engine 3 at rest is started, followed by terminating the present process.

On the other hand, if the answer to the question of the step 21 is negative (NO), i.e. if the engine speed NE is not lower than the first start-time rotational speed NEST1, the steps 22 and 23 are skipped, and the step 24 et seq. are executed. Note that immediately after stoppage of the vehicle, the engine speed NE is sometimes higher than the first start-time rotational speed NEST1. In such a case, the steps 21 and 24 are executed to thereby immediately start the engine 3 without driving the crankshaft 3a by the starter 31. Further, in the present process, the operation of the first rotating machine 11 is not controlled.

Figure 26:
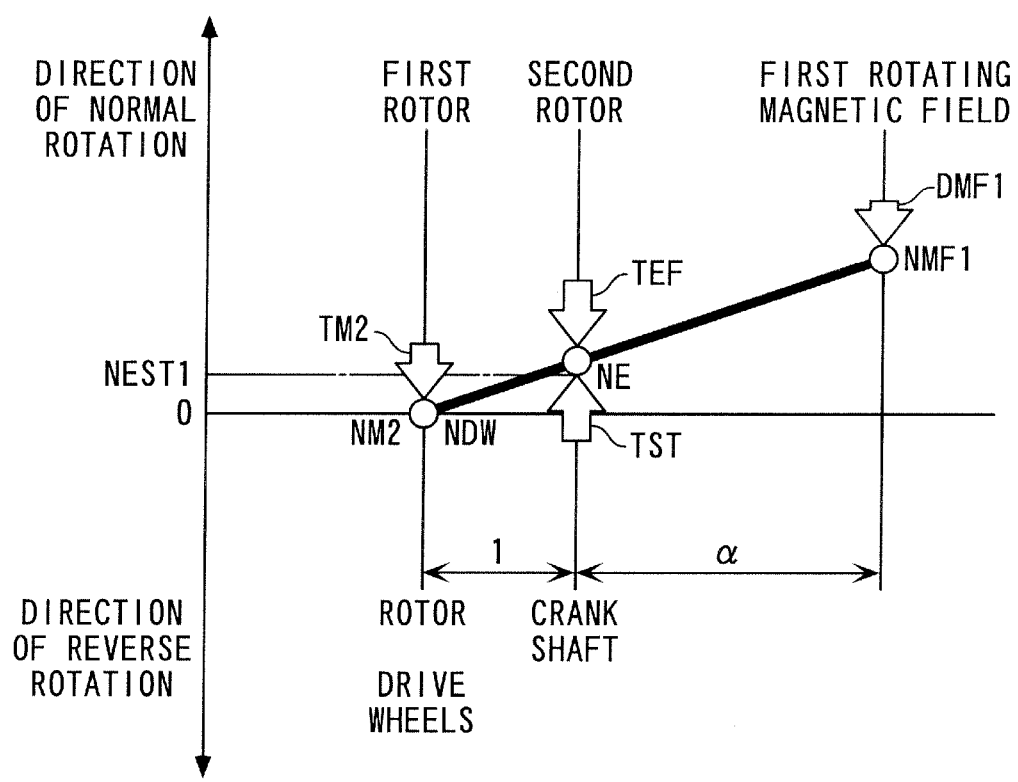
FIG. 26 A velocity collinear chart illustrating an example of the relationship between the rotational speeds of the various types of rotary elements of the power plant shown in FIG.

Next, an example of operation of the above-described process shown in FIG. 25 will be described with reference to FIG. 26. In the figure, TST represents an output torque of the starter 31. As shown in FIG. 26, when the crankshaft 3a is driven by the starter 31 for normal rotation, the engine speed NE exceeds the first start-time rotational speed NEST1. In this state, the step 24 is executed to start the engine 3.

In this case, as the crankshaft 3a rotates to rotate the second rotor 15, as described above, the first rotating magnetic field is generated in the stator 13 even when no electric power is supplied to the stator 13 or no electric power is generated therein. As a consequence, part of torque TST of the starter 31 acts via the second and first rotors 15 and 14 to cause the drive wheels DW and DW to perform normal rotation, using the rotational resistance of the first rotating magnetic field as a reaction force. In FIG. 21, DMF1 represents the rotational resistance of the first rotating magnetic field (hereinafter referred to as the "first magnetic field rotational resistance").

On the other hand, by controlling the operation of the second rotating machine 21 in the step 23, the second powering torque TM2 is controlled such that the drive wheel rotational speed NDW becomes equal to 0. This causes the second powering torque TM2 to act to cancel out the torque acting on the drive wheels DW and DW due to the above-mentioned first magnetic field rotational resistance DMF1, whereby the drive wheels DW and DW are held at rest (NDW=0).

FIG. 27 shows a variation of the above-described process shown in FIG. 25. The present process is distinguished from the FIG. 25 process only in that a step 25 is executed in place of the step 23. Specifically, it is distinguished from the FIG. 25 process only in that the operation of the first rotating machine 11 is controlled in place of the operation of the second rotating machine 21. Therefore, the following description is mainly given of the different point, with steps identical to those of the process in FIG. 25 being denoted by the same step numbers, and detailed description thereof is omitted.

In the step 25 following the step 22 in FIG. 27, the operation of the first rotating machine 11 is controlled in the following manner, and the step 24 et seq. are executed. That is, electric power is supplied from the main battery 44 to the first stator 13 to cause the first rotating magnetic field to perform normal rotation, and electric current supplied to the first stator 13 is controlled such that the first driving equivalent torque TSE1 becomes equal to the above-described first magnetic field rotational resistance DMF1. Note that in this case, the electric power supplied from the main battery 44 to the first stator 13 is smaller than electric power necessary for driving the crankshaft 3a, and hence even when the charge state SOC is smaller than the third predetermined value, as described hereinabove, it is possible to perform the above-described control of the operation of the first rotating machine 11 by the first stator 15 without any inconvenience. Further, in the present process, the operation of the second rotating machine 21 is not controlled.

Next, an example of the above-described process shown in FIG. 27 will be described with reference to FIG. 28. As shown in the figure, similarly to the case shown in FIG. 26, the crankshaft 3a is driven for normal rotation by the starter 31, and the engine speed NE exceeds the first start-time rotational speed NEST1. Further, in this state, the engine 3 is started.

In this case, by controlling the operation of the first rotating machine 11 in the step 25, the first driving equivalent torque TSE1 is controlled such that it becomes equal to the above-mentioned first magnetic field rotational resistance DMF1, whereby the first magnetic field rotational resistance DMF1 is cancelled out. This prevents part of the torque TST of the starter 31 from being transmitted to the drive wheels DW and DW using the first magnetic field rotational resistance DMF1 as a reaction force, whereby the drive wheels DW and DW are held at rest (NDW=0).

Note that the auxiliary battery 33 is charged with electric power from the main battery 44 by the aforementioned downverter, whereby the charge state of the auxiliary battery 33 is always held at a relatively large value. This makes it possible to positively start the engine 3 using the starter 31 in the vehicle stoppage-time ENG start mode.

The first embodiment described heretofore corresponds to the invention as claimed in claims 1 to 5. Correspondence between various types of elements of the first embodiment and various types of elements of the invention as claimed in claims 1 to 5 (hereinafter generically referred to as the "first invention") is as follows: The drive wheels DW and DW and the engine 3 of the first embodiment correspond to driven parts and a heat engine of the first invention, and the ECU 2, the VCU 43, and the first and second PDUs 41 and 42 of the first embodiment correspond to a controller of the first invention. Further, the crankshaft 3a of the first embodiment corresponds to an output portion of the first invention, and the permanent magnets 14a and the cores 15a of the first embodiment correspond to magnetic poles and soft magnetic material elements of the first invention, respectively. Furthermore, the first stator 13 of the first embodiment corresponds to a stator of the first invention, and the iron core 13a and the U-phase to W-phase coils 13c to 13e of the first embodiment correspond to an armature row of the first invention.

Further, the first start-time rotational speed NEST1 of the first embodiment corresponds to a first predetermined value of the first invention; the second start-time rotational speed NEST2 of the first embodiment corresponds to a second predetermined value of the invention as claimed in claims 2 to 5; and the demanded torque TREQ of the first embodiment corresponds to a demanded driving force of the invention as claimed in claims 4 and 5.

As described hereinabove, according to the first embodiment, the first rotating machine 11 can be operated only by the single first soft magnetic material element row, so that it is possible to downsize the first rotating machine 11 and reduce manufacturing costs thereof, and in turn downsize the power plant 1 and reduce manufacturing costs thereof. Further, by setting the first pole pair number ratio α, it is possible to freely set the relationship between the first magnetic field rotational speed NMF1, and the first and second rotor rotational speeds NR1 and NR2, and the relationship between the first driving equivalent torque TSE1 (first electric power-generating equivalent torque TGE1), and the first and second rotor-transmitted torques TR1 and TR2, and therefore it is possible to enhance the degree of freedom in design of the first rotating machine 11, and in turn enhance the degree of freedom in design of the power plant 1.

Further, in starting the engine 3, if the engine speed NE is not lower than the first start-time rotational speed NEST1, the engine 3 is started in the EV travel-time ENG start mode, or in the vehicle stoppage-time ENG start mode in a state where the engine speed NE is not increased. This makes it possible, when the engine speed NE is high enough to start the engine 3, to prevent motive power from being wastefully transmitted to the crankshaft 3a, and in turn, enhance the efficiency of the power plant 1.

Further, in starting the engine 3, if the engine speed NE is above the second start-time rotational speed NEST2, by controlling the operation of the first rotating machine 11 in the recovery-from-deceleration ENG start mode, the engine 3 is started in a state where the engine speed NE is lowered to the second start-time rotational speed NEST2. In addition, since the second start-time rotational speed NEST2 is set such that the maximum torque that can be output from the engine 3 is obtained, it is possible to obtain the maximum torque of the engine 3 immediately after the start of the engine 3. Furthermore, the operation of the second rotating machine 21 is controlled such that the drive wheel-transmitted torque (torque transmitted to the drive wheels DW and DW) becomes equal to the demanded torque TREQ, and hence it is possible to properly drive the drive wheels DW and DW.

Further, in starting the engine 3, if the engine speed NE is lower than the first start-time rotational speed NEST1, the starter 31 is operated to start the engine 3 in the vehicle stoppage-time ENG start mode. Therefore, it is possible to properly start the engine 3. Furthermore, in the vehicle stoppage-time ENG start mode, the drive wheels DW and DW are held at rest by controlling the operation of the second rotating machine 21, and hence it is possible to prevent a change in speed of the drive wheels DW and DW from being caused by transmission of a driving force to the crankshaft 3a, and enhance marketability. Further, also in the variation shown in FIG. 27, the drive wheels DW and DW are held at rest by controlling the operation of the second rotating machine 21, and hence it is possible to prevent a change in speed of the drive wheels DW and DW from being caused by transmission of a driving force to the crankshaft 3a, and enhance marketability.

Furthermore, in starting the engine 3, if the charge state SOC of the main battery 44 is lower than the third predetermined value, the crankshaft 3a is driven using the starter 31, and the charge state of the auxiliary battery 33, which is a power source of the starter 31, is always held at a relatively large value. Thus, also in such a case where the crankshaft 3a cannot be properly driven using electric power from the main battery 44, it is possible to properly start the engine 3.

As is apparent from the relationship between the torques shown in FIG. 26, in the vehicle stoppage-time ENG start mode, not only the engine friction TEF but also the reaction force caused by the first magnetic field rotational resistance DMF1 acts on the starter 31. Therefore, there is a fear that this increases the torque TST of the starter 31 required for starting the engine 3, and in turn, increases the size of the starter 31. On the other hand, as is apparent from the relationship between the torques shown in FIG. 28, in the variation of the vehicle stoppage-time ENG start mode, since the first magnetic field rotational resistance DMF1 is cancelled out by controlling the operation of the first rotating machine 11, the engine friction TEF alone acts on the starter 31. This makes it possible to avoid the above-described increase in the size of the starter 31.

Note that although in the first embodiment, the second rotor 15 is directly connected to the crankshaft 3a, it may be mechanically connected to the crankshaft 3a via gears, a pulley, a chain, a transmission, or the like. Further, although in the first embodiment, the first rotor 14 and the rotor 23 are directly connected to each other, if they are mechanically connected to the drive wheels DW and DW, they are not necessarily required to be directly connected to each other. Furthermore, although in the first embodiment, the first rotor 14 and the rotor 23 are connected to the drive wheels DW and DW via the differential gear DG or the like, they may be mechanically directly connected to each other.

Next, a power plant 1A according to a second embodiment of the present invention will be described with reference to FIGS. 29 to 38. This power plant 1A is distinguished from the first embodiment mainly in that the relationship of connections of the first and second rotors 14 and 15 to the engine 3 and the drive wheels DW and DW is reversed. In FIG. 29, the same component elements as those of the first embodiment are denoted by the same reference numerals. The following description is mainly given of different points of the power plant 1A from the first embodiment.

As shown in FIG. 29, in the power plant 1A, differently from the first embodiment, the first rotor 14 is integrally formed not on the second rotating shaft 5 but on the first rotating shaft 4. This mechanically directly connects the first rotor 14 to the crankshaft 3a. Further, differently from the first embodiment, the second rotor 15 is integrally formed not on the first rotating shaft 4 but on the second rotating shaft 5. This mechanically directly connects the second rotor 15 to the rotor 23, and mechanically connects the second rotor 15 to the drive wheels DW and DW via the differential gear DG or the like.

Further, differently from the first embodiment, the aforementioned first rotational angle sensor 52 detects not the rotational angular position of the first rotor 14 but the rotational angular position of the second rotor 15, and delivers a signal indicative of the detected rotational angular position of the second rotor 15 to the ECU 2. The ECU 2 calculates the second rotor rotational speed NR2 based on the detected rotational angular position of the second rotor 15, and also, since the second rotor 15 and the rotor 23 are directly connected to each other as mentioned above, the ECU 2 calculates the rotational angular position of the rotor 23 based on the detected rotational angular position of the second rotor 15, and calculates the second rotating machine rotational speed NM2. Furthermore, since the first rotor 14 is directly connected to the crankshaft 3a as mentioned above, the ECU 2 calculates the rotational angular position of the first rotor 14 based on the rotational angular position of the crankshaft 3a detected by the aforementioned crank angle sensor 51, and calculates the first rotor rotational speed NR1.

The ECU 2 controls the operations of the engine 3, the starter 31, and the first and second rotating machines 11 and 21, based on the detection signals from the aforementioned sensors and switches 51 to 57 of various types, according to control programs stored in the ROM. Similarly to the first embodiment, this causes the vehicle to be operated in various operation modes including the EV travel-time ENG start mode, the recovery-from-deceleration ENG start mode, and the vehicle stoppage-time ENG start mode. In this case, due to the above-described difference in construction from the first embodiment, operations in these operation modes are different from the operations in the case of the first embodiment, and hereafter, a description will be given of the different points.

[EV Travel-Time ENG Start Mode]

Control in the EV travel mode and the EV travel-time ENG start mode is performed according to a process shown in FIG. 30. Note that conditions for executing this process is the same as in the first embodiment. Further, the present process is distinguished from the above-described process shown in FIG. 18 according to the first embodiment only in that steps 31 and 32 are executed in place of the steps 1 and 2. Specifically, the present process is different only in the control of the operations of the first and second rotating machines 11 and 21. Therefore, the following description is mainly given of the different points, with steps identical to those of the process in FIG. 18 being denoted by the same step numbers, and detailed description thereof is omitted.

Referring to FIG. 30, first, in the step 31, the operation of the second rotating machine 21 is controlled in the following manner: First, the target value TM2OBJ of the output torque of the second rotating machine 21 is calculated by the following equation (44):

$$TM2OBJ = TREQ + (\alpha+1)TR1OBJZ/\alpha \quad (44)$$

wherein TR1OBJZ represents the immediately preceding value of a target value TR1OBJ of the first rotor-transmitted torque TR1, calculated as described hereinafter, and is set to 0 when the calculation thereof has not yet been carried out.

Then, electric power is supplied from the main battery 44 to the stator 22, and electric current supplied to the stator 22 is controlled such that a torque corresponding to the target value TM2OBJ acts on the rotor 23 in the direction of normal rotation.

In the step 32 following the step 31, the operation of the first rotating machine 11 is controlled in the following manner, and the step 3 et seq. are executed. First, the target value TR1OBJ is calculated with a predetermined feedback control algorithm such that the engine speed NE becomes equal to the first start-time rotational speed NEST1.

Next, as shown in FIG. 31, referred to hereinafter, in a case where the direction of rotation of the first rotating magnetic field determined by the drive wheel rotational speed NDW and the engine speed NE is the direction of normal rotation, electric power is generated in the first stator 13, and electric current generated in the first stator 13 is controlled such that the first rotor-transmitted torque TR1 becomes equal to the calculated target value TR1OBJ. With the above-described operations, the first electric power-generating equivalent torque TGE1 is generated, and the generated first electric power-generating equivalent torque TGE1 acts to cause the first rotor 14 and the crankshaft 3a to perform normal rotation, whereby the first rotor-transmitted torque TR1 is controlled such that it becomes equal to the target value TR1OBJ.

On the other hand, in a case where the direction of rotation of the first rotating magnetic field determined by the drive wheel rotational speed NDW and the engine speed NE is the direction of reverse rotation, electric power is supplied from the main battery 44 to the first stator 13, and electric current supplied to the first stator 13 is controlled such that the first rotor-transmitted torque TR1 becomes equal to the calculated target value TR1OBJ. With the above-described operations, the first driving equivalent torque TSE1 is generated and the generated first driving equivalent torque TSE1 acts to cause the first rotor 14 and the crankshaft 3a to perform normal rotation, whereby the first rotor-transmitted torque TR1 is controlled such that it becomes equal to the target value TR1OBJ.

Next, an example of operation of the above-described process shown in FIG. 30 will be described with reference to FIG. 31. First, a description is given of FIG. 31. As is apparent from the above-described relationship of connections between the various rotary elements of the power plant 1A, the engine speed NE and the first rotor rotational speed NR1 are equal to each other, and the second rotor rotational speed NR2 and the second rotating machine rotational speed NM2 are equal to each other. Further, the second rotor rotational speed NR2 and the second rotating machine rotational speed NM2 are equal to the drive wheel rotational speed NDW provided that a change in speed e.g. by the gear G1 and the differential gear DG is ignored. Furthermore, the first magnetic field rotational speed NMF1, and the first and second rotor rotational speeds NR1 and NR2 are in a predetermined collinear relationship expressed by the aforementioned equation (40). From the above, the relationship between the first magnetic field rotational speed NMF1, the engine speed NE, the drive wheel rotational speed NDW, and the second rotating machine rotational speed NM2 is represented by a velocity collinear chart as shown in FIG. 31.

As is apparent from FIG. 31, part of the second powering torque TM2 is transmitted to the second rotor 15, and is transmitted to the crankshaft 3a via the first rotor 14, using the first electric power-generating equivalent torque TGE1 as a reaction force, so that the crankshaft 3a is driven for normal rotation. Further, the remainder of the second powering torque TM2 is transmitted to the drive wheels DW and DW, whereby the drive wheels DW and DW are driven for normal rotation, and in turn, the vehicle travels forward.

In this case, by controlling the operation of the first rotating machine 11 in the step 32, the electric current generated in the first stator 13 is controlled such that the first rotor-transmitted torque TR1 becomes equal to the target value TR1OBJ, whereby the engine speed NE is feedback-controlled such that it becomes equal to the first start-time rotational speed NEST1, and is held at the first start-time rotational speed NEST1. Further, in this state, when the charge state SOC has become not larger than the first predetermined value SOCR1 (YES to the step 3), the engine 3 is started without changing the engine speed NE (step 4), similarly to the first embodiment.

Further, as is apparent from FIG. 31, the first electric power-generating equivalent torque TGE1 acts to cause the second rotor 15, the rotor 23, and the drive wheels DW and DW to perform reverse rotation, using the engine friction TEF as a reaction force. A torque thus acting to cause the second rotor 15 and so forth to perform reverse rotation (hereinafter referred to as the "second rotor reverse rotation torque") is represented by $-(\alpha+1)TR1/\alpha$ using the first rotor-transmitted torque TR1 and the first pole pair number ratio $\alpha$, as is apparent from the aforementioned equation (41).

On the other hand, by controlling the operation of the second rotating machine 21 in the step 31, the electric current supplied to the stator 22 is controlled such that the torque corresponding to the target value TM2OBJ acts on the rotor 23 in the direction of normal rotation, and the target value TM2OBJ is calculated by the aforementioned equation (44), i.e. TM2OBJ=TREQ+(α+1)TR1OBJZ/α. As is apparent from this fact and the fact that the second rotor reverse rotation torque is represented by −(α+1)TR1/α, as described above, a torque equal to the demanded torque TREQ is transmitted to the drive wheels DW and DW.

As described hereinabove, in starting the engine 3 by shifting from the EV travel mode to the EV travel-time ENG start mode, the engine 3 is started in a state where motive power transmitted from the second rotating machine 21 to the crankshaft 3a is not increased and the engine speed NE is not increased from the first start-time rotational speed NEST1.

Further, in the case where immediately after the start of the engine 3 in the EV travel-time ENG start mode, the direction of rotation of the first rotating magnetic field determined by the engine speed NE and the drive wheel rotational speed NDW is the direction of normal rotation, electric power is generated in the stator 22 using part of motive power transmitted to the rotor 23; part of the generated electric power is charged into the main battery 44; the remainder of the generated electric power is supplied to the first stator 13; and the first rotating magnetic field is caused to perform normal rotation. Inversely to the above, in the case where the direction of rotation of the first rotating magnetic field is the direction of reverse rotation, electric power is generated in the first stator 13 using part of motive power transmitted to the first rotor 14; part of the generated electric power is charged into the main battery 44; the remainder thereof is supplied to the stator 22; and the rotor 23 is caused to perform normal rotation. From the above, part of motive power of the engine 3 is converted to electric power to charge the electric power into the main battery 44, and the remainder thereof is transmitted to the drive wheels DW and DW. As a consequence, the drive wheels DW and DW continue to be driven for normal rotation.

[Recovery-from-Deceleration ENG Start Mode]

First, a description will be sequentially given, similarly to the first embodiment, of operations performed when the vehicle is performing high-speed traveling and then decelerating travel in the EV travel mode, and until after the vehicle shifts to the recovery-from-deceleration ENG start mode. FIG. 32 shows the relationship between the rotational speeds of the various types of rotary elements and the relationship between the torques thereof, during the high-speed traveling in the EV travel mode.

As is apparent from FIG. 32, during the high-speed traveling of the vehicle in the EV travel mode, the operations of the first and second rotating machines 11 and 21 are controlled, similarly to the above-described case shown in FIG. 30, whereby the drive wheels DW and DW continue to be driven for normal rotation, and the engine speed NE is controlled such that it becomes equal to the first start-time rotational speed NEST1. Then, from this state, when the accelerator pedal opening AP becomes approximately equal to 0, and the brake pedal is stepped on to demand deceleration of the vehicle, the vehicle is decelerated in the following manner:

The supply of electric power from the main battery 44 to the stator 22 is stopped, and electric power is generated in the stator 22 using motive power transmitted from the drive wheels DW and DW rotating by inertia to the rotor 23, to charge the generated electric power into the main battery 44. At the start of the electric power generation, because of the fact that the drive wheel rotational speed NDW is high and the fact that the engine speed NE is controlled such that it becomes equal to the first start-time rotational speed NEST1, the first rotating magnetic field performs normal rotation. Further, the first stator 13 continues to generate electric power, and the generated electric power is charged into the main battery 44. FIG. 33 shows the relationship between the rotational speeds of the various types of rotary elements and the relationship between the torques thereof, in this case.

As is apparent from FIG. 33, the second electric power generation torque TG2 acts to brake the drive wheels DW and DW, whereby the drive wheel rotational speed NDW is lowered. Further, the first electric power-generating equivalent torque TGE1 acts to brake the second rotor 15 together with the drive wheels DW and DW, using the engine friction TEF acting on the first rotor 14 as a reaction force, which also lowers the drive wheel rotational speed NDW. Further, since the engine speed NE is controlled such that it becomes equal to the first start-time rotational speed NEST1, the first magnetic field rotational speed NMF1 is lowered as the drive wheel rotational speed NDW is lowered, as described above.

In this case, the electric current generated in the first stator 13 is controlled, as described in the step 32. Further, electric current generated in the stator 22 is controlled such that the braking torque acting on the drive wheels DW and DW becomes equal to the target braking torque TBOBJ. Specifically, the electric current generated in the stator 22 is controlled such that a braking torque corresponding to the target value TG2OBJ calculated by the following equation (45) acts on the rotor 23:

$$TG2OBJ = TBOBJ - (\alpha+1)TR1OBJZ/\alpha \quad (45)$$

When the above-described charge of the main battery 44 has caused the charge state SOC to reach a value close to the aforementioned upper limit value, the first magnetic field rotational speed NMF1 is controlled such that it becomes equal to 0. That is, while energy distributed as electric power from the drive wheels DW and DW to the first stator 13 via the second rotor 15 is reduced, energy distributed to the first rotor 14 as motive power is increased. As a consequence, the first rotor rotational speed NR1 is increased, and the engine speed NE becomes higher than the first start-time rotational speed NEST1. Then, after the first magnetic field rotational speed NMF1 has become equal to 0, the electric power generated in the stator 22 is directly supplied to the first stator 13 without being charged into the main battery 44, to cause the first rotating magnetic field to perform reverse rotation. FIG. 34 shows the relationship between the rotational speeds of the various types of rotary elements and the relationship between the torques thereof, in this case.

As is apparent from FIG. 34, the first driving equivalent torque TSE1 is transmitted to the crankshaft 3a via the first rotor 14, using the drive wheel torque TDW acting on the second rotor 15 as a reaction force, whereby the engine speed NE is increased.

When the accelerator pedal is largely stepped on to demand high acceleration of the vehicle from this state, the operation mode is shifted to the recovery-from-deceleration ENG start mode. Control in the recovery-from-deceleration ENG start mode is performed according to a process shown in FIG. 35. This process is distinguished from the process shown in FIG. 23 according to the first embodiment only in that steps 41 and 42 are executed in place of the steps 11 and 12. Specifically, it is different only in control of the operations of the first and second rotating machines 11 and 21. Therefore, the following description is mainly given of the different points, with steps identical to those of the process in FIG. 23 being denoted by the same step numbers, and detailed description thereof is omitted.

First, in the step 41, the operation of the second rotating machine 21 is controlled similarly to the step 31 shown in FIG. 30. Next, the operation of the first rotating machine 11 is controlled in the following manner (step 42), and the step 13 et seq. are executed: First, the target value TR1OBJ is calculated with a predetermined feedback control algorithm such that the engine speed NE becomes equal to the second start-time rotational speed NEST2.

Then, electric power is supplied from the main battery 44 to the first stator 13, and electric current supplied to the first stator 13 is controlled such that the first rotor-transmitted torque TR1 becomes equal to the calculated target value TR1OBJ. With the above-described operations, the first driving equivalent torque TSE1 is generated, and the generated first driving equivalent torque TSE1 acts to cause the first rotor 14 and the crankshaft 3a to perform normal rotation, whereby the first rotor-transmitted torque TR1 is controlled such that it becomes equal to the target value TR1OBJ.

Next, an example of operation of the above-described process shown in FIG. 35 will be described with reference to FIG. 36. As is apparent from FIG. 36, part of the second powering torque TM2 is transmitted to the second rotor 15, and is transmitted to the crankshaft 3a via the first rotor 14, using the first driving equivalent torque TSE1 as a reaction force. This causes the crankshaft 3a to continue to be driven for normal rotation. Further, the remainder of the second powering torque TM2 is transmitted to the drive wheels DW and DW, whereby the drive wheels DW and DW continue to be driven for normal rotation.

In this case, by controlling the operation of the first rotating machine 11 in the step 42, the electric current supplied to the first stator 13 is controlled such that the first rotor-transmitted torque TR1 becomes equal to the target value TR1OBJ, whereby the engine speed NE is feedback-controlled such that it becomes equal to the second start-time rotational speed NEST2. Further, the operation of the second rotating machine 21 is controlled, similarly to the step 31, whereby torque equal to the demanded torque TREQ is transmitted to the drive wheels DW and DW.

With above-described operations, as indicated by a broken line in FIG. 36, when the engine speed NE immediately before a shift to the recovery-from-deceleration ENG start mode is higher than the second start-time rotational speed NEST2, the operation of the first rotating machine 11 is controlled such that the engine speed NE is lowered to the second start-time rotational speed NEST2. Further, the engine 3 is started in the state where the engine speed NE is controlled to the second start-time rotational speed NEST2 (step 14).

Furthermore, in a case where immediately after the start of the engine 3 in the recovery-from-deceleration ENG start mode, the direction of rotation of the first rotating magnetic field determined by the engine speed NE and the drive wheel rotational speed NDW is the direction of normal rotation, electric power is generated in the stator 22 using motive power transmitted to the rotor 23, and the generated electric power is directly supplied to the first stator 13 to cause the first rotating magnetic field to perform normal rotation. Inversely to the above, in a case where the direction of rotation of the first rotating magnetic field is the direction of reverse rotation, electric power is generated in the first stator 13 using part of motive power transmitted from the engine 3 to the first rotor 14, and the generated electric power is directly supplied to the stator 22 to cause the rotor 23 to perform normal rotation.

With the above-described operations, a relatively large motive power is transmitted from the engine 3 to the drive wheels DW and DW to cause high acceleration of the vehicle. Further, when the demanded torque TREQ is very large, electric power may be further supplied from the main battery 44 to the stator 22 to assist the engine 3 with the second rotating machine 21, which enables higher acceleration of the vehicle.

[Vehicle Stoppage-Time ENG Start Mode]

Similarly to the first embodiment, control in the vehicle stoppage-time ENG start mode is executed according to the process shown in FIG. 25 or 27. In this case, due to the above-described differences in construction from the first embodiment, operations in the processes are different from the first embodiment, and hereafter, a description will be given of the different points with reference to FIGS. 37 and 38. Note that examples of operation shown in FIGS. 37 and 38 correspond to the processes shown in FIGS. 25 and 27, respectively.

As shown in FIGS. 37 and 38, similarly to the first embodiment, the crankshaft 3a is driven for normal rotation by the starter 31, and the engine speed NE exceeds the first start-time rotational speed NEST1. In this state, the engine 3 is started. In this case, as is apparent from FIG. 37, part of the torque TST of the starter 31 acts via the first and second rotors 14 and 15 to cause the drive wheels DW and DW to perform normal rotation, using the aforementioned first magnetic field rotational resistance DMF1 as a reaction force.

On the other hand, similarly to the first embodiment, the second powering torque TM2 is controlled such that the drive wheel rotational speed NDW becomes equal to 0. As a consequence, torque acting on the drive wheels DW and DW due to the above-described first magnetic field rotational resistance DMF1 is cancelled out by the second powering torque TM2, whereby the drive wheels DW and DW are held at rest (NDW=0).

Further, as shown in FIG. 38, similarly to the first embodiment, the operation of the first rotating machine 11 is controlled, whereby the first magnetic field rotational resistance DMF1 is cancelled out by the first driving equivalent torque TSE1. This prevents part of the torque TST of the starter 31 from being transmitted to the drive wheels DW and DW, using the first magnetic field rotational resistance DMF1 as a reaction force, so that the drive wheels DW and DW are held at rest (NDW=0).

The second embodiment described heretofore corresponds to the invention as claimed in claims 1 to 5. Correspondence between various types of elements of the second embodiment and various types of elements of the invention as claimed in claims 1 to 5 is the same as in the first embodiment.

From the above, according to the second embodiment, it is possible to obtain the same advantageous effects as provided by the first embodiment, for example, in that it is possible to downsize the power plant 1A and reduce manufacturing costs thereof.

Note that although in the second embodiment, the first rotor 14 is directly connected to the crankshaft 3a, it may be mechanically connected to the crankshaft 3a via gears, a pulley, a chain, a transmission, or the like. Further, although in the second embodiment, the second rotor 15 and the rotor 23 are directly connected to each other, if they are mechanically connected to the drive wheels DW and DW, they are not necessarily required to be directly connected to each other. Furthermore, although in the second embodiment, the second rotor 15 and the rotor 23 are connected to the drive wheels DW and DW via the differential gear DG or the like, they may be mechanically directly connected to each other.

Further, although in the first and second embodiments, the start of the engine 3 using the starter 31 is carried out during stoppage of the vehicle in the vehicle stoppage-time ENG start mode, it may be carried out in the EV travel mode. In this case as well, by controlling the operation of one of the first and second rotating machines 11 and 21 as described hereinafter, it is possible to suppress a change in the drive wheel rotational speed NDW, caused by transmission of a driving force to the crankshaft 3a.

More specifically, the first rotating machine 11 is controlled by the method described in the step 25. Therefore, even in the EV traveling mode, part of the torque TST of the starter 31 is not transmitted to the drive wheels DW and DW using the first magnetic field rotational resistance DMF1 as a reaction force, whereby it is possible to prevent the drive wheel rotational speed NDW from being changed by transmission of the driving force to the crankshaft 3a.

Further, the second rotating machine 21 is controlled in the following manner: The target value TM2OBJ is calculated with a predetermined feedback control algorithm such that the drive wheel rotational speed NDW is not changed, and electric current supplied to the stator 22 is controlled such that the second powering torque TM2 becomes equal to the target value TM2OBJ. This makes it possible to suppress a change in the drive wheel rotational speed NDW, caused by transmission of a driving force to the crankshaft 3a, even in the EV traveling mode.

Furthermore, although in the first and second embodiments, when the engine 3 is started using the starter 31, the operation of one of the first and second rotating machines 11 and 21 is controlled such that a change in the drive wheel rotational speed NDW, caused by transmission of a driving force to the crankshaft 3a, is suppressed, the operations of both the first and second rotating machines 11 and 21 may be controlled.

Next, a power plant 1B according to a third embodiment of the present invention will be described with reference to FIGS. 39 to 53. This power plant 1B is distinguished from the first embodiment mainly in that the power plant 1B includes a second rotating machine 61 configured similarly to the first rotating machine 11, in place of the second rotating machine 21. In FIGS. 39 to 42, the same component elements as those of the first embodiment are denoted by the same reference numerals. The following description is mainly given of different points of the power plant 1B from the first embodiment.

As shown in FIG. 39, a first rotating shaft 7 is coaxially directly connected to the crankshaft 3a via a flywheel. The first rotating shaft 7 is rotatably supported by bearings B1 and B2. Further, as shown in FIG. 42, the flange 15b of the above-mentioned second rotor 15 of the first rotating machine 11 is integrally formed on the first rotating shaft 7, whereby the second rotor 15 is coaxially directly connected to the crankshaft 3a. Further, the mounting portion 14b of the first rotor 14 of the first rotating machine 11 is integrally formed on a hollow cylindrical second rotating shaft 8 via an annular plate-shaped flange 14d. This second rotating shaft 8 is rotatably supported by a bearing B3, and is disposed coaxially with the first rotating shaft 7. Further, the second rotating shaft 8 is rotatably fitted through the first rotating shaft 7.

The above-described second rotating machine 61 is configured similarly to the aforementioned first rotating machine 11, and therefore a brief description will be given hereinafter of the construction and the operations thereof. As shown in FIGS. 39 and 43, the second rotating machine 61 is disposed between the engine 3 and the first rotating machine 11, and includes a second stator 63, a third rotor 64 in a manner opposed to the second stator 63, and a fourth rotor 65 disposed between the two 63 and 64. The third rotor 64, the fourth rotor 65, and the second stator 63 are disposed coaxially with the above-mentioned first rotating shaft 7, and are arranged in the radial direction of the first rotating shaft 7 in the mentioned order from inside.

The aforementioned second stator 63 is for generating a second rotating magnetic field, and includes an iron core 63a, and U-phase, V-phase and W-phase coils 63b provided on the iron core 63a. The iron core 63a, which has a hollow cylindrical shape formed by laminating a plurality of steel plates, extends in the axial direction of the first rotating shaft 7, and is fixed to the casing CA. Further, the inner peripheral surface of the iron core 63a is formed with twelve slots (not shown). The slots extend in the axial direction of the first rotating shaft 7, and are arranged at equally-spaced intervals in the circumferential direction of the first rotating shaft 7. The above-mentioned U-phase to W-phase coils 63b are wound in the slots by distributed winding (wave winding). As shown in FIG. 41, the second stator 63 including the U-phase to W-phase coils 63b is electrically connected to the battery 44 via the above-mentioned second PDU 42 and VCU 43. That is, the first and second stators 13 and 63 are electrically connected to each other via the first and second PDUs 41 and 42.

In the second stator 63 constructed as above, when electric power is supplied from the battery 44 to the U-phase to W-phase coils 63b via the VCU 43 and the second PDU 42, or when electric power is generated, as described hereinafter, four magnetic poles are generated at an end of the iron core 63a toward the third rotor 64 at equally-spaced intervals in the circumferential direction of the first rotating shaft 7, and the second rotating magnetic field generated by the magnetic poles rotates in the circumferential direction. Hereinafter, the magnetic poles generated on the iron core 63a are referred to as the "second armature magnetic poles". Further, each two second armature magnetic poles which are circumferentially adjacent to each other have polarities different from each other.

The third rotor 64 includes a second magnetic pole row comprising eight permanent magnets 64a (only two of which are shown). These permanent magnets 64a are arranged at equally-spaced intervals in the circumferential direction of the first rotating shaft 7, and the second magnetic pole row is opposed to the iron core 63a of the second stator 63. Each permanent magnet 64a extends in the axial direction of the first rotating shaft 7, and the length thereof in the axial direction is set to the same length as that of the iron core 63a of the second stator 63.

Further, the permanent magnets 64a are mounted on an outer peripheral surface of an annular mounting portion 64b. This mounting portion 64b is formed by a soft magnetic material, such as iron or a laminate of a plurality of steel plates, and has an inner peripheral surface thereof attached to an outer peripheral surface of a disk-shaped flange 64c. The flange 64c is integrally formed on the aforementioned first rotating shaft 7. With this arrangement, the third rotor 64 including the permanent magnets 64a is coaxially directly connected to the second rotor 15 and the crankshaft 3a.

Furthermore, the permanent magnets 64a are attached to the outer peripheral surface of the mounting portion 64b formed by the soft magnetic material, as described above, and hence a magnetic pole of (N) or (S) appears on an end of each permanent magnet 64a toward the second stator 63. Further, each two permanent magnets 64a adjacent to each other in the circumferential direction of the first rotating shaft 7 are different in polarity from each other.

The fourth rotor 65 includes a second soft magnetic material element row formed by six cores 65a (only two of which are shown). These cores 65a are arranged at equally-spaced intervals in the circumferential direction of the first rotating shaft 7, and the second soft magnetic material element row is disposed between the iron core 63a of the second stator 63 and the second magnetic pole row of the third rotor 64, in a manner spaced therefrom by respective predetermined distances. Each core 65a is formed by a soft magnetic material, such as a laminate of a plurality of steel plates, and extends in the axial direction of the first rotating shaft 7. Further, the length of the core 65a in the axial direction is set to the same length as that of the iron core 63a of the second stator 63.

Furthermore, an end of the core 65a toward the first rotating machine 11 is mounted on an outer end of an annular plate-shaped flange 65b via a hollow cylindrical connecting portion 65c slightly extending in the axial direction of the first rotating shaft 7. This flange 65b is integrally formed on the second rotating shaft 8. With this arrangement, the fourth rotor 65 including the cores 65a is coaxially directly connected to the first rotor 14. Further, an end of the core 65a toward the engine 3 is mounted on an outer end of an annular plate-shaped flange 65d via a hollow cylindrical connecting portion 65e slightly extending in the axial direction of the first rotating shaft 7. The flange 65d is coaxially integrally formed with a hollow cylindrical first sprocket SP1.

As described hereinabove, the second rotating machine 61 includes the four second armature magnetic poles, the eight magnetic poles of the permanent magnets 64a (hereinafter referred to as the "second magnet magnetic poles"), and the six cores 65a. That is, the ratio between the number of the second armature magnetic poles, the number of the second magnet magnetic poles, and the number of the cores 65a is set to 1:2.0:(1+2.0)/2, similarly to the ratio between the number of the first armature magnetic poles, the number of the first magnet magnetic poles, and the number of the cores 15a of the first rotating machine 11. Further, the ratio β of the number of pole pairs of the second magnet magnetic poles to the number of pole pairs of the second armature magnetic poles is set to 2.0, similarly to the first pole pair number ratio α of the first rotating machine 11. As described above, since the second rotating machine 61 is constructed similarly to the first rotating machine 11, it has the same functions as those of the first rotating machine 11.

More specifically, the second rotating machine 61 converts electric power supplied to the second stator 63 to motive power, for outputting the motive power from the third rotor 64 or the fourth rotor 65, and converts motive power input to the third rotor 64 or the fourth rotor 65 to electric power, for outputting the electric power from the second stator 63. Further, during such input and output of electric power and motive power, the second rotating magnetic field and the third and fourth rotors 64 and 65 rotate while holding such a collinear relationship in rotational speed, as shown in the equation (40) concerning the aforementioned first rotating machine 11. That is, in this case, between the rotational speed of the second rotating magnetic field (hereinafter referred to as the "second magnetic field rotational speed NMF2"), and the rotational speeds of the third and fourth rotors 64 and 65 (hereinafter referred to as the "third rotor rotational speed NR3" and the "fourth rotor rotational speed NR4", respectively), there holds the following equation (46):

$$NMF2 = (\beta + 1)NR4 - \beta \cdot NR3 \qquad (46)$$
$$= 3 \cdot NR4 - 2 \cdot NR3$$

Further, if torque equivalent to the electric power supplied to the second stator 63 and the second magnetic field rotational speed NMF2 is represented by the "second driving equivalent torque TSE2", there holds the following equation (47) between the second driving equivalent torque TSE2, and torques transmitted to the third and fourth rotors 64 and 65 (hereinafter referred to as the "third rotor-transmitted torque TR3" and the "fourth rotor-transmitted torque TR4", respectively):

$$TSE2 = TR3/\beta \qquad (47)$$
$$= -TR4/(\beta + 1)$$
$$= TR3/2$$
$$= -TR4/3$$

Furthermore, if torque equivalent to the electric power generated by the second stator 63 and the second magnetic field rotational speed NMF2 is represented by the second electric power-generating equivalent torque TGE2, the following equation (48) holds between the second electric power-generating equivalent torque TGE2 and the third and fourth rotor-transmitted torques TR3 and TR4. As described above, similarly to the first rotating machine 11, the second rotating machine 61 has the same functions as those of an apparatus formed by combining a planetary gear unit and a general one-rotor-type rotating machine.

$$TGE2 = TR3/\beta \qquad (48)$$
$$= -TR4/(1 + \beta)$$
$$= TR3/2$$
$$= -TR4/3$$

Through the control of the second PDU 42 and the VCU 43, the ECU 2 controls the electric current supplied to the second stator 63, the electric current generated by the second stator 63, and the second magnetic field rotational speed NMF2 of the second rotating magnetic field.

Further, the above-described differential case DC of the differential gear DG is provided with a planetary gear unit PGS. This planetary gear unit PGS is of a general single pinion type, and comprises a sun gear PS, a ring gear PR disposed around a periphery of the sun gear PS, a plurality of planetary gears PP in mesh with the gears PS and PR, and a carrier PC rotatably supporting the planetary gears PP. The carrier PC is integrally formed on the differential case DC, and the ring gear PR is fixed to the casing CA. Further, the sun gear PS is integrally formed on a hollow cylindrical third rotating shaft 9, and the right axle 7 is rotatably fitted through the above-mentioned third rotating shaft 9. Furthermore, a second sprocket SP2 is integrally formed on the third rotating shaft 9, and a chain CH extends around the second sprocket SP2 and the above-mentioned first sprocket SP1. With the above arrangement, motive power transmitted to the second sprocket SP2 is transmitted to the differential gear DG in a state reduced in speed by the planetary gear unit PGS.

As described hereinabove, in the power plant 1B, the second rotor 15 of the first rotating machine 11 and the third rotor 64 of the second rotating machine 61 are mechanically connected to each other, and are mechanically connected to the crankshaft 3a. Further, the first rotor 14 of the first rotating machine 11 and the fourth rotor 65 of the second rotating machine 61 are mechanically connected to each other, and are mechanically connected to the drive wheels DW and DW via the first sprocket SP1, the chain CH, the second sprocket SP2, the planetary gear unit PGS, the differential gear DG, and the axles 6 and 6.

Further, as shown in FIG. 40, a second rotational angle sensor 58 is electrically connected to the ECU 2. The second rotational angle sensor 58 detects the rotational angular position of the second rotor 15 with respect to the first stator 13, and delivers a signal indicative of the detected rotational angular position of the second rotor 15 to the ECU 2. The ECU 2 calculates the second rotor rotational speed NR2 based on the detected rotational angular position of the second rotor 15. Further, since the third rotor 64 is directly connected to the second rotor 15, the ECU 2 calculates the rotational angular position of the third rotor 64 with respect to the second stator 63, based on the detected rotational angular position of the second rotor 15, and calculates the third rotor rotational speed NR3. Furthermore, since the first and fourth rotors 14 and 65 are directly connected to each other, the ECU 2 calculates the rotational angular position of the fourth rotor 65 with respect to the second stator 63, based on the rotational angular position of the first rotor 14, detected by the first rotational angle sensor 52, and calculates the fourth rotor rotational speed NR4.

The ECU 2 controls the operations of the engine 3, the starter 31, and the first and second rotating machines 11 and 61, based on the detection signals from the sensors and switches 51 to 58 of various types according to control programs stored in the ROM. Similarly to the first embodiment, this causes the vehicle to be operated in various operation modes including the EV travel-time ENG start mode, the recovery-from-deceleration ENG start mode, and the vehicle stoppage-time ENG start mode. In this case, due to the above-described differences in construction from the first embodiment, operations in these operation modes are different from the operations in the case of the first embodiment, and hereafter, a description will be given of the different points.

[EV Travel-Time ENG Start Mode]

Control in the EV travel mode and the EV travel-time ENG start mode is performed according to a process shown in FIG. 44. Note that conditions for executing the present process is the same as in the first embodiment. Further, the power plant 1B is distinguished from the first embodiment only in that the power plant 1B includes the second rotating machine 61 in place of the second rotating machine 21, so that this process is different from the above-described process shown in FIG. 18 according to the first embodiment only in the control of the operation of the second rotating machine 61, i.e. only in that a step 51 is executed in place of the step 1. Therefore, the following description is mainly given of the different points, with steps identical to those of the process in FIG. 18 being denoted by the same step numbers, and detailed description thereof is omitted.

In the step 51 shown in FIG. 44, the operation of the second rotating machine 61 is controlled in the following manner to execute the step 2 et seq. More specifically, first, a target value TR4OBJ of the fourth rotor-transmitted torque TR4 is calculated by the following equation (49). Then, electric power is supplied from the main battery 44 to the second stator 63, and electric current supplied to the second stator 63 is controlled such that a torque corresponding to the target value TR4OBJ acts on the fourth rotor 65 in the direction of normal rotation.

$$TR4OBJ = TREQ + \alpha \cdot TR2OBJ/(1+\alpha) \qquad (49)$$

Next, an example of the above-described process shown in FIG. 44 will be described with reference to FIG. 45. First, a description is given of FIG. 45. As is apparent from the above-described relationship of connections between the various rotary elements of the power plant 1B, the engine speed NE and the second and third rotor rotational speeds NR2 and NR3 are equal to each other, and the first and fourth rotor rotational speeds NR1 and NR4 are equal to each other. Further, the first and fourth rotor rotational speeds NR1 and NR4 are equal to the drive wheel rotational speed NDW provided that a change in speed e.g. by the planetary gear unit PGS is ignored. Furthermore, the first magnetic field rotational speed NMF1, and the first and second rotor rotational speeds NR1 and NR2 are in a predetermined collinear relationship expressed by the aforementioned equation (40), and the second magnetic field rotational speed NMF2, and the third and fourth rotor rotational speeds NR3 and NR4 are in a predetermined collinear relationship expressed by the aforementioned equation (46). From the above, the relationship between the first magnetic field rotational speed NMF1, the engine speed NE, the drive wheel rotational speed NDW and the second rotating machine rotational speed NMF2 is represented by a velocity collinear chart as shown in FIG. 45.

As is apparent from FIG. 45, the second driving equivalent torque TSE2 is transmitted to the first rotor 14 via the fourth rotor 65, and causes the first rotor 14 to perform normal rotation. Electric power is generated in the first stator 13 as described above, using motive power thus transmitted to the first rotor 14, and the first rotating magnetic field generated along with the electric power generation performs reverse rotation. Further, the second driving equivalent torque TSE2 is transmitted to the crankshaft 3a via the third rotor 64, using the first electric power-generating equivalent torque TGE1 as a reaction force, and is transmitted to the drive wheels DW and DW via the fourth rotor 65, whereby the crankshaft 3a and the drive wheels DW and DW are driven for normal rotation.

In this case, similarly to the first embodiment, by controlling the operation of the first rotating machine 11, the electric current generated in the first stator 13 is controlled such that the second rotor-transmitted torque TR2 becomes equal to the target value TR2OBJ, whereby the engine speed NE is feedback-controlled such that it becomes equal to the first start-time rotational speed NEST1, and is held at the first start-time rotational speed NEST1. Further, in this state, when the charge state SOC has become not larger than the first predetermined value SOCR1, the engine 3 is started without changing the engine speed NE, similarly to the first embodiment.

Further, as is apparent from FIG. 45, the first electric power-generating equivalent torque TGE1 acts to cause the first rotor 14, the fourth rotor 65, and the drive wheels DW and DW to perform reverse rotation, using the engine friction TEF as a reaction force. A torque thus acting to cause the first rotor 14 and so forth to perform reverse rotation (first rotor reverse rotation torque) is represented by $-\alpha \cdot TR2/(1+\alpha)$ using the second rotor-transmitted torque TR2 and the first pole pair number ratio $\alpha$, as is apparent from the aforementioned equation (41).

On the other hand, by controlling the operation of the second rotating machine 61 in the step 51, the electric current supplied to the second stator 73 is controlled such that the torque corresponding to the target value TR4OBJ acts on the fourth rotor 75 in the direction of normal rotation, and the target value TR4OBJ is calculated by the aforementioned equation (49), i.e. $TR4OBJ = TREQ + \alpha \cdot TR2OBJ/(1+\alpha)$. As is apparent from this fact and the fact that the first rotor reverse rotation torque is represented by $-\alpha \cdot TR2/(1+\alpha)$, as described above, a torque equal to the demanded torque TREQ is transmitted to the drive wheels DW and DW.

As described hereinabove, in starting the engine 3 by shifting from the EV travel mode to the EV travel-time ENG start mode, the engine 3 is started in a state where motive power transmitted from the second rotating machine 61 to the crankshaft 3a is not increased and the engine speed NE is not increased.

Further, in a case where immediately after the start of the engine 3 in the EV travel-time ENG start mode, both the directions of rotations of the first and second rotating magnetic fields determined by the engine speed NE and the drive wheel rotational speed NDW are the direction of normal rotation, electric power is generated in the first stator 13 using part of motive power of the engine 3 transmitted to the second rotor 15; part of the generated electric power is charged into the main battery 44; the remainder of the generated electric power is supplied to the second stator 63; and the second rotating magnetic field is caused to perform normal rotation. On the other hand, in a case where the directions of rotations of the first and second rotating magnetic fields are the direction of reverse rotation and the direction of normal rotation, respectively, electric power is generated in the second stator 63 using part of motive power of the engine 3 transmitted to the third rotor 64; part of the generated electric power is charged into the main battery 44; the remainder thereof is supplied to the first stator 13; and the first rotating magnetic field is caused to perform reverse rotation. With the above-described operations, part of the motive power of the engine 3 is converted to electric power to charge the electric power into the main battery 44, and the remainder thereof is transmitted to the drive wheels DW and DW. As a consequence, the drive wheels DW and DW continue to be driven for normal rotation.

[Recovery-from-Deceleration ENG Start Mode]

First, a description will be sequentially given of operations performed when the vehicle is performing high-speed traveling and then decelerating travel in the EV travel mode, and until after the vehicle shifts to the recovery-from-deceleration ENG start mode. FIG. 46 shows the relationship between the rotational speeds of the various types of rotary elements and the relationship between the torques thereof, during the high-speed traveling in the EV travel mode.

As is apparent from FIG. 46, during the high-speed traveling of the vehicle in the EV travel mode, the operations of the first and second rotating machines 11 and 61 are controlled, similarly to the above-described case shown in FIG. 45, whereby the drive wheels DW and DW continue to be driven for normal rotation, and the engine speed NE is controlled such that it becomes equal to the first start-time rotational speed NEST1. Then, from this state, when the accelerator pedal opening AP becomes approximately equal to 0 and the brake pedal is stepped on to demand deceleration of the vehicle, the vehicle is decelerated in the following manner:

The supply of electric power from the main battery 44 to the second stator 63 is stopped, and electric power is generated in the second stator 63 using motive power transmitted from the drive wheels DW and DW rotating by inertia to the fourth rotor 65, to charge the generated electric power into the main battery 44. At the start of the electric power generation, because of the fact that the drive wheel rotational speed NDW is high and the fact that the engine speed NE is controlled such that it becomes equal to the first start-time rotational speed NEST1, the first rotating magnetic field performs reverse rotation. Further, electric power continues to be generated in the first stator 13, and the generated electric power is charged into the main battery 44. FIG. 47 shows the relationship between the rotational speeds of the various types of rotary elements and the relationship between the torques thereof, in this case.

As is apparent from FIG. 47, the second electric power-generating equivalent torque TGE2 acts to brake the fourth rotor 65 and the drive wheels DW and DW, using the engine friction TEF acting on the third rotor 64 as a reaction force, whereby the drive wheel rotational speed NDW is lowered. Further, the first electric power-generating equivalent torque TGE1 acts to brake the first rotor 14 together with the drive wheels DW and DW, using the engine friction TEF acting on the second rotor 15 as a reaction force, which also lowers the drive wheel rotational speed NDW. Further, since the engine speed NE is controlled such that it becomes equal to the first start-time rotational speed NEST1, the first magnetic field rotational speed NMF1 is lowered as the drive wheel rotational speed NDW is lowered, as described above.

In this case, the electric current generated in the first stator 13 is controlled, as described in the step 2. Further, electric current generated in the second stator 63 is controlled such that the braking torque acting on the drive wheels DW and DW becomes equal to the target braking torque TBOBJ. Specifically, the electric current generated by the second stator 63 is controlled such that a braking torque corresponding to the target value TR4OBJ calculated by the following equation (50) acts on the fourth rotor 65:

$$TR4OBJ = TBOBJ - \alpha \cdot TR2OBJZ/(1+\alpha) \qquad (50)$$

When the above-described charge of the main battery 44 has caused the charge state SOC to reach a value close to the upper limit value, the first magnetic field rotational speed NMF1 is controlled such that it becomes equal to 0. That is, energy is reduced which is distributed as electric power from the drive wheels DW and DW to the first stator 13 via the first rotor 14, while energy is increased which is distributed to the second rotor 15 as motive power. As a consequence, the second rotor rotational speed NR2 increases, and the engine speed NE becomes higher than the first start-time rotational speed NEST1. Then, after the first magnetic field rotational speed NMF1 has become equal to 0, the electric power generated in the second stator 63 is directly supplied to the first stator 13 without being charged into the main battery 44, and the first rotating magnetic field is caused to perform normal rotation. FIG. 48 shows the relationship between the rotational speeds of the various types of rotary elements and the relationship between the torques thereof, in this case.

As is apparent from FIG. 48, the first driving equivalent torque TSE1 is transmitted to the crankshaft 3a via the second rotor 15, using the drive wheel torque TDW acting on the first rotor 14 as a reaction force, whereby the engine speed NE is increased.

Then, when the direction of rotation of the second rotating magnetic field determined by the relationship between the two NDW and NE is changed to the direction of reverse rotation by a decrease in the drive wheel rotational speed NDW and an increase in the engine speed NE caused as described above, the operations of the first and second rotating machines 11 and 61 are controlled in the following manner: Electric power generation in the second stator 63 is stopped; supply of electric power from the second stator 63 to the first stator 13 is stopped; and electric power is generated in the first stator 13 using motive power transmitted from the drive wheels DW and DW to the first rotor 14. Further, the electric power thus generated is supplied to the second stator and the second rotating magnetic field is caused to perform reverse rotation. FIG. 49 shows the relationship between the rotational speeds of the various types of rotary elements and the relationship between the torques thereof, in this case.

As is apparent from FIG. 49, the first electric power-generating equivalent torque TGE1 acts to brake the drive wheels DW and DW via the first rotor 14, using the second driving equivalent torque TSE2 as a reaction force, and acts to brake the crankshaft 3a via the second rotor 15. This lowers the engine speed NE and the drive wheel rotational speed NDW.

Then, when the accelerator pedal is largely stepped on to demand high acceleration of the vehicle from the state shown in FIG. 49, the operation mode is shifted to the recovery-from-deceleration ENG start mode. Control in the recovery-from-deceleration ENG start mode is performed according to a process shown in FIG. 50. Due to the above-described differences in construction from the first embodiment, the present process is different from the process shown in FIG. 23 according to the first embodiment only in the control of the operation of the second rotating machine 61, i.e. only in that a step 61 is executed in place of the step 11. Therefore, the following description is mainly given of the different points, with steps identical to those of the process in FIG. 23 being denoted by the same step numbers, and detailed description thereof is omitted.

First, in the step 61 in FIG. 50, the operation of the second rotating machine 61 is controlled in the following manner, and the step 12 et seq. are executed. More specifically, first, similarly to the step 51, the target value TR4OBJ is calculated by the aforementioned equation (49). Then, as shown in FIG. 51, referred to hereinafter, in a case where the direction of rotation of the second rotating magnetic field determined by the drive wheel rotational speed NDW and the engine speed NE is the direction of reverse rotation, electric power is generated in the second stator 63 to supply the generated electric power to the first stator 13, and electric current generated in the second stator 63 is controlled such that a torque corresponding to the target value TR4OBJ acts on the fourth rotor 65 in the direction of normal rotation. On the other hand, in a case where the direction of rotation of the second rotating magnetic field determined by the drive wheel rotational speed NDW and the engine speed NE is the direction of normal rotation, the operation of the second rotating machine 61 is controlled similarly to the step 51.

Next, an example of operation of the above-described process shown in FIG. 50 will be described with reference to FIG. 51. As is apparent from FIG. 51, the first driving equivalent torque TSE1 is transmitted to the third rotor 64 via the second rotor 15, and causes the third rotor 64 to continue to perform normal rotation. Electric power is generated in the second stator 63, using motive power thus transmitted to the third rotor 64, and the second rotating magnetic field generated along with the electric power generation performs reverse rotation. Further, the first driving equivalent torque TSE1 is transmitted to the crankshaft 3a via the second rotor 15, using the second electric power-generating equivalent torque TGE2 as a reaction force, and is transmitted to the drive wheels DW and DW via the first rotor 14, whereby the crankshaft 3a and the drive wheels DW and DW continue to be driven for normal rotation.

In this case, by controlling the operation of the first rotating machine 11 similarly to the first embodiment, the electric current supplied to the first stator 13 is controlled such that the second rotor-transmitted torque TR2 becomes equal to the target value TR2OBJ, whereby the engine speed NE is feedback-controlled such that it becomes equal to the second start-time rotational speed NEST2.

Further, in this case as well, by controlling the operation of the second rotating machine 61 in the step 61, the fourth rotor-transmitted torque TR4 is controlled such that it becomes equal to the target value TR4OBJ (=TREQ+ $\alpha \cdot$TR2OBJZ/(1+$\alpha$). Furthermore, similarly to the first embodiment, the first rotor reverse rotation torque is represented by $-\alpha \cdot$TR2/(1+$\alpha$). As is apparent from the above, a torque equal to the demanded torque TREQ is transmitted to the drive wheels DW and DW.

From the above, similarly to the first embodiment, as indicated by a broken line in FIG. 51, when the engine speed NE immediately before a shift to the recovery-from-deceleration ENG start mode is higher than the second start-time rotational speed NEST2, the operation of the first rotating machine 11 is controlled such that the engine speed NE is lowered to the second start-time rotational speed NEST2. Further, the engine 3 is started in the state where the engine speed NE is controlled to the second start-time rotational speed NEST2.

Further, in a case where immediately after the start of the engine 3 in the recovery-from-deceleration ENG start mode, both the directions of rotations of the first and second rotating magnetic fields determined by the engine speed NE and the drive wheel rotational speed NDW are the direction of normal rotation, electric power is generated in the first stator 13 using part of motive power transmitted from the engine 3 to the second rotor 15, and the generated electric power is directly supplied to the second stator 63 to cause the second rotating magnetic field to perform normal rotation. Further, in a case where the directions of rotations of the first and second rotating magnetic fields are the direction of normal rotation and the direction of reverse rotation, respectively, electric power is generated in the second stator 63 using part of motive power transmitted from the engine 3 to the third rotor 64, and the generated electric power is directly supplied to the first stator 13 to cause the first rotating magnetic field to perform normal rotation. With the above-described operations, a relatively large motive power is transmitted from the engine 3 to the drive wheels DW and DW, for high acceleration of the vehicle. Further, when the demanded torque TREQ is very large, electric power may be further supplied from the main battery 44 to the first stator 13 and/or the second stator 63, to assist the engine 3 with the first rotating machine 11 and/or the second rotating machine 61, which enables higher acceleration of the vehicle.

[Vehicle Stoppage-Time ENG Start Mode]

Control in the vehicle stoppage-time ENG start mode is executed according to a process shown in FIG. 52. Due to the above-described differences in construction from the first embodiment, the present process is distinguished from the above-described process shown in FIG. 25 according to the first embodiment only in the control of the operation of the second rotating machine 61, i.e. only in that a step 71 is executed in place of the step 23. Therefore, the following description is mainly given of the different points, with steps identical to those of the process in FIG. 25 being denoted by the same step numbers, and detailed description thereof is omitted.

In the step 71 following the step 22, the operation of the second rotating machine 61 is controlled in the following manner, and the step 24 et seq. are executed. First, the target value TR4OBJ is calculated with a predetermined feedback control algorithm such that the calculated drive wheel rotational speed NDW becomes equal to 0. Then, electric power is supplied from the main battery 44 to the second stator 63, and electric current supplied to the second stator 63 is controlled such that a torque corresponding to the target value TR4OBJ acts on the fourth rotor 65.

Next, an example of operation of the above-described process shown in FIG. 52 will be described with reference to FIG. 53. As shown in FIG. 53, similarly to the first embodiment, the crankshaft 3a is driven for normal rotation by the starter 31, and the engine speed NE exceeds the first start-time rotational speed NEST1. Further, in this state, the engine 3 is started. In this case, as is apparent from FIG. 53, the torque TST of the starter 31 acts via the second and first rotors 15 and 14 to cause the drive wheels DW and DW to perform normal rotation, using the aforementioned first magnetic field rotational resistance DMF1 as a reaction force.

On the other hand, by controlling the operation of the second rotating machine 61 in the step 71, the fourth rotor-transmitted torque TR4 is controlled such that the drive wheel rotational speed NDW becomes equal to 0. As a consequence, the torque acting on the drive wheels DW and DW, which is caused by the above-described first magnetic field rotational resistance DMF1, is cancelled out by the torque acting on the fourth rotor 65, which is caused by the second driving equivalent torque TSE2, whereby the drive wheels DW and DW are held at rest (NDW=0).

The third embodiment described heretofore corresponds to the invention as claimed in claims 6 to 10. Correspondence between various types of elements of the third embodiment and various types of elements of the invention as claimed in claims 6 to 10 (hereinafter generically referred to as the "second invention") is as follows: The drive wheels DW and DW and the engine 3 of the third embodiment correspond to driven parts and a heat engine of the second invention, and the ECU 2, the VCU 43, and the first and second PDUs 41 and 42 of the third embodiment correspond to a controller of the second invention. Further, the crankshaft 3*a* of the third embodiment corresponds to an output portion of the second invention.

Further, the permanent magnets 14*a*, the cores 15*a*, the permanent magnets 64*a* and the cores 65*a* of the third embodiment correspond to first magnetic poles, first soft magnetic material elements, second magnetic poles, and second soft magnetic material elements of the second invention, respectively. Furthermore, the iron core 13*a* and the U-phase to W-phase coils 13*c* to 13*e* of the third embodiment correspond to a first armature row of the second invention, and the iron core 63*a* and the U-phase to W-phase coils 63*b* of the third embodiment correspond to a second armature row of the second invention.

Further, the first start-time rotational speed NEST1 of the third embodiment corresponds to a first predetermined value of the second invention; the second start-time rotational speed NEST2 of the third embodiment corresponds to a second predetermined value of the invention as claimed in claims 7 to 10; and the demanded torque TREQ of the third embodiment corresponds to a demanded driving force of the invention as claimed in claims 9 and 10.

As described hereinabove, according to the third embodiment, the first and second rotating machines 11 and 61 are used, and hence, similarly to the first embodiment, it is possible to downsize the power plant 1B and reduce manufacturing costs thereof, and enhance the degree of freedom in design of the power plant 1B. Further, in starting the engine 3, if the engine speed NE is not lower than the first start-time rotational speed NEST1, the engine 3 is started in the EV travel-time ENG start mode, or in the vehicle stoppage-time ENG start mode in a state where the engine speed NE is not increased. With the above-described operations, when the engine speed NE is high enough to start the engine 3, it is possible to prevent motive power from being wastefully transmitted to the crankshaft 3*a*, and in turn, enhance the efficiency of the power plant 1B.

Further, in starting the engine 3, if the engine speed NE is above the second start-time rotational speed NEST2, the operation of the first rotating machine 11 is controlled in the recovery-from-deceleration ENG start mode, whereby the engine 3 is started in a state where the engine speed NE is lowered to the second start-time rotational speed NEST2. In addition, since the second start-time rotational speed NEST2 is set such that the maximum torque of the engine 3 can be obtained, it is possible to obtain the maximum torque of the engine 3 immediately after the start of the engine 3. Furthermore, during the EV travel mode, the operation of the second rotating machine 61 is controlled such that the drive wheel-transmitted torque becomes equal to the demanded torque TREQ, and hence it is possible to properly drive the drive wheels DW and DW.

Further, similarly to the first embodiment, in starting the engine 3, if the engine speed NE is lower than the first start-time rotational speed NEST1, the starter 31 is operated and the engine 3 is started, in the vehicle stoppage-time ENG start mode. Therefore, it is possible to properly start the engine 3. Furthermore, in the vehicle stoppage-time ENG start mode, the drive wheels DW and DW are held at rest by controlling the operation of the second rotating machine 61, so that it is possible to prevent a change in speed of the drive wheels DW and DW from being caused by transmission of a driving force to the crankshaft 3*a* and enhance marketability.

Furthermore, similarly to the first embodiment, in starting the engine 3, if the charge state SOC of the main battery 44 is lower than the third predetermined value, the crankshaft 3*a* is driven using the starter 31, and the charge state of the auxiliary battery 33 is always held at a relatively large value. From the above, also in such a case where the crankshaft 3*a* cannot be properly driven using electric power from the main battery 44, it is possible to properly start the engine 3.

Note that although in the third embodiment, the second and third rotors 15 and 64 are directly connected to each other, if they are mechanically connected to the crankshaft 3*a*, they are not necessarily required to be directly connected to each other. Further, although the first and fourth rotors 14 and 65 are directly connected to each other, if they are mechanically connected to the drive wheels DW and DW, they are not necessarily required to be directly connected to each other. Further, although in the third embodiment, the second and third rotors 15 and 64 are directly connected to the crankshaft 3*a*, they may be mechanically connected to the crankshaft 3*a* via gears, a pulley, a chain, a transmission, or the like. Further, although in the third embodiment, the first and fourth rotors 14 and 65 are connected to the drive wheels DW and DW via the chain CH and differential gear DG, they may be mechanically directly connected to each other. Further, although in the third embodiment, the first and second rotating machines 11 and 61 are arranged coaxially with each other, they may be arranged in a manner such that the axes thereof are orthogonal to each other or are arranged such that they are positioned in parallel relation to each other, in place of the coaxial arrangement.

Further, although in the third embodiment, the start of the engine 3 using the starter 31 is carried out during stoppage of the vehicle in the vehicle stoppage-time ENG start mode, it may be carried out in the EV travel mode. In this case as well, by controlling the operation of the second rotating machine 61 as described hereinafter, it is possible to suppress a change in the drive wheel rotational speed NDW, caused by transmission of a driving force to the crankshaft 3*a*.

More specifically, the target value TR4OBJ is calculated with a predetermined feedback control algorithm such that the drive wheel rotational speed NDW is not changed, and electric current supplied from the main battery 44 to the second stator 63 is controlled such that a torque corresponding to the target value TR4OBJ acts on the fourth rotor 65. From the above, in the EV traveling mode as well, it is possible to suppress a change in the drive wheel rotational speed NDW, caused by transmission of a driving force to the crankshaft 3*a*.

Next, a power plant 1C according to a fourth embodiment of the present invention will be described with reference to FIGS. 54 to 65. This power plant 1C is distinguished from the above-described third embodiment mainly in that it includes the above-described second rotating machine 21 and a planetary gear unit PG in place of the second rotating machine 61. In FIGS. 54 to 65, the same component elements as those of the first to third embodiments are denoted by the same reference numerals. The following description is mainly given of different points of the power plant 1C from the first to third embodiments.

As shown in FIG. 54, the planetary gear unit PG is of a general single pinion type, similarly to the above-mentioned planetary gear unit PGS, and comprises a sun gear S, a ring gear R, a plurality of planetary gears P in mesh with the gears S and R, and a carrier C rotatably supporting the planetary gears P. As is widely known, the sun gear S, the carrier C, and the ring gear R are capable of transmitting motive power therebetween, and are configured such that during transmission of motive power, they rotate while maintaining a collinear relationship in rotational speed therebetween, and straight lines representing the respective rotational speeds thereof are sequentially aligned in a collinear chart representing the relationship between the rotational speeds. Further, the sun gear S, the carrier C, and the ring gear R are arranged coaxially with the first rotating shaft 7.

Furthermore, the sun gear S is integrally formed on the first rotating shaft 7. Further, the carrier C is integrally formed on the second rotating shaft 8, and the aforementioned first sprocket SP1 is mounted on the carrier C. Further, the rotor 23 is coaxially mounted on the ring gear R.

As described hereinabove, in the power plant 1C, the second rotor 15 and the sun gear S are mechanically directly connected to each other, and are mechanically directly connected to the crankshaft 3a. Further, the first rotor 14 and the carrier C are mechanically directly connected to each other, and are mechanically connected to the drive wheels DW and DW via the first sprocket SP1, the chain CH, the second sprocket SP2, the planetary gear unit PGS, the differential gear DG, and so forth. Furthermore, the ring gear R is mechanically directly connected to the rotor 23.

Further, as shown in FIG. 55, a third rotational angle sensor 59 is electrically connected to the ECU 2. The third rotational angle sensor 59 detects the rotational angular position of the rotor 23 with respect to the stator 22, and delivers a signal indicative of the detected rotational angular position of the rotor 23 to the ECU 2. The ECU 2 calculates the second rotating machine rotational speed NM2 based on the detected rotational angular position of the rotor 23.

Further, the ECU 2 controls the operations of the engine 3, the starter 31, and the first and second rotating machines 11 and 21, based on the detection signals from the sensors and switches 51 to 59 of various types according to control programs stored in the ROM. Similarly to the third embodiment, this causes the vehicle to be operated in various operation modes including the EV travel-time ENG start mode, the recovery-from-deceleration ENG start mode, and the vehicle stoppage-time ENG start mode. In this case, due to the above-described differences in construction from the third embodiment, operations in these operation modes are different from the operations in the case of the third embodiment, and hereafter, a description will be given of the different points.

[EV Travel-Time ENG Start Mode]

Control in the EV travel mode and the EV travel-time ENG start mode is performed according to a process shown in FIG. 56. Note that conditions for executing the present process is the same as in the first embodiment. Further, the power plant 1C is distinguished from the third embodiment only in that it includes the second rotating machine 21 and the planetary gear unit PG in place of the second rotating machine 61, so that the present process is different from the above-described process shown in FIG. 44 according to the third embodiment only in the control of the operation of the second rotating machine 21, i.e. only in that a step 81 is executed in place of the step 51. Therefore, the following description is mainly given of the different points, with steps identical to those of the process in FIG. 44 being denoted by the same step numbers, and detailed description thereof is omitted.

First, in the step 81 shown in FIG. 56, the operation of the second rotating machine 21 is controlled in the following manner, and the step 2 et seq. are executed. More specifically, first, a target value TCOBJ of a torque transmitted to the carrier C is calculated by the following equation (51). Then, electric power is supplied from the main battery 44 to the stator 22, and electric current supplied to the stator 22 is controlled such that a torque corresponding to the target value TCOBJ acts on the carrier C in the direction of normal rotation.

$$TCOBJ = TREQ + \alpha \cdot TR2OBJ/(1+\alpha) \quad (51)$$

Next, an example of operation of the above-described process shown in FIG. 56 will be described with reference to FIG. 57. First, a description is given of FIG. 57. As is apparent from the above-described relationship of connections between the various types of rotary elements of the power plant 1C, the engine speed NE, the second rotor rotational speed NR2, and the rotational speed of the sun gear S are equal to each other, and the second rotating machine rotational speed NM2 and the rotational speed of the ring gear R are equal to each other. Further, the first rotor rotational speed NR1 and the rotational speed of the carrier C are equal to each other, and are equal to the drive wheel rotational speed NDW provided that a change in speed e.g. by the planetary gear unit PGS is ignored. Furthermore, the first magnetic field rotational speed NMF1 and the first and second rotor rotational speeds NR1 and NR2 are in a predetermined collinear relationship expressed by the aforementioned equation (40), and the rotational speeds of the sun gear S, the carrier C, and the ring gear R are in a predetermined collinear relationship defined by the number of the gear teeth of the sun gear S and that of the gear teeth of the ring gear R.

From the above, the relationship between the first magnetic field rotational speed NMF1, the engine speed NE, the drive wheel rotational speed NDW, and the second rotating machine rotational speed NM2 is represented by a velocity collinear chart as shown in FIG. 57. Note that in FIG. 57 and other velocity collinear charts, described hereinafter, X represents the ratio of the number of the gear teeth of the sun gear S to the number of the gear teeth of the ring gear R. Further, in order to discriminate the sun gear S, the carrier C and the ring gear R, from the sun gear PS, the carrier PC, and the ring gear PR of the planetary gear unit PGS, respectively, reference numerals of the three S, C and R are parenthesized.

As is apparent from FIG. 57, the second powering torque TM2 is transmitted to the ring gear R, and further is transmitted to the first rotor 14 via the carrier C to cause the first rotor 14 to perform normal rotation. Electric power is generated in the first stator 13 as described above, using motive power thus transmitted to the first rotor 14, and the first rotating magnetic field generated along with the electric power generation performs reverse rotation. Further, the second powering torque TM2 transmitted to the ring gear R is transmitted to the crankshaft 3a via the carrier C and the sun gear S, using the first electric power-generating equivalent torque TGE1 as a reaction force, and is transmitted to the drive wheels DW and DW via the carrier C, whereby the crankshaft 3a and the drive wheels DW and DW are driven for normal rotation.

In this case, similarly to the first embodiment, by controlling the operation of the first rotating machine 11, the electric current generated in the first stator 13 is controlled such that the second rotor-transmitted torque TR2 becomes equal to the target value TR2OBJ, whereby the engine speed NE is feedback-controlled such that it becomes equal to the first start-time rotational speed NEST1, and is held at the first start-time rotational speed NEST1. Further, in this state, when the charge state SOC has become not larger than the first predetermined value SOCR1, the engine 3 is started without changing the engine speed NE, similarly to the first embodiment.

Further, as is apparent from FIG. 57, similarly to the third embodiment, the first electric power-generating equivalent torque TSE1 acts to cause the first rotor 14, the fourth rotor 65, and the drive wheels DW and DW to perform reverse rotation, using the engine friction TEF as a reaction force. A torque thus acting to cause the first rotor 14 and so forth to perform reverse rotation (first rotor reverse rotation torque) is represented by $-\alpha \cdot TR2/(1+\alpha)$.

On the other hand, by controlling the operation of the second rotating machine 21 in the step 81, the electric current supplied to the stator 22 is controlled such that the torque corresponding to the target value TCOBJ acts on the carrier C in the direction of normal rotation, and the target value TCOBJ is calculated by the aforementioned equation (51), i.e. TCOBJ=TREQ+α·TR2OBJ/(1+α). As is apparent from this fact and the fact that the first rotor reverse rotation torque is represented by −α·TR2/(1+α), as described above, a torque equal to the demanded torque TREQ is transmitted to the drive wheels DW and DW.

As described hereinabove, in starting the engine by shifting from the EV travel mode to the EV travel-time ENG start mode, the engine 3 is started in a state where motive power transmitted from the second rotating machine 21 to the crankshaft 3a is not increased and the engine speed NE is not increased.

Further, in the case where immediately after the start of the engine 3 in the EV travel-time ENG start mode, the direction of rotation of the first rotating magnetic field determined by the engine speed NE and the drive wheel rotational speed NDW is the direction of normal rotation, electric power is generated in the first stator 13 using part of motive power of the engine 3 transmitted to the second rotor 15; part of the generated electric power is charged into the main battery 44; the remainder of the generated electric power is supplied to the stator 22; and the rotor 23 is caused to perform normal rotation. Inversely to the above, in the case where the direction of rotation of the first rotating magnetic field is the direction of reverse rotation, electric power is generated in the stator 22 using part of motive power of the engine 3 transmitted to the rotor 23; part of the generated electric power is charged into the main battery 44; the remainder thereof is supplied to the first stator 13; and the first rotating magnetic field is caused to perform normal rotation. Thus, part of motive power of the engine 3 is converted to electric power and charged into the main battery 44, and the remainder thereof is transmitted to the drive wheels DW and DW. As a consequence, the drive wheels DW and DW continue to be driven for normal rotation.

[Recovery-from-Deceleration ENG Start Mode]

First, a description will be sequentially given of operations performed when the vehicle is performing high-speed traveling and then decelerating travel in the EV travel mode, and until after the vehicle shifts to the recovery-from-deceleration ENG start mode. FIG. 58 shows the relationship between the rotational speeds of the various types of rotary elements and the relationship between the torques thereof, during the high-speed traveling in the EV travel mode.

As is apparent from FIG. 58, during the high-speed traveling of the vehicle in the EV travel mode, the operations of the first and second rotating machines 11 and 21 are controlled, similarly to the above-described case shown in FIG. 57, whereby the drive wheels DW and DW continue to be driven for normal rotation, and the engine speed NE is controlled such that it becomes equal to the first start-time rotational speed NEST1. Then, from this state, when the accelerator pedal opening AP becomes approximately equal to 0 and the brake pedal is stepped on to demand deceleration of the vehicle, the vehicle is decelerated in the following manner:

The supply of electric power from the main battery 44 to the stator 22 is stopped, electric power is generated in the stator 22 using motive power transmitted from the drive wheels DW and DW rotating by inertia to the rotor 23 via the carrier C and the ring R, and the generated electric power is charged into the main battery 44. At the start of the electric power generation, because of the fact that the drive wheel rotational speed NDW is high, and the fact that the engine speed NE is controlled such that it becomes equal to the first start-time rotational speed NEST1, the first rotating magnetic field performs reverse rotation. Further, electric power continues to be generated in the first stator 13, and the generated electric power is charged into the main battery 44. FIG. 59 shows the relationship between the rotational speeds of the various types of rotary elements and the relationship between the torques thereof, in this case.

As is apparent from FIG. 59, the second electric power generation torque TG2 is transmitted to the ring gear R, and further acts to brake the carrier C and the drive wheels DW and DW, using the engine friction TEF acting on the sun gear S as a reaction force, whereby the drive wheel rotational speed NDW is lowered. Further, the first electric power-generating equivalent torque TGE1 acts to brake the first rotor 14 together with the drive wheels DW and DW, using the engine friction TEF acting on the second rotor 15 as a reaction force, which also lowers the drive wheel rotational speed NDW. Further, since the engine speed NE is controlled such that it becomes equal to the first start-time rotational speed NEST1, the first magnetic field rotational speed NMF1 is lowered as the drive wheel rotational speed NDW is lowered, as described above.

In this case, the electric current generated in the first stator 13 is controlled, as described in the step 2. Further, electric current generated in the stator 22 is controlled such that the braking torque acting on the drive wheels DW and DW becomes equal to the target braking torque TBOBJ. Specifically, the electric current generated in the second stator 63 is controlled such that a braking torque corresponding to the target value TCOBJ calculated by the following equation (52) acts on the carrier C:

$$TCOBJ=TBOBJ-\alpha \cdot TR2OBJZ/(1+\alpha) \qquad (52)$$

When the above-described charge of the main battery 44 has caused the charge state SOC to reach a value close to the upper limit value, the first magnetic field rotational speed NMF1 is controlled such that it becomes equal to 0. As a consequence, the second rotor rotational speed NR2 is increased, and the engine speed NE is made higher than the first start-time rotational speed NEST1. Then, after the first magnetic field rotational speed NMF1 has become equal to 0, the electric power generated in the stator 22 is directly supplied to the first stator 13 without being charged into the main battery 44, to thereby cause the first rotating magnetic field to perform normal rotation. FIG. 60 shows the relationship between the rotational speeds of the various types of rotary elements and the relationship between the torques thereof, in this case.

As is apparent from FIG. 60, the first driving equivalent torque TSE1 is transmitted to the crankshaft 3a via the second rotor 15, using the drive wheel torque TDW acting on the first rotor 14 as a reaction force, whereby the engine speed NE is increased.

Then, when the direction of rotation of the rotor 23 determined by the relationship between the two NDW and NE is changed to the direction of reverse rotation by a decrease in the drive wheel rotational speed NDW and an increase in the engine speed NE caused as described above, the operations of the first and second rotating machines 11 and 61 are controlled in the following manner: Electric power generation in the stator 22 is stopped; supply of electric power from the stator 22 to the first stator 13 is stopped; and electric power is generated in the first stator 13 using motive power transmitted from the drive wheels DW and DW to the first rotor 14. Further, the electric power thus generated is supplied to the stator 22 to cause the rotor 23 to perform reverse rotation. FIG. 61 shows the relationship between the rotational speeds of the various types of rotary elements and the relationship between the torques thereof, in this case.

As is apparent from FIG. 61, the first electric power-generating equivalent torque TGE1 acts to brake the drive wheels DW and DW via the first rotor 14, using the second powering torque TM2 as a reaction force, and acts to brake the crankshaft 3a via the second rotor 15. This lowers the engine speed NE and the drive wheel rotational speed NDW.

Then, when the accelerator pedal is largely stepped on to demand high acceleration of the vehicle from the state as shown in FIG. 61, the operation mode is shifted to the recovery-from-deceleration ENG start mode. Control in the recovery-from-deceleration ENG start mode is performed according to a process shown in FIG. 62. Due to the above-described differences in construction from the third embodiment, this process is different from the above-described process shown in FIG. 50 according to the third embodiment only in the control of the operation of the second rotating machine 21, i.e. only in that a step 91 is executed in place of the step 61. Therefore, the following description is mainly given of the different points, with steps identical to those of the process in FIG. 50 being denoted by the same step numbers, and detailed description thereof is omitted.

First, in the step 91 in FIG. 62, the operation of the second rotating machine 21 is controlled in the following manner, and the step 12 et seq. are executed. More specifically, first, similarly to the step 81, the target value TCOBJ is calculated by the aforementioned equation (51). Then, as shown in FIG. 63, referred to hereinafter, in a case where the direction of rotation of the rotor 23 determined by the drive wheel rotational speed NDW and the engine speed NE is the direction of reverse rotation, electric power is generated in the stator 22, the generated electric power is supplied to the first stator 13, and electric current generated in the stator 22 is controlled such that a torque corresponding to the target value TCOBJ acts on the carrier C in the direction of normal rotation. On the other hand, in a case where the direction of rotation of the rotor 23 determined by the drive wheel rotational speed NDW and the engine speed NE is the direction of normal rotation, the operation of the second rotating machine 21 is controlled similarly to the step 81.

Next, an example of operation of the above-described process shown in FIG. 62 will be described with reference to FIG. 63. As is apparent from FIG. 63, the first driving equivalent torque TSE1 is transmitted to the sun gear S via the second rotor 15 to cause the sun gear S to continue to perform normal rotation. Further, a torque transmitted to the sun gear S is transmitted to the rotor 23 via the carrier C and the ring gear R. Electric power is generated in the stator 22, as described above, using motive power thus transmitted to the rotor 23. In this case, the rotor 23 performs reverse rotation. Further, the first driving equivalent torque TSE1 is transmitted to the crankshaft 3a via the second rotor 15, using the second power generation torque TG2 as a reaction force, and is transmitted to the drive wheels DW and DW via the first rotor 14, whereby the crankshaft 3a and the drive wheels DW and DW continue to be driven for normal rotation.

In this case, by controlling the operation of the first rotating machine 11 similarly to the first embodiment, the electric current supplied to the first stator 13 is controlled such that the second rotor-transmitted torque TR2 becomes equal to the target value TR2OBJ, whereby the engine speed NE is feedback-controlled such that it becomes equal to the second start-time rotational speed NEST2.

Further, in this case as well, by controlling the operation of the second rotating machine 21 in the step 91, a torque transmitted to the carrier C is controlled such that it becomes equal to the target value TCOBJ (=TREQ+α·TR2OBJZ/(1+α)), and similarly to the first embodiment, the first rotor reverse rotation torque is represented by −α·TR2/(1+α). As is apparent from the above, a torque equal to the demanded torque TREQ is transmitted to the drive wheels DW and DW.

From the above, similarly to the first embodiment, as indicated by a broken line in FIG. 63, when the engine speed NE immediately before a shift to the recovery-from-deceleration ENG start mode is higher than the second start-time rotational speed NEST2, the operation of the first rotating machine 11 is controlled such that the engine speed NE is lowered to the second start-time rotational speed NEST2. Further, the engine 3 is started in the state where the engine speed NE is controlled to the second start-time rotational speed NEST2.

Further, in a case where immediately after the start of the engine 3 in the recovery-from-deceleration ENG start mode, both the directions of rotations of the first rotating magnetic field and the rotor 23 determined by the engine speed NE and the drive wheel rotational speed NDW are the direction of normal rotation, electric power is generated in the first stator 13 using part of motive power transmitted from the engine 3 to the second rotor 15, and the generated electric power is directly supplied to the stator 22 to cause the rotor 23 to perform normal rotation. Further, in a case where the directions of rotations of the first rotating magnetic field and the rotor 23 are the direction of normal rotation and the direction of reverse rotation, respectively, electric power is generated in the stator 22 using part of motive power transmitted to the rotor 23, and the generated electric power is directly supplied to the first stator 13 to cause the first rotating magnetic field to perform normal rotation. With the above-described operations, a relatively large motive power of the engine 3 is transmitted to the drive wheels DW and DW, for high acceleration of the vehicle. Further, when the demanded torque TREQ is very large, electric power of the main battery 44 may be further supplied to the first stator 13 and/or the stator 22, to assist the engine 3 with the first rotating machine 11 and/or the second rotating machine 21, which enables higher acceleration of the vehicle.

[Vehicle Stoppage-Time ENG Start Mode]

Control in the vehicle stoppage-time ENG start mode is executed according to a process shown in FIG. 64. Due to the above-described differences in construction from the third embodiment, this process is different from the above-described process shown in FIG. 52 according to the third embodiment only in the control of the operation of the second rotating machine 21, i.e. only in that a step 101 is executed in place of the step 71. Therefore, the following description is mainly given of the different points, with steps identical to those of the process in FIG. 52 being denoted by the same step numbers, and detailed description thereof is omitted.

In the step 101 following the step 22, the step 24 et seq. are executed by controlling the operation of the second rotating machine 21 in the following manner: First, the target value TCOBJ is calculated with a predetermined feedback control algorithm such that the calculated drive wheel rotational speed NDW becomes equal to 0. Then, electric power is supplied from the main battery 44 to the stator 22, and electric current supplied to the stator 22 is controlled such that a torque corresponding to the target value TCOBJ acts on the carrier C.

Next, an example of operation of the above-described process shown in FIG. 64 will be described with reference to FIG. 65. As shown in FIG. 65, similarly to the first embodiment, the crankshaft 3a is driven for normal rotation by the starter 31, and the engine speed NE exceeds the first start-time rotational speed NEST1. Further, in this state, the engine 3 is started. In this case, as is apparent from FIG. 65, the torque TST of the starter 31 acts via the second and first rotors 15 and 14 to cause the drive wheels DW and DW to perform normal rotation, using the aforementioned first magnetic field rotational resistance DMF1 as a reaction force.

On the other hand, by controlling the operation of the second rotating machine 21 in the step 101, the torque acting on the carrier C is controlled such that the drive wheel rotational speed NDW becomes equal to 0. As a consequence, the torque acting on the drive wheels DW and DW, caused by the above-described first magnetic field rotational resistance DMF1, is cancelled out by the torque acting on the carrier C, caused by the second powering torque TM2, whereby the drive wheels DW and DW are held at rest (NDW=0).

The fourth embodiment described heretofore corresponds to the invention as claimed in claims 11 to 15. Correspondence between various types of elements of the fourth embodiment and various types of elements of the invention as claimed in claims 11 to 15 (hereinafter generically referred to as the "third invention") is as follows: The drive wheels DW and DW, the engine 3, and the planetary gear unit PG of the fourth embodiment correspond to driven parts, a heat engine, and a power transmission mechanism of the third invention, respectively, and the ECU 2, the VCU 43, and the first and second PDUs 41 and 42 of the fourth embodiment correspond to a controller of the third invention. Further, the crankshaft 3a of the fourth embodiment corresponds to an output portion of the third invention, and the sun gear S, the carrier C, and the ring gear R of the fourth embodiment correspond to the first element, the second element, and the third element of the third invention, respectively. The permanent magnets 14a and the cores 15a of the fourth embodiment correspond to magnetic poles and soft magnetic material elements of the third invention, respectively. Furthermore, the first stator 13 of the fourth embodiment corresponds to a stator of the third invention, and the iron core 13a and the U-phase to W-phase coils 13c to 13e of the fourth embodiment correspond to an armature row of the third invention.

Further, the first start-time rotational speed NEST1 of the fourth embodiment corresponds to a first predetermined value of the third invention; the second start-time rotational speed NEST2 of the fourth embodiment corresponds to a second predetermined value of the invention as claimed in claims 12 to 15; and the demanded torque TREQ of the fourth embodiment corresponds to a demanded driving force of the invention as claimed in claims 14 and 15.

As described hereinabove, according to the fourth embodiment, the first rotating machine 11 is used, and hence, similarly to the first embodiment, it is possible to downsize the power plant 1C and reduce manufacturing costs thereof, and enhance the degree of freedom in design of the power plant 1C. Further, in starting the engine 3, if the engine speed NE is not lower than the first start-time rotational speed NEST1, the engine 3 is started in the EV travel-time ENG start mode, or in the vehicle stoppage-time ENG start mode, in a state where the engine speed NE is not increased. When the engine speed NE is high enough to start the engine 3, it is possible to prevent motive power from being wastefully transmitted to the crankshaft 3a, and in turn, enhance the efficiency of the power plant 1C.

Further, similarly to the third embodiment, in starting the engine 3, if the engine speed NE is above the second start-time rotational speed NEST2, the operation of the first rotating machine 11 is controlled in the recovery-from-deceleration ENG start mode, whereby the engine 3 is started in a state where the engine speed NE is lowered to the second start-time rotational speed NEST2. In addition, since the second start-time rotational speed NEST2 is set such that the maximum torque of the engine 3 can be obtained, it is possible to obtain the maximum torque of the engine 3 immediately after the start of the engine 3. Furthermore, during the EV travel mode, the operation of the second rotating machine 21 is controlled such that the drive wheel-transmitted torque becomes equal to the demanded torque TREQ, and hence it is possible to properly drive the drive wheels DW and DW.

Further, similarly to the first embodiment, in starting the engine 3, if the engine speed NE is lower than the first start-time rotational speed NEST1, the starter 31 is operated to start the engine 3 in the vehicle stoppage-time ENG start mode. Therefore, it is possible to properly start the engine 3. Furthermore, in the vehicle stoppage-time ENG start mode, the drive wheels DW and DW are held at rest by controlling the operation of the second rotating machine 21, so that it is possible to prevent a change in speed of the drive wheels DW and DW from being caused by transmission of a driving force to the crankshaft 3a, and enhance marketability.

Furthermore, similarly to the first embodiment, in starting the engine 3, if the charge state SOC of the main battery 44 is lower than the third predetermined value, the crankshaft 3a is driven using the starter 31 and the charge state of the auxiliary battery 33 is always held at a relatively large value. Thus, it is possible to properly start the engine 3 even in such a case where the crankshaft 3a cannot be properly driven using electric power from the main battery 44.

Note that although in the fourth embodiment, the planetary gear unit PG of a single pinion type is used as the power transmission mechanism of the third invention, there may be used another suitable mechanism, such as a planetary gear unit of a double pinion type or the differential gear DG, insofar as it includes the first to third elements that are capable of transmitting motive power while maintaining a collinear relationship in rotational speed therebetween. Alternatively, such a mechanism may be employed that has a plurality of rollers for transmitting motive power by friction between surfaces in place of the gears of the planetary gear unit, and has the functions equivalent to those of the planetary gear unit. Furthermore, there may be employed such a mechanism as disclosed in Japanese Laid-Open Patent Publication (Kokai) No. 2008-39045, which comprises a combination of a plurality of magnets and soft magnetic material elements, though detailed description thereof is omitted.

Further, although in the fourth embodiment, the second rotor 15 and the sun gear S are directly connected to each other, if they are mechanically connected to the crankshaft 3a, they are not necessarily required to be directly connected to each other. Further, although the first rotor 14 and the carrier C are directly connected to each other, if they are mechanically connected to the drive wheels DW and DW, they are not necessarily required to be directly connected to each other. Further, although in the fourth embodiment, the second rotor 15 and the sun gear S are directly connected to the crankshaft 3a, they may be mechanically connected to the crankshaft 3a via gears, a pulley, a chain, a transmission, or the like.

Further, although in the fourth embodiment, the first rotor 14 and the carrier C are connected to the drive wheels DW and DW via the chain CH and differential gear DG, they may be mechanically directly connected to each other. Further, although in the fourth embodiment, the ring gear R is directly connected to the rotor 23, it may be mechanically connected to the rotor 23 via gears, a pulley, a chain, a transmission, or the like.

Further, although in the fourth embodiment, the ring gear R is connected to the rotor 23, and the sun gear S is connected to the crankshaft 3a, the relationship of the connections may be reversed, that is, the ring gear R may be mechanically connected to the crankshaft 3a, and the sun gear S may be mechanically connected to the rotor 23. In this case, naturally, mechanical direct connection or mechanical connection using gears, a pulley, a chain, a transmission, or the like may be provided between the ring gear R and the crankshaft 3a, and between the sun gear S and the rotor 23.

Further, although in the fourth embodiment, the start of the engine 3 using the starter 31 is carried out during stoppage of the vehicle in the vehicle stoppage-time ENG start mode, it may be carried out in the EV travel mode. In this case as well, by controlling the operation of the second rotating machine 21 as described hereinafter, it is possible to suppress a change in the drive wheel rotational speed NDW, caused by transmission of a driving force to the crankshaft 3a.

More specifically, the target value TCOBJ is calculated with a predetermined feedback control algorithm such that the drive wheel rotational speed NDW is not changed, and electric current supplied from the main battery 44 to the stator 22 is controlled such that a torque corresponding to the target value TR4OBJ acts on the carrier C. With the above-described operations, also in the EV traveling mode, it is possible to suppress a change in the drive wheel rotational speed NDW, caused by transmission of a driving force to the crankshaft 3a.

Further, in the fourth embodiment, the first rotating machine 11 may be replaced by the second rotating machine 21 and the planetary gear unit PG, and the second rotating machine 21 and the planetary gear unit PG may be replaced by the second rotating machine 61. In this case, the carrier C and the first rotor 14 is mechanically connected to the crankshaft 3a, and the sun gear S (or the ring gear R) and the second rotor 15 are mechanically connected to the drive wheels DW and DW. A power plant thus constructed corresponds to the invention as claimed in claims 11 to 15.

Further, although in the first, second and fourth embodiments, the second rotating machine 21 is a synchronous brushless DC motor, another suitable device, such as an AC motor of a synchronous or induction type, may be used insofar as it is capable of converting supplied electric power to motive power, and outputting the motive power, and also capable of converting input motive power to electric power.

Furthermore, in the first to fourth embodiments (hereafter generically referred to as the "embodiment"), there are arranged four first armature magnetic poles, eight first magnet magnetic poles, and six cores 15a in the first rotating machine 11. That is, the ratio between the number of the first armature magnetic poles, the number of the first magnet magnetic poles, and the number of the cores 15a is 1:2:1.5, by way of example. However, respective desired numbers of the first armature magnetic poles, the first magnet magnetic poles, and the cores 15a can be employed, insofar as the ratio therebetween satisfies $1:m:(1+m)/2$ ($m \neq 1.0$). Further, although in the embodiment, the cores 15a are formed by steel plates, they may be formed by other soft magnetic materials. Further, although in the embodiment, the first stator 13 and the first rotor 14 are arranged at respective radially outer and inner locations, this is not limitative, but inversely, they may be arranged at respective radially inner and outer locations.

Further, although in the embodiment, the first rotating machine 11 is constructed as a so-called radial type by arranging the first stator 13 and the first and second rotors 14 and 15 in the radial direction, the first rotating machine 11 may be constructed as a so-called axial type by arranging the first stator 13 and the first and second rotors 14 and 15 in the axial direction. Further, although in the embodiment, one first magnet magnetic pole is formed by a magnetic pole of a single permanent magnet 14a, it may be formed by magnetic poles of a plurality of permanent magnets. For example, if one first magnet magnetic pole is formed by arranging two permanent magnets in an inverted-V shape such that the magnetic poles thereof become closer to each other toward the first stator 13, it is possible to improve the directivity of the aforementioned magnetic force line ML. Further, in the embodiment, electromagnets may be used in place of the permanent magnets 14a.

Further, although in the embodiment, the coils 13c to 13e are formed by three-phase coils of U-phase to W-phase, the number of phases of the coils can be set as desired insofar as the coils can generate the first rotating magnetic field. Further, it is to be understood that in the embodiment, a desired number of slots, other than that used in the embodiment, may be employed as the number of the slots 13b. Further, although in the embodiment, the U-phase to W-phase coils 13c to 13e are wound in the slots 13b by distributed winding, this is not limitative, but they may be wound by concentrated winding. Further, although in the embodiment, the slots 13b, the permanent magnets 14a, and the cores 15a are arranged at equally-spaced intervals, they may be arranged at unequally-spaced intervals. The above-described variations of the first rotating machine 11 similarly apply to the second rotating machine 61 in the third embodiment.

Further, although in the embodiment, the controller for controlling the engine 3, the starter 31, and the first and second rotating machines 11, 21, and 61 are formed by the ECU 2, the VCU 43, and the first and second PDUs 41 and 42, it may be formed by a combination of a microcomputer and an electric circuit. Further, although in the embodiment, the main battery 44 is used as a power source for the first and second rotating machines 11, 21, and 61, any other suitable device, such as a capacitor, may be used insofar as it is an electric power storage device capable of being charged and discharged.

Furthermore, although in the embodiment, the second start-time rotational speed NEST2 as the second predetermined value of the present invention is set to a predetermined rotational speed that will make it possible to obtain the maximum torque of the engine 3, the second start-time rotational speed NEST2 may be set to a predetermined rotational speed, such as a predetermined rotational speed within a range of 600 to 800 rpm, which will make it possible to obtain the most excellent exhaust emission characteristics from the engine 3. Alternatively, the second start-time rotational speed NEST2 may be set to a predetermined rotational speed, such as a predetermined rotational speed within a range of 1500 to 2000 rpm, which will make it possible to obtain the lowest fuel consumption ratio of the engine 3, or it may be set, based on at least one of the largest torque of the engine 3, the most excellent exhaust emission characteristics, and the lowest fuel consumption ratio, to a predetermined rotational speed which will make it possible to obtain the at least one of them.

Furthermore, in the embodiment, during traveling of the vehicle, when the engine speed NE is higher than the second start-time rotational speed NEST2, the engine 3 is started in the recovery-from-deceleration ENG start mode, in a state where the engine speed NE is lowered to the second start-time rotational speed NEST2. However, also when the engine speed NE is higher than the second start-time rotational speed NEST2 immediately after stoppage of the vehicle, the engine 3 may be started in the state where the engine speed NE is lowered to the second start-time rotational speed NEST2.

Further, although in the embodiment, the engine 3 as a heat engine of the present invention is a gasoline engine, it is to be understood that a desired heat engine may be employed which has an output part capable of outputting motive power. For example, as the engine 3, there may be employed any of various industrial engines including a diesel engine, and engines for ship propulsion machines, such as an outboard motor having a vertically-disposed crankshaft. Alternatively, there may be employed e.g. an external combustion engine, such as a Stirling engine. Furthermore, in the embodiment, desired means for connecting between the various types of rotary elements can be employed insofar as they satisfy the conditions of the present invention. For example, the gears described in the embodiment may be replaced with pulleys or the like. Further, although in the embodiment, the power plant according to the present invention is applied to vehicles, by way of example, it may be applied to boats or aircrafts. It is to be further understood that various changes and modifications may be made without departing from the spirit and scope thereof.

INDUSTRIAL APPLICABILITY

The present invention relates to a power plant provided with two or more motive power sources, such as a heat engine and rotating machines, which are different from each other, and is useful in attaining downsizing and reduction of manufacturing costs of the power plant and enhancing the degree of freedom in design of the power plant.

REFERENCE SIGNS LIST 1 power plant
1A power plant
1B power plant
1C power plant
2 ECU (controller)
3 engine (heat engine)
3a crankshaft (output portion)
11 first rotating machine
13 first stator (stator)
13a iron core (armature row, first armature row)
13c U-phase coil (armature row, first armature row)
13d V-phase coil (armature row, first armature row)
13e W-phase coil (armature row, first armature row)
14 first rotor
14a permanent magnet (magnetic pole, first magnetic pole)
15 second rotor
15a core (soft magnetic material element, first soft magnetic material element)
21 second rotating machine
23 rotor
31 starter
41 first PDU (controller)
42 second PDU (controller)
43 VCU (controller)
61 second rotating machine
63 second stator
63a iron core (second armature row)
63b U-phase to W-phase coils (second armature row)
64 third rotor
64a permanent magnet (second magnetic pole)
65 fourth rotor
65a core (second soft magnetic material element)
PG planetary gear unit (power transmission mechanism)
S sun gear (first element)
C carrier (second element)
R ring gear (third element)
DW, DW drive wheels (driven parts)
NEST1 first start-time rotational speed (first predetermined value)
NEST2 second start-time rotational speed (second predetermined value)

The invention claimed is:

1. A power plant for driving driven parts, including:
a heat engine including an output portion for outputting motive power;
a first rotating machine;
a second rotating machine capable of converting supplied electric power to motive power and outputting the motive power from a rotor thereof, and also capable of converting motive power input to said rotor to electric power; and
a controller for controlling operations of said heat engine and said first and second rotating machines,
wherein said first rotating machine comprises a first rotor having a magnetic pole row that is formed by a predetermined plurality of magnetic poles arranged in a circumferential direction, and has each two magnetic poles thereof adjacent to each other so disposed as to have respective polarities different from each other, said first rotor being rotatable in the circumferential direction, an unmovable stator having an armature row that is disposed in a manner opposed to said magnetic pole row and is for generating a predetermined plurality of armature magnetic poles to thereby cause a rotating magnetic field rotating in the circumferential direction to be generated between said armature row and said magnetic pole row, and a second rotor having a soft magnetic material element row that is formed by a predetermined plurality of soft magnetic material elements arranged in the circumferential direction in a manner spaced from each other, and is disposed between said magnetic pole row and said armature row, said second rotor being rotatable in the circumferential direction,
wherein a ratio between the number of the armature magnetic poles, the number of the magnetic poles, and the number of said soft magnetic material elements is set to $1:m:(1+m)/2$ ($m \neq 1.0$),
wherein one of said first and second rotors is mechanically connected to said output portion whereas the other of said first and second rotors is mechanically connected to the driven parts, and said rotor is mechanically connected to the driven parts, and
wherein in starting said heat engine, when a rotational speed of said output portion is not lower than a first predetermined value, said heat engine is started by said controller in a state where the rotational speed of said output portion is not increased.

2. The power plant as claimed in claim 1, wherein in starting said heat engine, when the rotational speed of said output portion is above a second predetermined value higher than the first predetermined value, said heat engine is started in a state where the rotational speed of said output portion is lowered by controlling an operation of said first rotating machine.

3. The power plant as claimed in claim 2, wherein said heat engine is an internal combustion engine, and the second predetermined value is set based on at least one of exhaust emission characteristics, a fuel consumption ratio, and an output torque of said heat engine.

4. The power plant as claimed in claim 1, wherein during driving of the driven parts, said controller controls an operation of said second rotating machine such that a demanded driving force demanded by the driven parts is transmitted to the driven parts.

5. The power plant as claimed in claim 1, further including a starter for driving said output portion in order to start said heat engine, and
wherein in starting said heat engine, when the rotational speed of said output portion is lower than the first predetermined value, said controller causes said starter to operate, and starts said heat engine in a state where an operation of at least one of said first and second rotating machines is controlled such that a change in speed of the driven parts caused by transmission of a driving force from said starter to said output portion is suppressed.

6. A power plant for driving driven parts, including:
a heat engine including an output portion for outputting motive power;
a first rotating machine;
a second rotating machine; and
a controller for controlling operations of said heat engine and said first and second rotating machines,
wherein said first rotating machine comprises a first rotor having a first magnetic pole row that is formed by a predetermined plurality of first magnetic poles arranged in a first circumferential direction, and has each two first magnetic poles thereof adjacent to each other so disposed as to have respective polarities different from each other, said first rotor being rotatable in the first circumferential direction, an unmovable first stator having a first armature row that is disposed in a manner opposed to said first magnetic pole row and is for generating a predetermined plurality of first armature magnetic poles to thereby cause a first rotating magnetic field rotating in the first circumferential direction to be generated between said first armature row and said first magnetic pole row, and a second rotor having a first soft magnetic material element row that is formed by a predetermined plurality of first soft magnetic material elements arranged in the first circumferential direction in a manner spaced from each other, and is disposed between said first magnetic pole row and said first armature row, said second rotor being rotatable in the first circumferential direction, wherein a ratio between the number of the first armature magnetic poles, the number of the first magnetic poles, and the number of said first soft magnetic material elements is set to $1:m:(1+m)/2$ $(m\neq1.0)$, wherein said second rotating machine comprises a third rotor having a second magnetic pole row that is formed by a predetermined plurality of second magnetic poles arranged in a second circumferential direction, and has each two second magnetic poles thereof adjacent to each other so disposed as to have respective polarities different from each other, said third rotor being rotatable in the second circumferential direction, an unmovable second stator having a second armature row that is disposed in a manner opposed to said second magnetic pole row and is for generating a predetermined plurality of second armature magnetic poles to thereby cause a second rotating magnetic field rotating in the second circumferential direction to be generated between said second armature row and said second magnetic pole row, and a fourth rotor having a second soft magnetic material element row that is formed by a predetermined plurality of second soft magnetic material elements arranged in the second circumferential direction in a manner spaced from each other, and is disposed between said second magnetic pole row and said second armature row, said fourth rotor being rotatable in the second circumferential direction, wherein a ratio between the number of the second armature magnetic poles, the number of the second magnetic poles, and the number of said second soft magnetic material elements is set to $1:n:(1+n)/2$ $(n\neq1.0)$, wherein said second and third rotors are mechanically connected to said output portion and said first and fourth rotors are mechanically connected to the driven parts, and wherein in starting said heat engine, when a rotational speed of said output portion is not lower than a first predetermined value, said heat engine is started by said controller in a state where the rotational speed of said output portion is not increased.

7. The power plant as claimed in claim 6, wherein in starting said heat engine, when the rotational speed of said output portion is above a second predetermined value higher than the first predetermined value, said controller starts said heat engine in a state where the rotational speed of said output portion is lowered by controlling an operation of said first rotating machine.

8. The power plant as claimed in claim 7, wherein said heat engine is an internal combustion engine, and the second predetermined value is set based on at least one of exhaust emission characteristics, a fuel consumption ratio, and an output torque of said heat engine.

9. The power plant as claimed in claim 6, wherein during driving of the driven parts, said controller controls an operation of said second rotating machine such that a demanded driving force demanded by the driven parts is transmitted to the driven parts.

10. The power plant as claimed in claim 6, further including a starter for driving said output portion in order to start said heat engine, and wherein in starting said heat engine, when the rotational speed of said output portion is lower than the first predetermined value, said controller causes said starter to operate, and starts said heat engine in a state where an operation of said second rotating machine is controlled such that a change in speed of the driven parts caused by transmission of a driving force from said starter to said output portion is suppressed.

11. A power plant for driving driven parts, including:

a heat engine including an output portion for outputting motive power;

a first rotating machine;

a second rotating machine capable of converting supplied electric power to motive power and outputting the motive power from a rotor thereof, and also capable of converting motive power input to said rotor to electric power;

a power transmission mechanism including a first element, a second element, and a third element that are capable of transmitting motive power therebetween, said first to third elements being configured to rotate during transmission of the motive power while maintaining a collinear relationship in rotational speed therebetween, with straight lines representing respective rotational speeds of said first to third elements being sequentially aligned in a collinear chart representing the collinear relationship in rotational speed, and a controller for controlling operations of said heat engine and said first and second rotating machines, wherein said first rotating machine comprises a first rotor having a magnetic pole row that is formed by a predetermined plurality of magnetic poles arranged in a circumferential direction, and has each two magnetic poles thereof adjacent to each other so disposed as to have respective polarities different from each other, said first rotor being rotatable in the circumferential direction, an unmovable stator having an armature row that is disposed in a manner opposed to said magnetic pole row and is for generating a predetermined plurality of armature magnetic poles to thereby cause a rotating magnetic field rotating in the circumferential direction to be generated between said armature row and said magnetic pole row, and a second rotor having a soft magnetic material element row that is formed by a predetermined plurality of soft magnetic material elements arranged in the circumferential direction in a manner spaced from each other, and is disposed between said magnetic pole row and said armature row, said second rotor being rotatable in the circumferential direction, wherein a ratio between the number of the armature magnetic poles, the number of the magnetic poles, and the number of said soft magnetic material elements is set to $1:m:(1+m)/2$ $(m\neq1.0)$, wherein one of a combination of said first rotor and said second element and a combination of said second rotor and said first element are mechanically connected to said output portion whereas the other of the combination of said first rotor and said second element and the combination of said second rotor and said first element are mechanically connected to the driven parts, and said third element is mechanically connected to said rotor, and wherein in starting said heat engine, when a rotational speed of said output portion is not lower than a first predetermined value, said heat engine is started by said controller in a state where the rotational speed of said output portion is not increased.

12. The power plant as claimed in claim 11, wherein in starting said heat engine, when the rotational speed of said output portion is above a second predetermined value higher than the first predetermined value, said controller starts said heat engine in such a manner that the rotational speed of said output portion is lowered, and when the combination of said first rotor and said second element are mechanically connected to said output portion, in a state where an operation of said second rotating machine is controlled, whereas when the combination of said second rotor and said first element are mechanically connected to said output portion, in a state where an operation of said first rotating machine is controlled.

13. The power plant as claimed in claim 12, wherein said heat engine is an internal combustion engine, and the second predetermined value is set based on at least one of exhaust emission characteristics, a fuel consumption ratio, and an output torque of said heat engine.

14. The power plant as claimed in claim 11, wherein during driving of the driven parts, in order that a demanded driving force demanded by the driven parts is transmitted to the driven parts, said controller controls an operation of said first rotating machine when the combination of said first rotor and said second element are mechanically connected to said output portion, and controls an operation of said second rotating machine when the combination of said second rotor and said first element are mechanically connected to said output portion.

15. The power plant as claimed in claim 11, further including a starter for driving said output portion in order to start said heat engine, and
wherein in starting said heat engine, when the rotational speed of said output portion is lower than the first predetermined value, said controller causes said starter to operate, and starts said heat engine such that a change in speed of the driven parts caused by transmission of a driving force from said starter to said output portion is suppressed, when the combination of said first rotor and said second element are mechanically connected to said output portion, in a state where an operation of said first rotating machine is controlled, whereas when the combination of said second rotor and said first element are mechanically connected to said output portion, in a state where an operation of said second rotating machine is controlled.

* * * * *